(12) United States Patent
Nishikawa et al.

(10) Patent No.: US 6,934,046 B1
(45) Date of Patent: Aug. 23, 2005

(54) INFORMATION PROCESSOR, METHOD FOR PROCESSING INFORMATION AND MEMORY MEDIUM FOR STORING PROGRAM READABLE BY COMPUTER

(75) Inventors: Satoshi Nishikawa, Yokohama (JP); Koji Nakagiri, Kawasaki (JP); Yasuo Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 895 days.

(21) Appl. No.: 09/699,389

(22) Filed: Oct. 31, 2000

(30) Foreign Application Priority Data

Nov. 2, 1999 (JP) ................................. 11-312870
Nov. 2, 1999 (JP) ................................. 11-312872

(51) Int. Cl.⁷ ............................................. G06F 15/00
(52) U.S. Cl. ...................... 358/1.15; 358/450; 358/453
(58) Field of Search ................................ 358/1.15, 1.1, 358/1.2, 1.9, 1.13, 1.16, 1.17, 450, 451, 452, 358/453, 1.12, 1.14

(56) References Cited

U.S. PATENT DOCUMENTS

| 4,627,707 A | * | 12/1986 | Tani et al. ................. 399/184 |
| 5,768,483 A | * | 6/1998 | Maniwa et al. ............ 358/1.15 |
| 6,120,197 A | | 9/2000 | Kawamoto et al. ........... 400/61 |
| 6,130,965 A | * | 10/2000 | Kobayashi et al. ......... 382/284 |
| 6,476,930 B1 | * | 11/2002 | Roberts et al. ............ 358/1.18 |
| 6,549,302 B1 | * | 4/2003 | Takeda et al. ............... 358/1.9 |

FOREIGN PATENT DOCUMENTS

| JP | 7-319856 | 12/1995 | ............ G06F 17/21 |
| JP | 9-134261 | 5/1997 | ............. G06F 3/12 |
| JP | 11-165455 | 6/1999 | ............. B41J 29/38 |
| JP | 11-179993 | 7/1999 | ............. B41J 21/00 |

* cited by examiner

Primary Examiner—Mark Wallerson
(74) Attorney, Agent, or Firm—Fitzpatrick, Cella, Harper & Scinto

(57) ABSTRACT

In order to compose a plurality of print jobs together to prepare one composed job and provide a desired printed result with no inconvenience to a user, an information processor of the present invention includes a generator for generating print setting information for the composed job, for analyzing the print setting information of a plurality of print jobs and unifying information which can be respectively set only to one print job when a plurality of print jobs are instructed to be composed together so as to obtain one composed job.

92 Claims, 35 Drawing Sheets

FIG. 10

| | |
|---|---|
| JOB ID | 1001 |
| JOB SETTING INFO | 1002 |
| NO. OF PHYSICAL PAGES OF JOB | 1003 |
| 1ST PHYSICAL PAGE INFO | 1004 |
| 2ND PHYSICAL PAGE INFO | 1005 |
| ... | 1006 |
| LAST PHYSICAL PAGE INFO | 1007 |

FIG. 11

| | |
|---|---|
| NO. OF ENTIRE PHYSICAL PAGES | 1101 |
| NO. OF ENTIRE LOGICAL PAGES | 1102 |
| NO. OF COPIES | 1103 |
| COPY-BY-COPY PRINT | 1104 |
| FINISHING | 1105 |
| ADDITIONAL INFO | 1106 |

FIG. 12

| | |
|---|---|
| PHYSICAL PAGE NO. | ~1201 |
| PHYSICAL PAGE SETTING INFO | ~1202 |
| N: NO. OF LOGICAL PAGES IN PHYSICAL PAGE | ~1203 |
| 1ST LOGICAL PAGE INFO | ~1204 |
| 2ND LOGICAL PAGE INFO | ~1205 |
| ... | ~1206 |
| NTH LOGICAL PAGE INFO | ~1207 |

FIG. 13

| | |
|---|---|
| ARRANGEMENT OF LOGICAL PAGES IN PHYSICAL PAGE | ~1301 |
| OBVERSE/REVERSE SIDE OF DUPLEX PRINT | ~1302 |
| COLOR/MONOCHROME PRINT | ~1303 |
| ADDITIONAL INFO | ~1304 |

FIG. 14

| | |
|---|---|
| LOGICAL PAGE ID | ~1401 |
| LOGICAL PAGE NO. | ~1402 |
| FORMAT INFO | ~1403 |

| SETTING | EXAMPLE |
|---|---|
| 1 FOR 1 COMPOSED JOB | NO. OF COPIES, STAPLING, ... |
| SEVERAL IN MIXTURE FOR 1 COMPOSED JOB | LAYOUT (N-UP), PAGE FRAME, WATER MARK, TERMINOLOGY, PAPER SUPPLY PORT |

FIG. 29

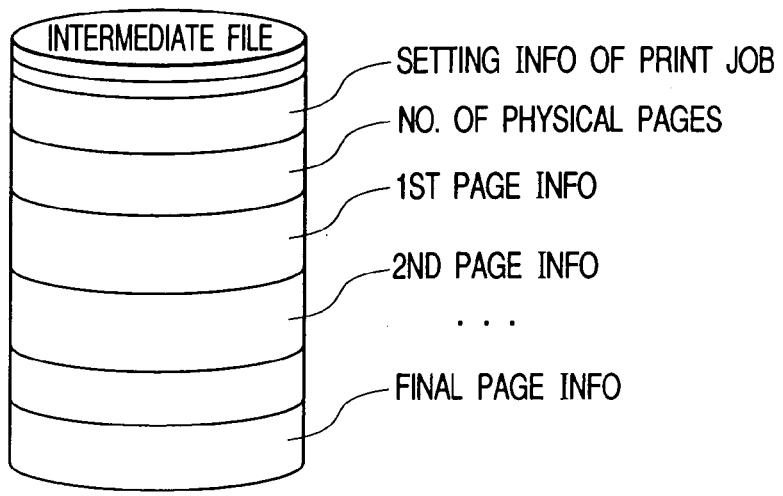

- SETTING INFO OF PRINT JOB
- NO. OF PHYSICAL PAGES
- 1ST PAGE INFO
- 2ND PAGE INFO
- . . .
- FINAL PAGE INFO

INTERMEDIATE FILE

FIG. 31A

| NO. OF ELEMENT JOBS IN COMPOSED JOB |
| 1ST JOB ID IN COMPOSED JOB |
| 2ND JOB ID IN COMPOSED JOB |
| . . . |
| NTH JOB ID IN COMPOSED JOB |

FIG. 31B

| NO. OF ELEMENT JOBS IN COMPOSED JOB |
| 1ST JOB ID IN COMPOSED JOB |
| ~~2ND JOB ID IN COMPOSED JOB~~ |
| |
| NTH JOB ID IN COMPOSED JOB |

DECREASE NO. OF JOBS

DELETE JOB AND SHIFT REST

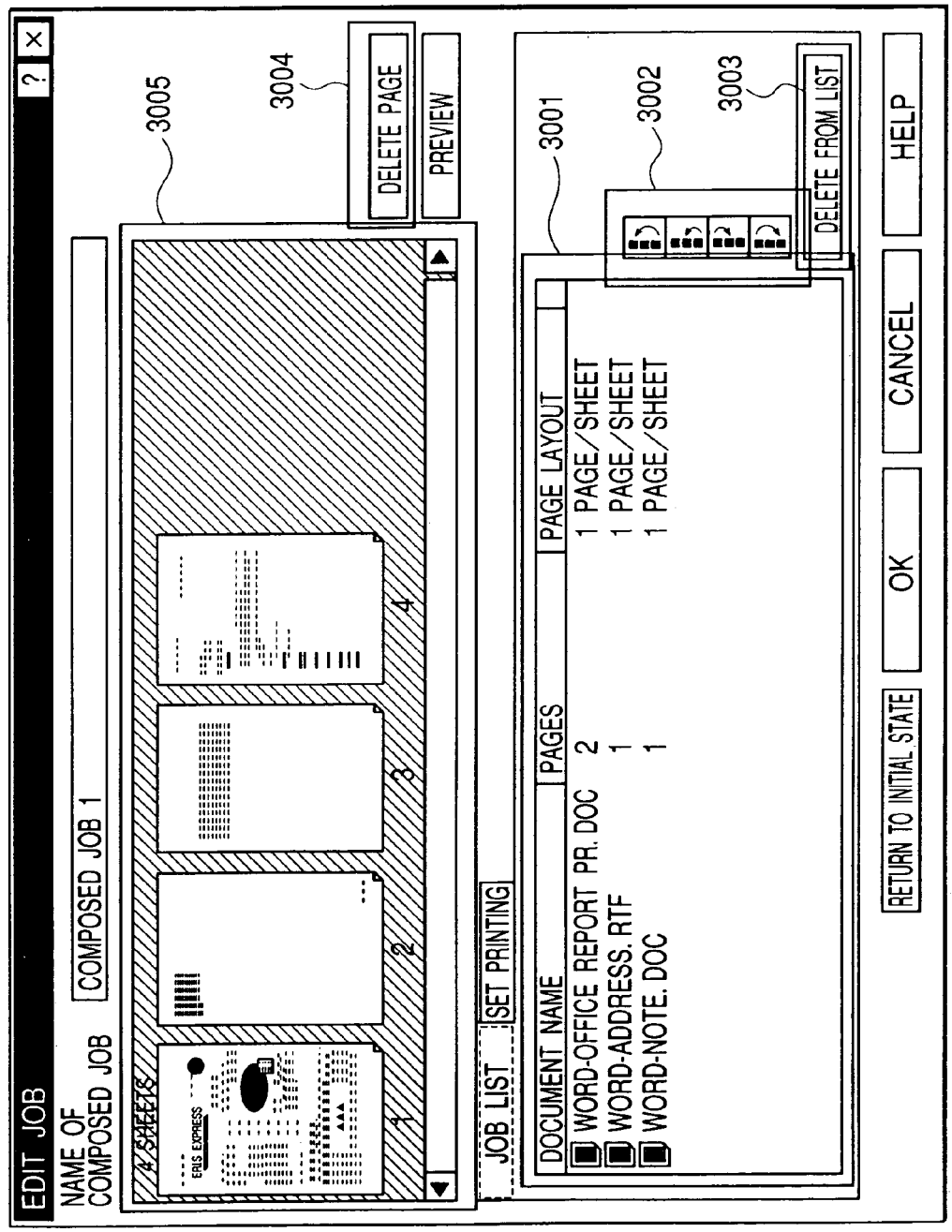

INFORMATION PROCESSOR, METHOD FOR PROCESSING INFORMATION AND MEMORY MEDIUM FOR STORING PROGRAM READABLE BY COMPUTER

BACKGROUND OF THE INVENTION

1. Field of the Invention

The present invention relates to an information processor for generating printing data to be transmitted to a printing device, a method for processing information and a memory medium, and more particularly to a technique for composing one print job by a plurality of print requests in a host computer.

2. Related Background Art

Conventionally, in the case where one document (document data) generated in an application is printed in the host computer, a set of print setting attributes composed of a plurality of print setting items previously set by a printer driver has been ordinarily defined for one print job generated from the document.

There has been known software having a "collective printing" function by which the document data instructed to be printed by the application is not outputted to a printer and held in a client, that is to say, a host computer and a plurality of document data is simultaneously transmitted to the printer as one job.

In the case where a user has hitherto wished to simultaneously print the print jobs generated by, for instance, an application A suitable for preparing documents, an application B suitable for preparing charts or tables, an application C suitable for preparing drawings, etc., however, the "collective printing" function has been disadvantageously inferior in its maneuverability, because the "collective printing" function only serves to collect a plurality of print jobs together to one print job, and, because upon printing data, the data is outputted in regular order according to which the data is spooled for the collective printing in response to the instruction of collective printing, so that the user must spool the data on outputted pages. For instance, in the case where the user wishes to print data composed of a document, a drawing, a document, a table and a document each of which is written on one page, the user has inconveniently needed to prepare a first page by the application A and spool it, prepare a second page by the application B and spool it, prepare a third page again by the application A and spool it, prepare a fourth page by the application C and spool it and prepare a fifth page by the application A and spool it.

Further, in the case where the user wishes to see the preview of data collected together as one data to be printed, the user can see the preview provided by each application, however, it has been impossible for the user to see the preview based on a plurality of print settings set by the printer driver.

Still further, in the case where the user wishes to put a plurality of files together and print them as one print job, when the user tries to carry out a designation of finishing relative to the print job thus obtained, there is no means for providing the designation of finishing relative thereto. There is undesirably provided no means having a preview function either. Therefore, unless the user prints the data, the user cannot disadvantageously understand how the data is actually printed and outputted by the printer.

Still further, in the case where the "collective printing" is employed to use a page layout function (N pages/sheet) in a device side, the same page layout processing can be carried out relative to a plurality of jobs, however, the print jobs cannot be combined together while a different layout is applied to each of the original print jobs.

As described above, the conventional "collective printing" only functions as a continuous printing, and therefore, one print job cannot be prepared by using a different layout for each page.

Further, as described above, according to the prior art, only one page layout can be provided for one job. Therefore, in the case where one job is formed for the collective printing, the user cannot designate the page layout when the print jobs are previously outputted from the applications for the collective printing, that is to say, printing the print jobs in one lot, so that the user has needed to select only one page layout upon collective printing.

SUMMARY OF THE INVENTION

Thus, it is an object of the present invention to provide an arrangement for combining together print jobs respectively having print setting information.

Further, when one composed job is formed by combining together a plurality of print jobs respectively having the print setting information, if the print jobs are respectively separately set for printing operation, any mechanism will be needed for unifying a plurality of settings. Accordingly, it is another object of the present invention to provide an arrangement by which a user can understand what is changed to unify the settings upon automatic unification.

Still further, it is a still another object of the present invention to provide a function for managing and editing functions for each job after a plurality of print jobs are put together, for instance, a function for rearranging a print order for each job irrespective of an order in which the print jobs are printed and a function for deleting the print jobs from a composed job for each job or returning the composed job to a plurality of original single jobs.

Still further, it is a still another object of the present invention to provide an arrangement by which the print jobs can be edited on each logical page, for instance, unnecessary pages can be deleted.

Still further, it is a still another object of the present invention to provide an arrangement by which the composed job is returned to original single jobs after the composed job is edited on each page.

Furthermore, by taking the above described problems into consideration, it is a further object of the present invention to combine together print jobs to which page layout designations are respectively applied, while the page layout designations are maintained.

In addition, it is a further object of the present invention to unify layouts relative to a composed job having a plurality of page layouts for each physical page.

For attaining the above described objects, an information processor according to the present invention has such a configuration as described below. Specifically, an information processor for generating printing data to be transmitted to a printing device comprises a spooler for converting data to be printed which is generated by an application into print jobs and temporarily storing the print jobs; a composition instructing unit for instructing a plurality of print jobs corresponding to the different data to be printed to be combined together so as to generate one composed job; and a setting unifier for analyzing the print setting information of a plurality of print jobs when the composition instructing unit instructs the plurality of print jobs to be combined together so as to obtain one composed job, and generating print setting information for the composed job by unifying information which can be respectively merely set to one print job.

Further, the setting unifier further includes a recognizing unit for analyzing the print setting information of a plurality of print jobs to be combined together and recognizing to select whether the settings are unified or the print jobs are not combined together when information which can be set only to one print job is mutually different.

Still further, the spooler converts the data to be printed into the print jobs of intermediate code format and temporarily stores the print jobs as page description files for each page.

Still further, information for designating the page description files laid out on a physical page is added to the print setting information of the composed job.

Still further, the above described print setting information is temporarily stored as a print setting file of each print job.

Still further, the information processor further comprises a preview display controller for controlling a preview based on the print setting information of the print jobs or the composed job to be displayed.

Still further, the information processor further comprises an order controller for operating a plurality of print jobs in the composed job to reshuffle the order of the print jobs.

Still further, the information processor further comprises a job cancelling unit for operating a plurality of print jobs in the composed job to cancel a specific print job.

Still further, the information processor further comprises a job divider for dividing the composed job into a plurality of print jobs before they are joined together.

Still further, the information processor further comprises a job duplicating unit for designating the print job or the composed job to prepare the duplication of the designated print job.

Still further, the print job or the composed job further includes a setting initializing unit for returning the intermediate code format as the base of the job to an initial state upon preparation of the data based on the print setting information.

Still further, the information processor further comprises a page editing unit for cancelling a page designated relative to a logical page in the print job or the composed job.

Still further, the information processor further comprises a printing data generator for generating the printing data to be transmitted to the printing device on the basis of the data of the intermediate code format which is temporarily stored by a intermediate code converter.

Still further, the information processor further comprises a description instruction generator for converting the data of the intermediate code format temporarily stored by the intermediate code converter into a description instruction which can be interpreted by the description unit of an OS for outputting; and a print instruction allocator for sending the print instruction received through the description unit of the OS from the application to the intermediate data converter and sending the print instruction received through the description unit of the OS from the description instruction generator to the printing data generator.

In addition, the description instruction is a GDI function, the print instruction is a DDI function and the printing data is a printer language.

Furthermore, the information processor further comprises a layout unification instructing unit for instructing the layout information of the composed job to be unified and the composed job information generator unifies the layout information of the composed job by all physical pages when the layout unification instructing unit instructs the layout information to be unified.

Besides, the present invention can be realized by a method for controlling the image processor, a memory medium in which a program is stored or a computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a view showing one example of a data format delivered when the spool file manager 304 supplies a print request for a physical page to the despooler 305;

FIG. 11 is a view showing one example of a data format delivered when the spool file manager 304 supplies a print request for a physical page to the despooler 305;

FIG. 12 is a view showing one example of a data format delivered when the spool file manager 304 supplies a print request for a physical page to the despooler 305;

FIG. 13 is a view showing one example of a data format delivered when the spool file manager 304 supplies a print request for a physical page to the despooler 305;

FIG. 14 is a view showing one example of a data format delivered when the spool file manager 304 supplies a print request for a physical page to the despooler 305;

FIG. 29 shows one example of the inner structure of an intermediate file;

FIG. 30 shows one example of a screen for editing the composed job;

FIGS. 31A and 31B show one example of data processings such as reshuffling the order of the composed jobs and cancelling them for each job;

DETAILED DESCRIPTION OF THE PREFERRED EMBODIMENTS

Now, preferred embodiments to which the present invention is applicable will be described below.

Figure 1:
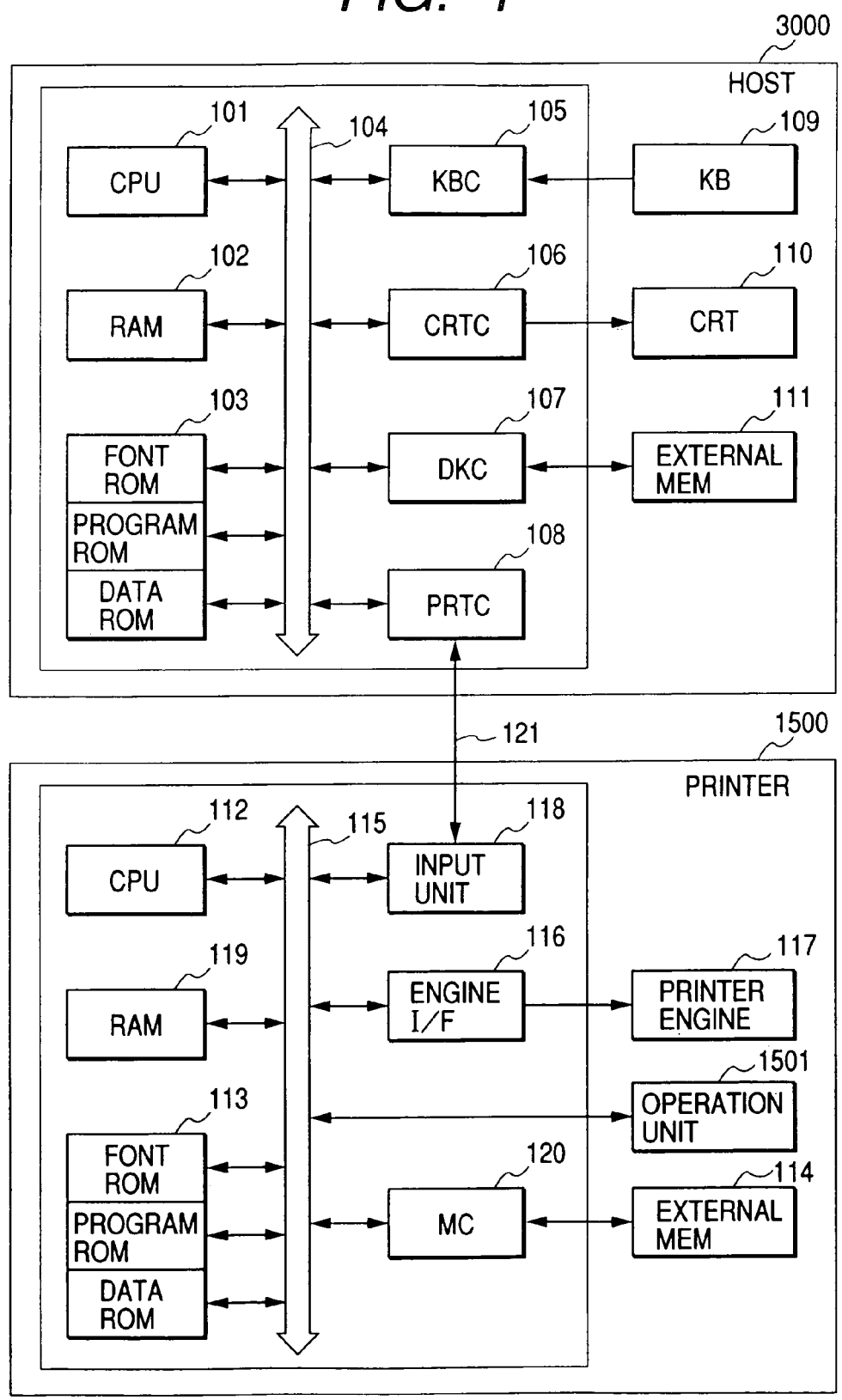
FIG. 1 is a block diagram for explaining the configuration of a print controller showing an embodiment of the present invention.

FIG. 1 is a block diagram for explaining the configuration of a printer control system showing an embodiment of the present invention. The present invention is applicable to any printer control system by which the functions of the present invention can be executed, such as a system composed of a single device or a plurality of devices, a system which is connected through a network such as LAN, WAN, etc. to perform various processings.

In FIG. 1, a host computer 3000 is provided with a CPU 101 for executing a document processing in which graphic forms, images, characters, tables (including table calculations), etc. are mixed on the basis of a document processing program or the like stored in the ROM for program of a ROM 103 or an external memory 111. The CPU 101 generally controls respective devices connected to a system bus 104. In the ROM for program of the ROM 103 or the external memory 111, an operating system program (called an OS, hereinafter) as a control program of the CPU 101 is stored. In a ROM for font of the ROM 103 or the external memory 111, font data employed for a document processing is stored. In a ROM for data of the ROM 103 or the external memory 111, various kinds of data used for carrying out the document processing are stored. A RAM 102 functions as the main memory, the work area of the CPU 101.

A keyboard controller (KBC) 105 controls a key input from a keyboard 109 or a pointing device not shown. A CRT controller (CRTC) 106 controls the display of a CRT display (CRT) 110. Reference numeral 107 designates a disk controller (DKC) and controls an access to the external memory 111 such as a hard disk (HD), a floppy disk (FD), etc. for storing a boot program, various kinds of applications, font data, a user file, an edit file, a printer control command generating program (called a printer driver, hereinafter), etc. A printer controller (PRTC) 108 is connected to a printer 1500 through a two-way interface 121 to control a communication with the printer 1500.

The CPU 101 expands (rasterizes), for example, an outline font to display information RAM set on the RAM 102 to enable WYSIWYG on the CRT 110. Further, the CPU 101 opens various kinds of windows registered on the basis of commands instructed by a mouse cursor not shown on the CRT 110 to perform a variety of data processings. When a user performs a printing operation, the user opens a window concerning a setting of print to perform the setting of the printer or the setting of a print processing method relative to the printer driver including the selection of a print mode.

The printer 1500 is controlled by a CPU 112. The printer CPU 112 outputs an image signal as output information to a printer engine 117 connected to a system bus 115 on the basis of a control program stored in the ROM for program of a ROM 113 or a control program stored in an external memory 114 or the like. Further, in the program ROM of the ROM 113, the control program of the CPU 112 is stored. In the ROM for font of the ROM 113, font data or the like for generating the output information is stored. In the ROM for data of the ROM 113 is stored information utilized on the host computer, in the case of a printer having no external memory 114 such as a hard disk.

The CPU 112 can communicate with the host computer through an input unit 118 so as to inform the host computer 3000 of the information or the like in the printer. A RAM 119 is a RAM which functions as the main memory or the work area of the CPU 112 and is designed to expand a memory capacity by an option RAM connected to an extended port not shown. The RAM 119 is employed for an output information expanded area, an environmental data stored area, an NVRAM, etc. The access of the above described external memory 114 such as the hard disk (HD), an IC card, etc. is controlled by a memory controller (MC) 120. The external memory 114 is connected as an option to store font data, an emulation program, form data, etc. Reference numeral 1501 denotes an operation panel on which switches for operation and an LED display devices or the like are arranged.

The number of the above described external memory 114 is not limited to one and a plurality of external memories may be provided. A plurality of external memories, in which option cards as well as an integrated font and programs which can interpret printer control languages different in their language system are stored, may be connected together.

Further, an NVRAM not shown may be provided so as to store printer mode setting information from the operation panel 1501.

Figure 2:
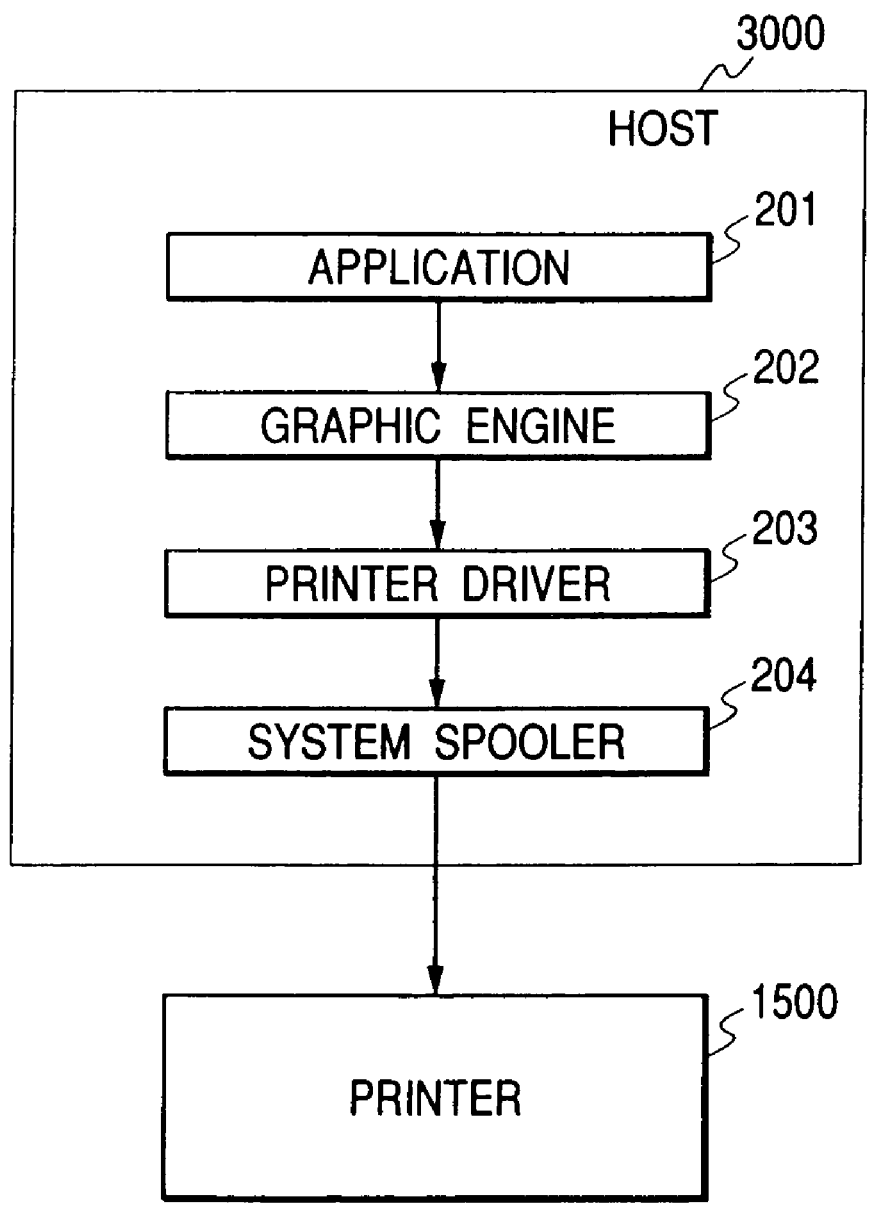
FIG. 2 is a block diagram showing a representative print system of a host computer to which a printer is connected.

FIG. 2 is a block diagram showing a representative printing process in the host computer to which a printing device such as the printer is directly connected or via a network. An application 201, a graphic engine 202, a printer driver 203 and a system spooler 204 are program modules with which the RAM 102 is loaded and which are executed by the OS or modules using its module, when they exist as files stored in the external memory 111 and are executed. Further, the application 201 and the printer driver 203 can be added to the HD of the external memory 111 via the FD of the external memory 111, a CD-ROM not shown or a network not shown. The application 201 stored in the external memory 111 with which the RAM 102 is loaded is executed by the RAM 102. When the printing operation is carried out on the printer 1500 from the application 201, an output (image description) is performed by using the graphic engine 202 with which the RAM 102 is similarly loaded to be executable.

The graphic engine 202 similarly loads the RAM 102 with the printer driver 203 prepared for each printing device from the external memory 111 and sets the output of the application 201 to the printer driver 203. Then, the graphic engine 202 converts a GDI (Graphic Device Interface) function received from the application 201 into a DDI (Device Driver Interface) function and outputs the DDI function to the printer driver 203. The printer driver 203 converts the DDI function received from the graphic engine 202 into a control command, for instance, a PDL (Page Description Language) which can be recognized by the printer. The printer control command thus obtained is adapted to be outputted to the printer 1500 as printing data through the interface 121 via the system spooler 204 with which the RAM 102 is loaded by the OS.

Figure 3:
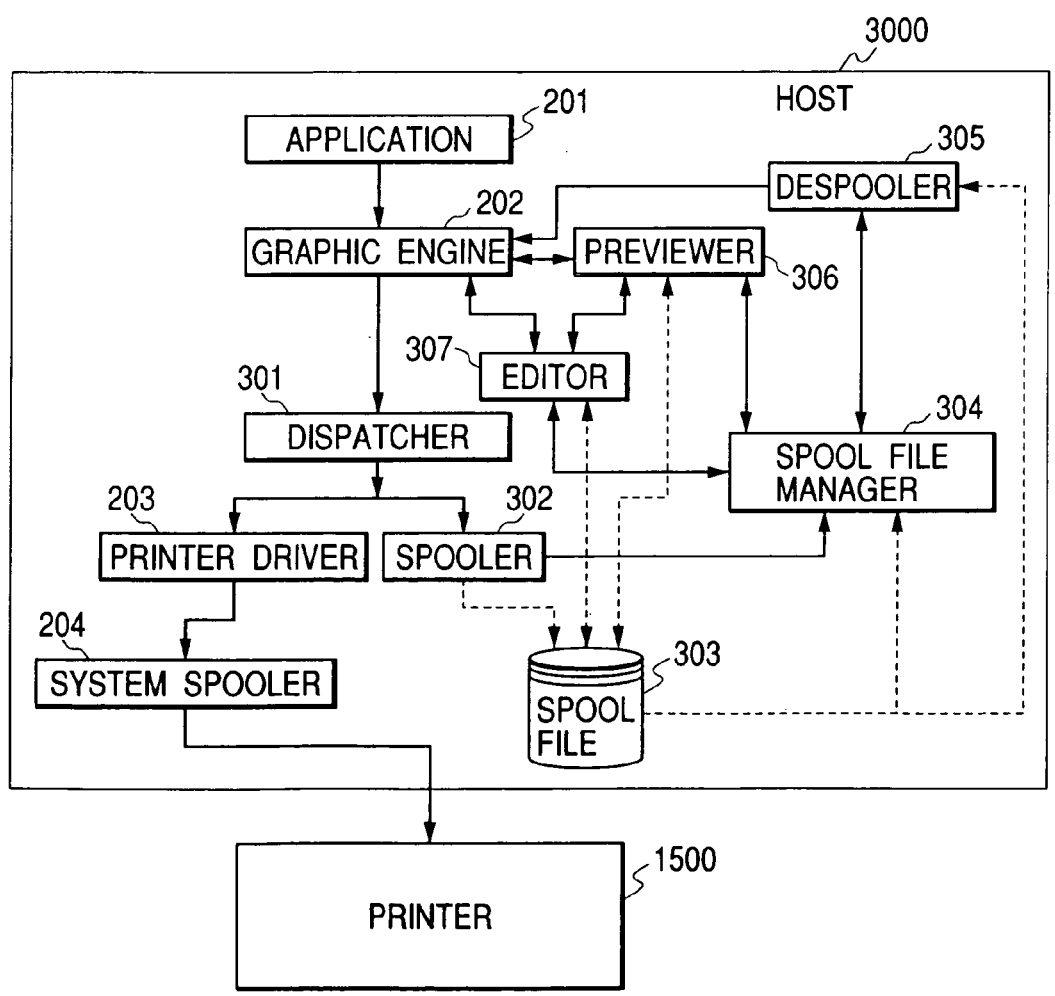
FIG. 3 is a block diagram showing the configuration of the print system for temporarily spooling an intermediate code before a print instruction from an application is converted into a printer control command.

The print system according to the present embodiment comprises a configuration in which the printing data from the application is temporarily spooled by intermediate code data as shown in FIG. 3 in addition to the print system having the host computer and the printer as shown in FIG. 2.

A system shown in FIG. 3 is formed by extending the system shown in FIG. 2 and is configured to temporarily generate a spool file 303 composed of the intermediate code when a print instruction is sent to the printer driver 203 from the graphic engine 202. In the system shown in FIG. 2, the application 201 is released from the printing process when the printer driver 203 completely converts all the print instructions from the graphic engine 202 into the control commands of the printer. On the other hand, in the system shown in FIG. 3, the application is released from the printing process when a spooler 302 converts all the print instructions into the intermediate code data and outputs the intermediate code data to the spool file 303. The latter ordinarily takes a shorter time than the former. Further, in the system shown in FIG. 3, the contents of the spool file 303 can be processed. Thus, can be realized functions which are not provided in the application, such as enlargement/reduction, reduction and print of a plurality of pages to one page, etc. relative to the printing data from the application.

For achieving these objects, the system has been adapted to be extended in such a manner that the printing data is spooled by the intermediate code data as shown in FIG. 3 as compared with the system shown in FIG. 2. In order to process the printing data, a setting is ordinarily carried out from a window provided by the printer driver 203. The printer driver 203 stores the contents of the setting on the RAM 102 or in the external memory 111.

Now, the detail of the print system shown in FIG. 3 will be described below. As shown in FIG. 3, according to the extended processing system, a dispatcher 301 receives the DDI function as the print instruction from the graphic engine 202. In the case where the print instruction (DDI function) that the dispatcher 301 receives from the graphic engine 202 is based on the print instruction (GDI function) sent to the graphic engine 202 from the application 201, the dispatcher 301 loads the RAM 102 with the spooler 302 stored in the external memory 111 and transmits the instruction (DDI function) not to the printer driver 203 but to the spooler 302.

The spooler 302 analyzes the received print instruction, converts it into the intermediate code for each page and outputs the intermediate code to the spool file 303. The spool file of the intermediate code stored for each page is called a page description file (PDF). The spooler 302 obtains from the printer driver 203 the processed settings of the printing data set to the printer driver 203 (Nup, duplex printing, stapling, color/monochrome designations, etc.) and stores them in the spool file 303 as files for each job. The setting file stored for each job is called a job setting file (also called simply a SDF: Spool Description File). The job setting file will be described later. The spool file 303 is generated on the external memory 111, however, it may be generated on the RAM 102. Further, the spooler 302 loads the RAM 102 with a spool file manager 304 stored in the external memory 111 and informs the spool file manager 304 of the status of generation of the spool file 303. Then, the spool file manager 304 decides whether or not a printing operation can be performed in accordance with the contents of the processed setting of the printing data stored in the spool file 303.

When the spool file manager 304 decides that the printing operation can be performed by employing the graphic engine 202, the spool file manager 304 loads the RAM 102 with a despooler 305 stored in the external memory 111 and instructs the despooler 305 to print the page description file of the intermediate code described in the spool file 303.

The despooler 305 processes the page description file of the intermediate code included in the spool file 303 in accordance with the job setting file having the process setting information included in the spool file 303 to regenerate the GDI function, and outputs again the GDI function via the graphic engine 202.

In the case where the print instruction (DDI function) which the dispatcher 301 receives from the graphic engine 202 corresponds to a print instruction based on a print instruction (GDI function) supplied to the graphic engine 202 from the despooler 305, the dispatcher 301 sends the print instruction not to the spooler 302 but to the printer driver 203.

The printer driver 203 generates a printer control command composed of a page description language or the like on the basis of the DDI function got from the graphic engine 202, and outputs the command to the printer 1500 via the system spooler 204.

Further, referring to FIG. 3, there is shown an example in which a previewer 306 and a setting change editor 307 are added to the extending system explained so far so that a print can be previewed, a print setting can be changed, and a plurality of jobs can be composed together.

Figure 9:
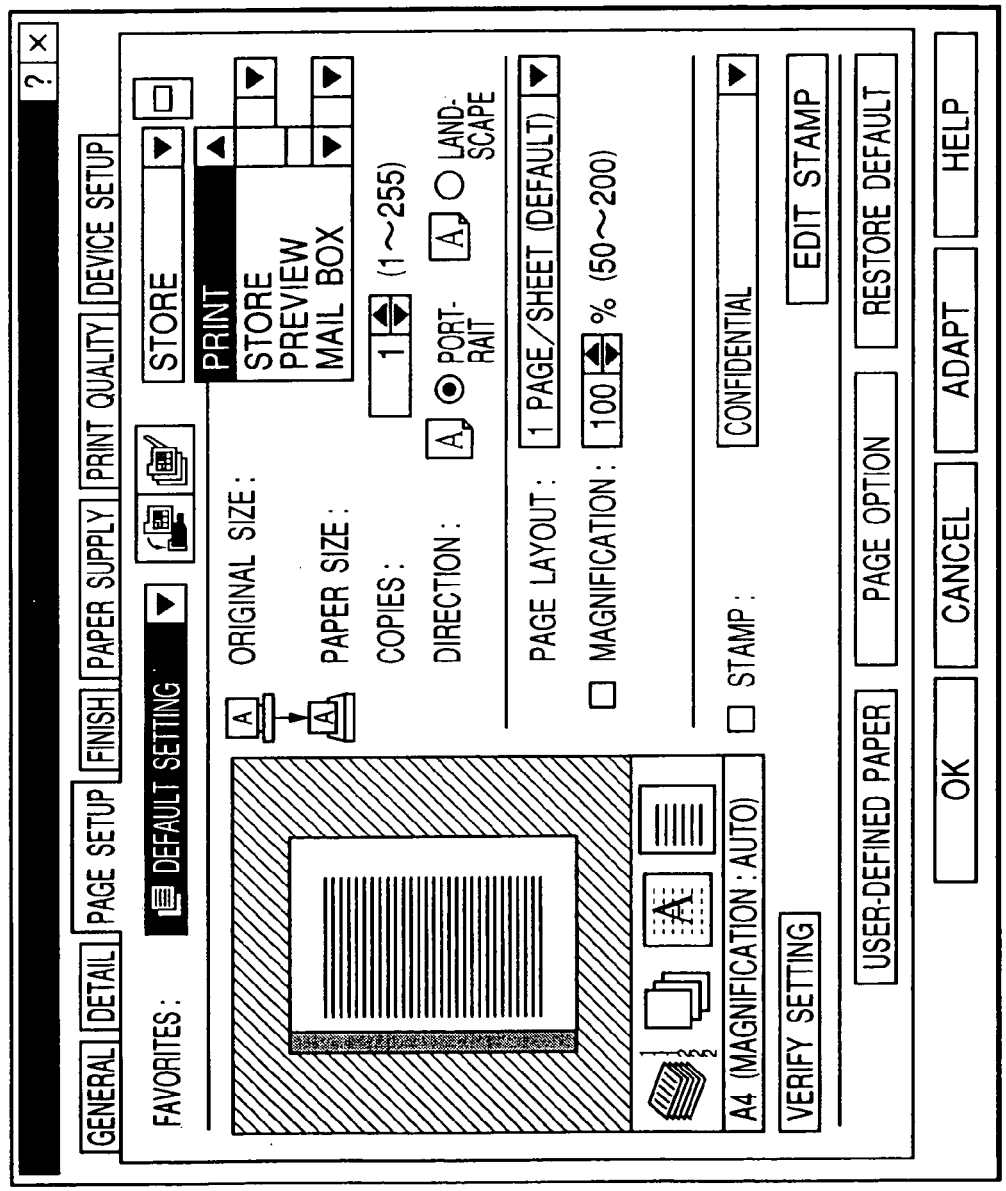
FIG. 9 shows one example of a print spool setting screen.

In order to preview the print, change the print setting and compose a plurality of jobs together, the user needs to first designate "store" in a pull-down menu as means for "designating an output destination" in the property of the printer driver shown in FIG. 9. When the user wishes to see only the preview, the user can select a "preview" as the designation of the output destination.

Figure 16:
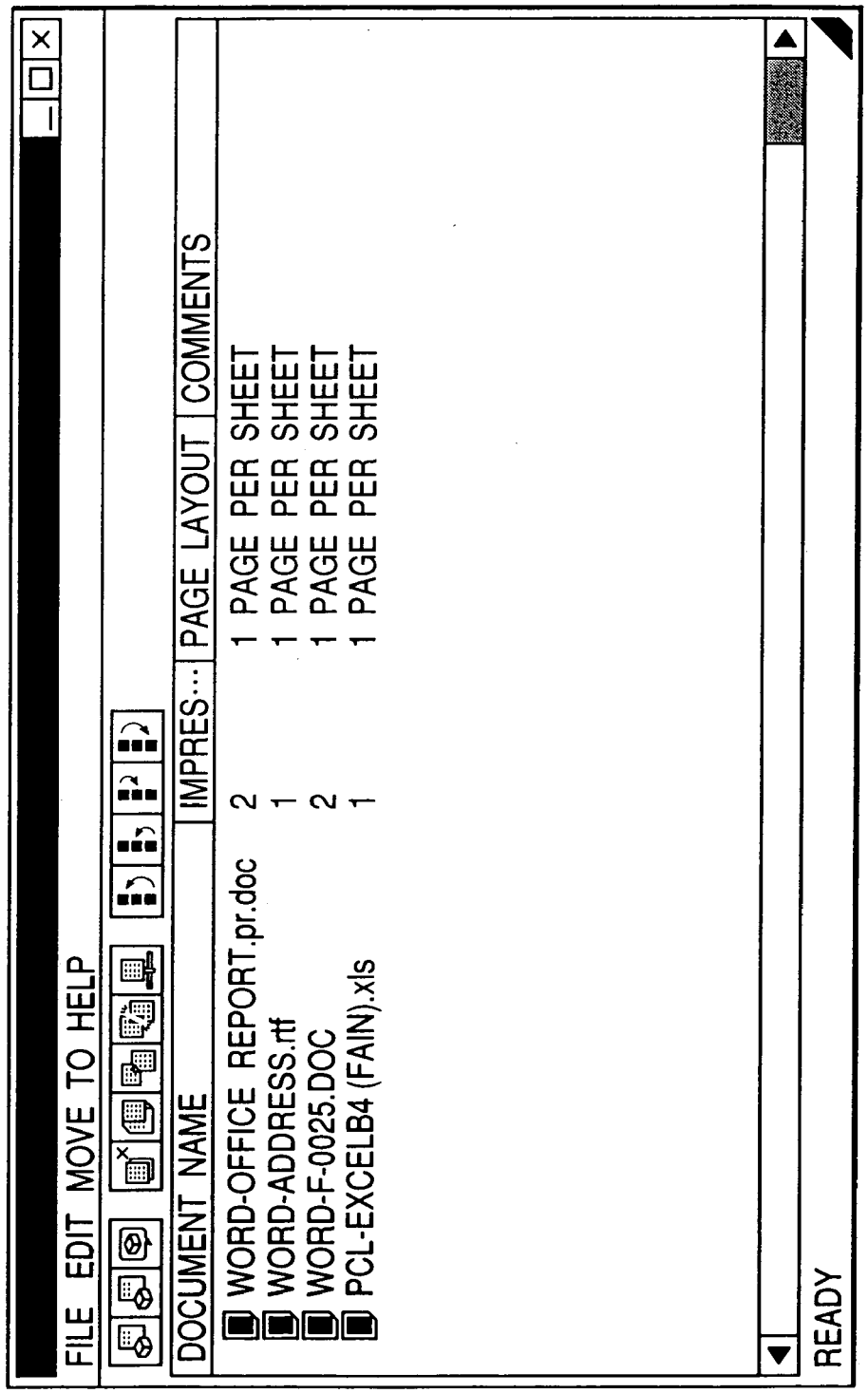
FIG. 16 shows one example of a screen displaying a print job list spooled in the spool file manager 304.

Contents set in the property of the printer driver as described above are stored as setting files in a structure body (called DEVMODE, in Windows OS) provided by the OS. In the structure body, for instance, there is included a setting as to whether a store is carried out in the spool file manager 304, for example, during the process setting included in the spool file 303. The spool file manager 304 reads out the process setting through the printer driver, and when the store is designated, the page description file and the job setting file are generated and stored in the spool file 303 as described above. Then, the window screen of the spool file manager is popped up as illustrated in FIG. 16 and the jobs spooled in the spool file 303 are listed up and displayed. FIG. 16 shows an example in which four jobs are spooled. Thus, the jobs can be operated by pushing down a menu bar or a menu icon just below it. The number of operations of the menu bar is equal to that of the menu icon. There are eleven kinds of operations, such as "print" while the job is selected, "print conservatively" for printing by leaving the spool file of the intermediate code as it is, "preview" for seeing the output preview of the job by considering the print setting, "delete" for deleting the spool file of the intermediate code, "duplicate" for generating a copy of the spool file of the intermediate code, "compose" for composing together a plurality of jobs of the spool file of the intermediate code to obtain one job, "divide" for dividing the composed job into a plurality of original jobs, "job edit" for changing the print setting (layout setting, finishing setting, etc.) of a single job or the composed job, "move to the first" for moving a job to the top in print order, "move faster by one" for moving a job faster by one in print order, "move slower by one" for moving a job slower by one in print order and "move to the last" for moving a job to the last in print order.

When the preview of a single job or the composed job is designated on the window screen (see FIG. 16) of the spool file manager, the RAM 102 is loaded with the previewer 306 stored in the external memory 111 to instruct the previewer 306 to execute the preview processing of the job of the intermediate code described on the spool file 303.

The previewer 306 sequentially reads the page description files (PDF) of the intermediate code contained in the spool file 303, processes them in accordance with the contents of the process setting information included in the job setting file (SDF) stored in the spool file 303 and outputs the GDI function to the graphic engine 202. Then, the graphic engine 202 outputs description data to a client area of itself, so that the data can be outputted onto the screen.

The graphic engine 202 can perform a suitable rendering depending on a designated output destination. Accordingly, there can be realized a method in which the previewer 306 processes the intermediate codes included in the spool file 303 in accordance with the contents of the process setting contained in the spool file 303 and outputs the data thus obtained by employing the graphic engine 202, like the despooler 305. As described above, the process setting set by the printer driver is stored in the spool file 303 as the job setting file and the data of the page description file is processed on the basis of the job setting file and the processed data is outputted. Thus, can be provided for the user a print preview, as to how actual description data is printed, further print previews near those outputted by the printer respectively according to the cases where Nup (N logical pages are reduced, arranged and printed on one physical page) is designated, a duplex side print is designated, a binding print is designated and a stamp is designated. A preview function of an application software for preparing a document in the prior art serves to basically describe an image on the basis of the page setting of the application, so that the print setting of a printer driver is not effected and the user cannot recognize a preview whose print is actually outputted.

Figure 17:
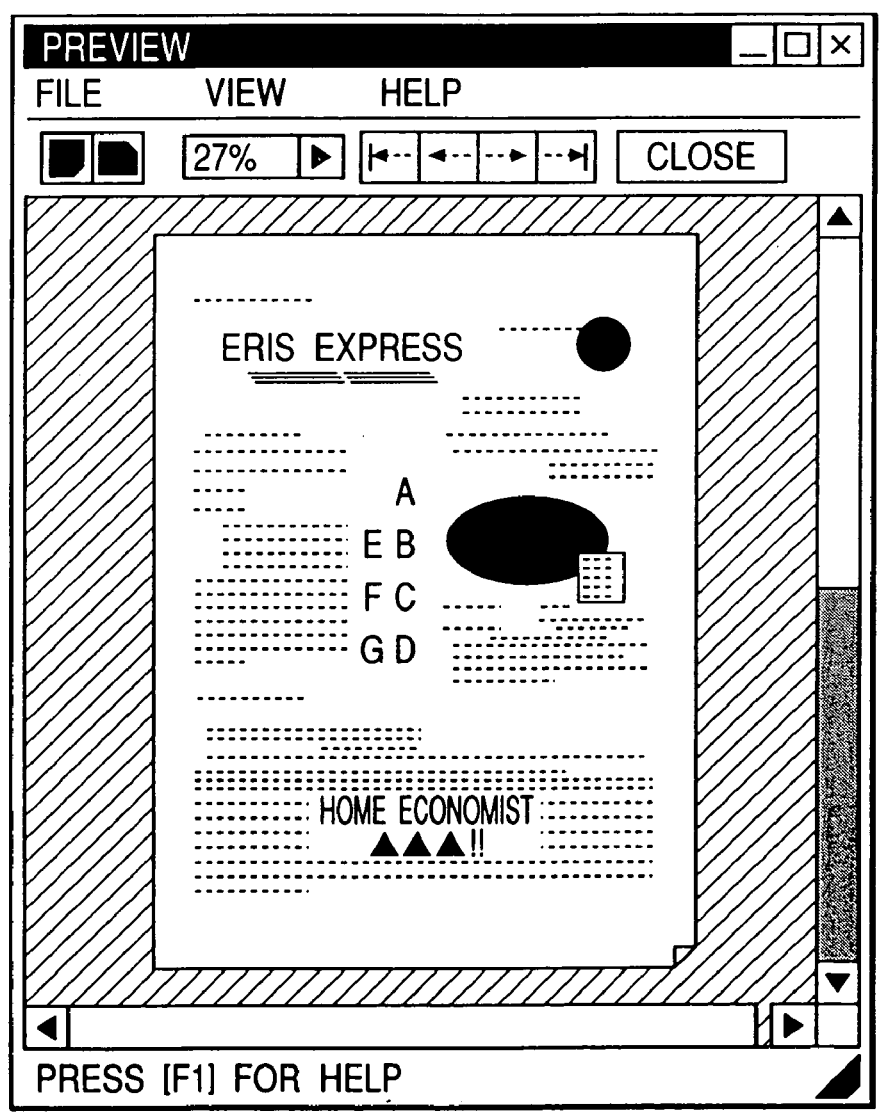
FIG. 17 shows one example of a screen of a previewer 306.

As described above, the preview processing is carried out, so that the large preview of the process setting of print included in the spool file 303 is displayed on a screen by the previewer 306 as illustrated in FIG. 17. After that, the previewer 306 is closed in accordance with the non-display instruction of the user to shift a control to the window screen (see FIG. 16) of the spool file manager.

Then, when the user prints the data in accordance with the contents displayed by the previewer 306, the user designates the "print" or the "print conservatively" on the spool file manager 304 to supply a print request. In the print request, the page description file is processed by the despooler 305 on the basis of the job setting file to generate the GDI function, the GDI function is transmitted to the graphic engine 202 and the print instruction is sent to the printer driver 203 via the dispatcher 301 to perform the printing operation.

Now, a setting change will be described by using the setting change editor 307.

A method for realizing the setting change can be set to a job to which the "store" is designated in FIG. 9 like the preview. The spool file manager 304 is popped up in accordance with a similar flow so that the spooled jobs are listed and displayed. On the window screen (see FIG. 16) of the spool file manager, when the "job edit" is designated and the setting change is instructed, the RAM 102 is loaded with the setting change editor 307 stored in the external memory 111 to instruct the setting change editor 307 to display a current or default process setting. Then, a job setting screen as illustrated in FIG. 18 is displayed.

Figure 18:
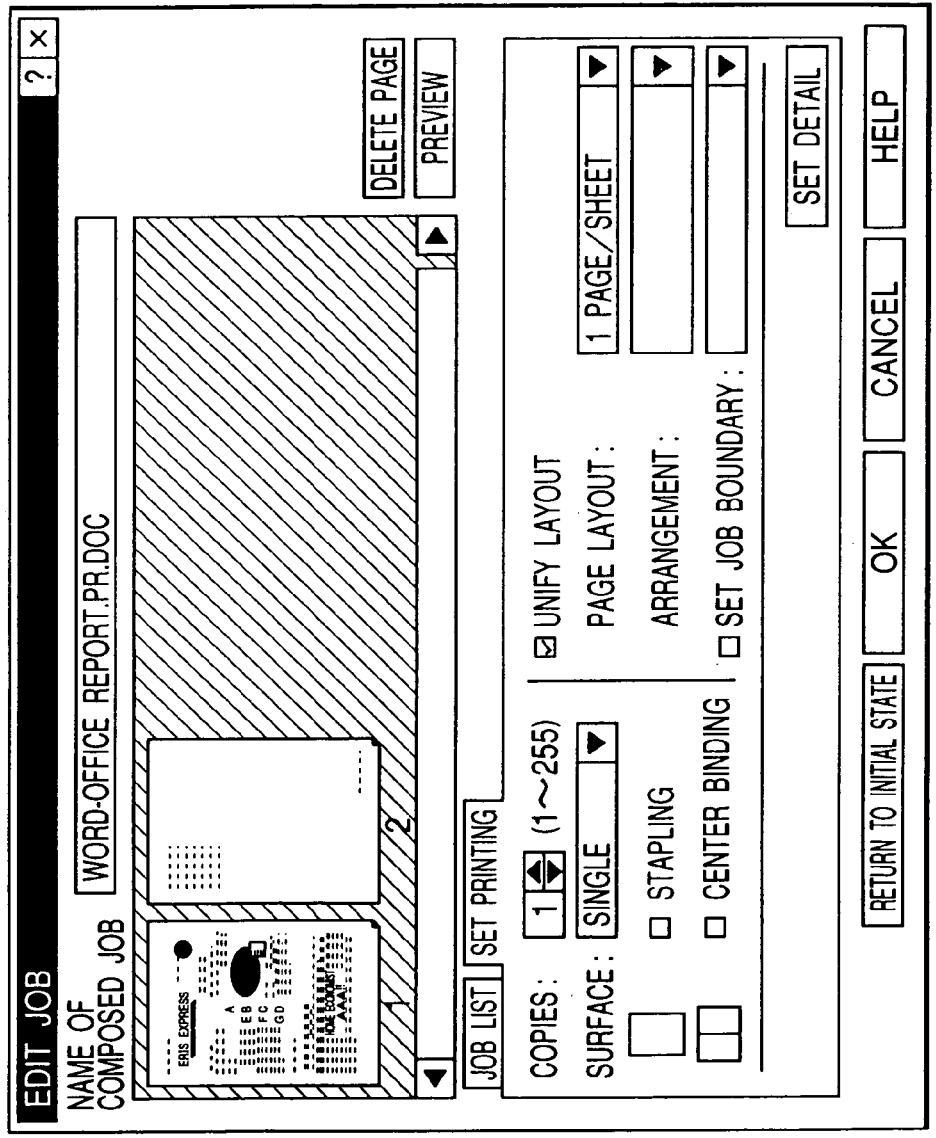
FIG. 18 shows one example of a screen of the setting change editor 307.

The setting change editor 307 obtains the job setting file of a job to which the "job edit" is designated from the spool file 303 to change the default values of the job setting screen shown in FIG. 18 on the basis of the setting items designated in the job setting file. Referring to an example shown in FIG. 18, in the job setting file of the job to which the "job edit" is designated, the number of copies: one, a printing method: a single side printing, stapling: no, layout: one page/sheet, etc. are designated.

Also in the setting change editor 307, the page description file of the intermediate code included in the spool file 303 is processed in accordance with the contents of the process setting contained in the job setting file stored in the spool file 303 and the processed file is outputted to its client area by using the graphic engine 202, so that a small preview on the screen shown in FIG. 18 can be outputted.

Further, the contents of the process setting included in the job setting file stored in the spool file 303 can be changed and corrected therein. At that time, items which can be set by the printer driver 203 may be provided in a user interface on the setting change editor 307 or the user interface of the printer driver 203 itself may be accessed. As shown in FIG. 18, fractions, a printing method (single side printing, duplex side printing, binding printing), stapling (saddle finisher, etc.), page layout, arrangement order, etc. can be designated. Further, if a "detail setting" is pushed down, most of the items which can be designated by the printer driver can be reset. In this case, the setting concerning the grade of printing or the printing quality such as a resolution, a graphic mode, etc. is not allowed to be changed.

As for the items changed here, the changes thereof are verified in accordance with a verification request on the setting change editor 307 to shift a control to the spool file manager 304. For the items whose changes are verified, the changes of the print setting thereof are not stored in an original job setting file but stored in a new setting file formed for outputting a job which is used for editing the job or the like. The setting file for outputting a job will be described in more detail after FIG. 10.

Then, if the user performs a printing operation in accordance with the contents of the changed setting like the recognition by the previewer 306, the user issues a print request on the spool file manager 304. The print request is transmitted to the graphic engine 202 and the print instruction is sent to the printer driver 203 via the dispatcher 301 to perform the printing operation.

Further, on the window screen (see FIG. 16) of the spool file manager, it is possible to designate that a plurality of jobs are composed together to print them as one print job. The above designation can be executed for the job to the output destination of which the "store" is designated in the property of the printer driver shown in FIG. 9 similarly to the preview and the setting change.

When the user combines the print jobs together, the user initially accesses the printer driver 203 from the application 201 to select the store on the user interface as shown in FIG. 9. As described above, the print jobs are stored in the spool file 303 in accordance with this selection and the window screen (see FIG. 16) of the spool file manager is popped up as illustrated in FIG. 16. The list of the spooled jobs is displayed on the window of the spool file manager. The same operation is carried out from the application 201, so that the list of a plurality of jobs is displayed on the spool file manager 304.

Here, when the plurality of jobs are selected and the "composition" is designated, the RAM 102 is loaded with the setting change editor 307 stored in the external memory 111 to instruct the setting change editor 307 to display the process setting of a first job or a default on the list. Then, a composition setting screen as shown in FIG. 18 is displayed. Here, although the setting change editor 307 is used as the composition setting screen, it is to be understood that another module may be employed.

The setting change editor 307 processes the page description file of the intermediate code included in the spool file 303 on the basis of the contents of the process setting included in the job setting information stored in the spool file 303, and outputs the processed file to its own client area by employing the graphic engine 202 relative to all the jobs designated as the composed jobs to output the processed file on the screen. At that time, the small previews of all the jobs selected in a preview area shown in FIG. 18 can be seen. Further, when the composed job is formed, setting files for outputting jobs in which the job setting files of respective single jobs are extended are formed. The setting file for outputting the job is also formed when the job is edited. One setting file is generated for one job. In the case of one composed job, one setting file is also formed.

The respective jobs can be displayed on the basis of the process setting before they are composed together. The process settings of the jobs may be changed and corrected to process settings for unification so as to display the jobs as the composed job. At that time, the items which can be set by the printer driver 203 may be provided in the user interface on the setting change editor 307 or the user interface of the printer driver 203 itself may be accessed.

As for the composed job and the changed items, the changes thereof are verified in accordance with the verification requests on the setting change editor 307, as mentioned above, to shift a control to the spool file manager 304. As a result of these operations, a plurality of previously selected jobs are displayed as one composed job on the window of the spool file manager.

Then, if the user performs a printing operation in accordance with the contents of the setting change like the recognition in the previewer 306, the user supplies a print request on the spool file manager 304. The print request is transmitted to the graphic engine 202 and sent to the printer driver 203 via the dispatcher 301 to execute the printing operation.

Figure 4:
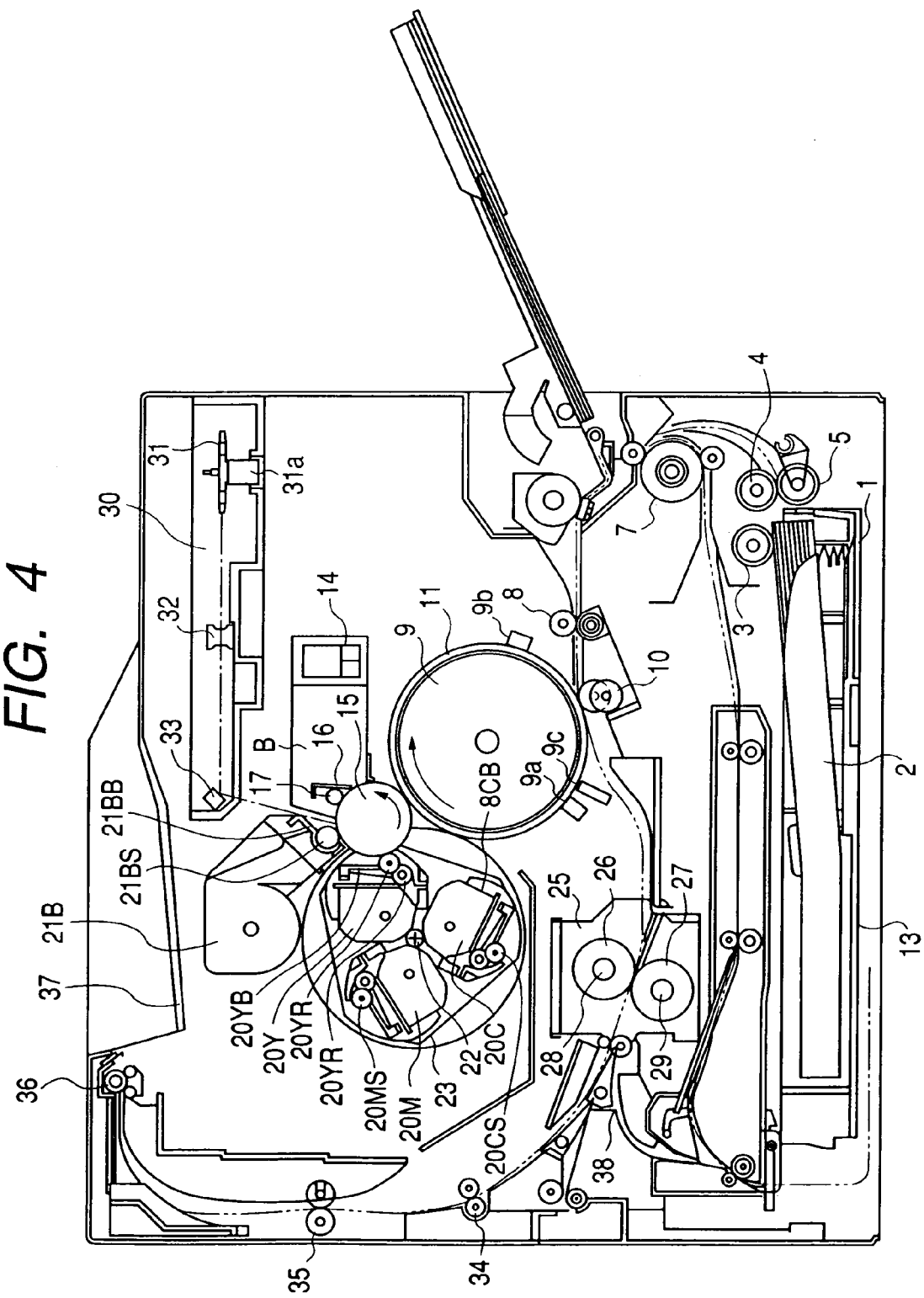
FIG. 4 is an explanatory view of the printer in the present invention.

FIG. 4 is a sectional view of a color laser printer having a duplex side printing function as one example of the printer 1500.

This printer is adapted to form an electrostatic latent image by scanning a photosensitive drum 15 by a polygon mirror 31 through a laser beam modulated by image data for each color obtained on the basis of printing data inputted from the host computer 3000. The electrostatic latent image is developed with toner to obtain a visible image, which is subjected to a multiple transfer of all colors to an intermediate transfer body 9 to form a color visible image. Then, the color visible image is transferred to a transferring material 2 to fix the color visible image thereon. An image forming part which carries out the above described control comprises a primary charging part including a drum unit having the photosensitive drum 15 and a contact charging roller 17, a cleaning part, a developing part, the intermediate transfer body 9, a sheet cassette 1, a sheet feeding part including various kinds of rollers 3, 4, 5 and 7, a transfer part including a transfer roller 10 and a fixing part 25.

The drum unit 13 comprises the photosensitive drum (photosensitive body) 15 and a cleaner container 14 having a cleaning mechanism serving as the holder of the photosensitive drum 15 which are integrally formed. The drum unit 13 is attachably and detachably supported by a printer main body and easily replaced by another drum unit to meet the life of the photosensitive drum 15. The photosensitive drum 15 is configured by applying an organic photoconductive layer to the outer periphery of an aluminium cylinder and rotatably supported by the cleaner container 14. The photosensitive drum 15 is rotated by transmitting the driving force of a driving motor not shown thereto. The driving motor rotates the photosensitive drum 15 counterclockwise in accordance with an image forming operation. The surface of the photosensitive drum 15 is selectively exposed to form an electrostatic latent image. In a scanner part 30, the modulated laser beam is reflected by the polygon mirror rotating in synchronization with the horizontal synchronizing signal of an image signal by a motor 31a and the reflected beam is applied to the photosensitive drum through a lens 32 and a reflector 33.

A developing part comprises three color developing devices 20Y, 20M and 20C for developing yellow (Y), magenta (M) and cyan (C) and one black developing device 21B for developing black (B) in order to visualize the above described electrostatic latent image. The color developing devices 20Y, 20M and 20C and the black developing device 21B are respectively provided with sleeps 20YS, 20MS, 20CS and 21BS and application blades 20YB, 20MB, 20CB and 21BB in contact with the respective outer peripheries of these sleeps 20YS, 20MS, 20CS and 21BS. Further, the three color developing devices 20Y, 20M and 20C are provided with application rollers 20YR, 20MR and 20CR.

The black developing device 21B is detachably attached to the printer main body. The color developing devices 20Y, 20M and 20C are respectively detachably attached to a developing rotor 23 rotating about a rotating shaft or axis 22.

The sleep 21BS of the black developing device 21B is arranged with a very small clearance of, for instance, about 300 $\mu$m from the photosensitive drum 15. The black developing device 21B carries toner by a feeding member incorporated in the developer and applies an electric charge to the toner by a frictional electrification so as to apply the toner to the outer periphery of the sleep 21BS rotating clockwise by the application blade 21BB. A developing bias is applied to the sleep 21BS so that a developing operation is carried out to the photosensitive drum 15 in accordance with the electrostatic latent image to form a visible image of the black toner on the photosensitive drum 15.

The three color developing devices 20Y, 20M and 20C rotate together with the rotation of the developing rotor 23 at the time of forming an image, so that the prescribed sleeps 20YS, 20MS and 20CS are opposed to the photosensitive drum 15 with a very small clearance of about 300 $\mu$m spaced therefrom. Thus, the prescribed developing devices 20Y, 20M and 20C stop at developing positions opposed to the photosensitive drum 15 to form a visible image on the photosensitive drum 15.

At the time of forming a color image, the developing rotor 23 rotates for each rotation of the intermediate transfer body 9 and developing processes are carried out in regular order of the yellow developing device 20Y, the magenta developing device 20M, the cyan developing device 20C and the black developing device 21B. The intermediate transfer body 9 rotates four times so that the visible images composed of respective toners of yellow, magenta, cyan and black are sequentially formed. As a result, a full color visible image is formed on the intermediate transfer body 9.

The intermediate transfer body 9 is adapted to come into contact with the photosensitive drum 15 and rotate together with the photosensitive drum 15, and rotates clockwise upon formation of a color image and receives the multiple transfer of the visible image four times from the photosensitive drum 15. Further, during the image formation, the transfer roller 10 comes into contact with the intermediate transfer body 9 so that the intermediate transfer body 9 simultaneously performs the multiple transfer of the color visible image there onto the transfer material 2. On the outer periphery of the intermediate transfer body, are arranged a TOP sensor 9*a* and an RS sensor 9*b* for detecting positions concerning the rotating direction of the intermediate transfer body 9 and a density sensor 9*c* for detecting the density of a toner image transferred to the intermediate transfer body 9.

The transfer roller 10 is provided with a transfer charger supported so as to be engaged with and disengaged from the photosensitive drum 15 and is configured by winding an intermediate resistance foaming elastic body on a metal shaft.

While the multiple transfer of the color visible image is carried out on the intermediate transfer body 9, the transfer roller 10 is, as shown by a solid line in FIG. 4, separated below from the body 9 so as not to disturb the color visible image. Then, after the four color visible image is formed on the intermediate transfer body 9, the transfer roller 10 is located at an upper position shown by a dotted line in FIG. 4 by a cam member (not shown) to a timing for transferring the color visible image to the transfer material 2. Thus, the transfer roller 10 comes into contact with the intermediate transfer body 9 under prescribed pressure through the transfer material 2 and applies a bias voltage to the intermediate transfer body 9 to transfer the color visible image on the intermediate transfer body 9 to the transfer material 2.

The fixing part 25 serves to fix the transferred color visible image to the transfer material while conveying the transfer material 2. The fixing part 25 is provided with a fixing roller 26 for heating the transfer material 2 and a pressing roller 27 for allowing the transfer material 2 to come into contact with the fixing roller 26 under pressure. The fixing roller 26 and the pressing roller 27 are formed in hollow shapes and respectively have heaters 28 and 29 incorporated therein. In other words, the transfer material 2 holding the color visible image is conveyed by the fixing roller 26 and the pressing roller 27 and is subjected to heat and pressure to have the toner fixed on its surface.

The transfer material 2 to which the visible image is fixed is discharged to a sheet discharging part 37 by discharging rollers 34, 35 and 36 to finish the image forming operation.

The cleaning means serves to remove the toner remaining on the photosensitive drum 15 and the intermediate transfer body 9. Waste toner produced after the visible image with toner formed on the photosensitive drum 15 is transferred to the intermediate transfer body 9 or waste toner produced after the four color visible image formed on the intermediate transfer body 9 is transferred to the transfer material 2 are stored in the cleaner container 14.

The printed transfer material (recording sheet) 2 is taken out by a sheet feeding roller 3 from a sheet feeding tray 1, sandwiched in and conveyed between the intermediate transfer body 9 and the transfer roller 10 to record a color toner image thereon and passes the fixing part 25 to fix the toner image thereto. In the case of a single side printing, a guide 38 forms a conveying passage to guide the recording sheet to the upper sheet discharging part. As compared with the above, in the case of a duplex side printing, the guide 38 forms a path to guide the recording sheet to a lower duplex side unit.

The recording sheet guided to the duplex side unit is temporarily fed to the lower part (conveying passage shown by a two-dot chain line) of the tray 1 by a conveying roller 40, and then conveyed in a reverse direction and fed to a duplex side tray 39. On the duplex side tray 39, the front surface and the back surface of the sheet are reverse to those of the sheet which is mounted on the sheet feeding tray 1 and the head and the last of the sheet in a conveying direction are reverse to those of the sheet mounted on the sheet feeding tray 1. The toner image is transferred and fixed again to the sheet under this condition, so that the duplex side printing can be realized.

Figure 5:
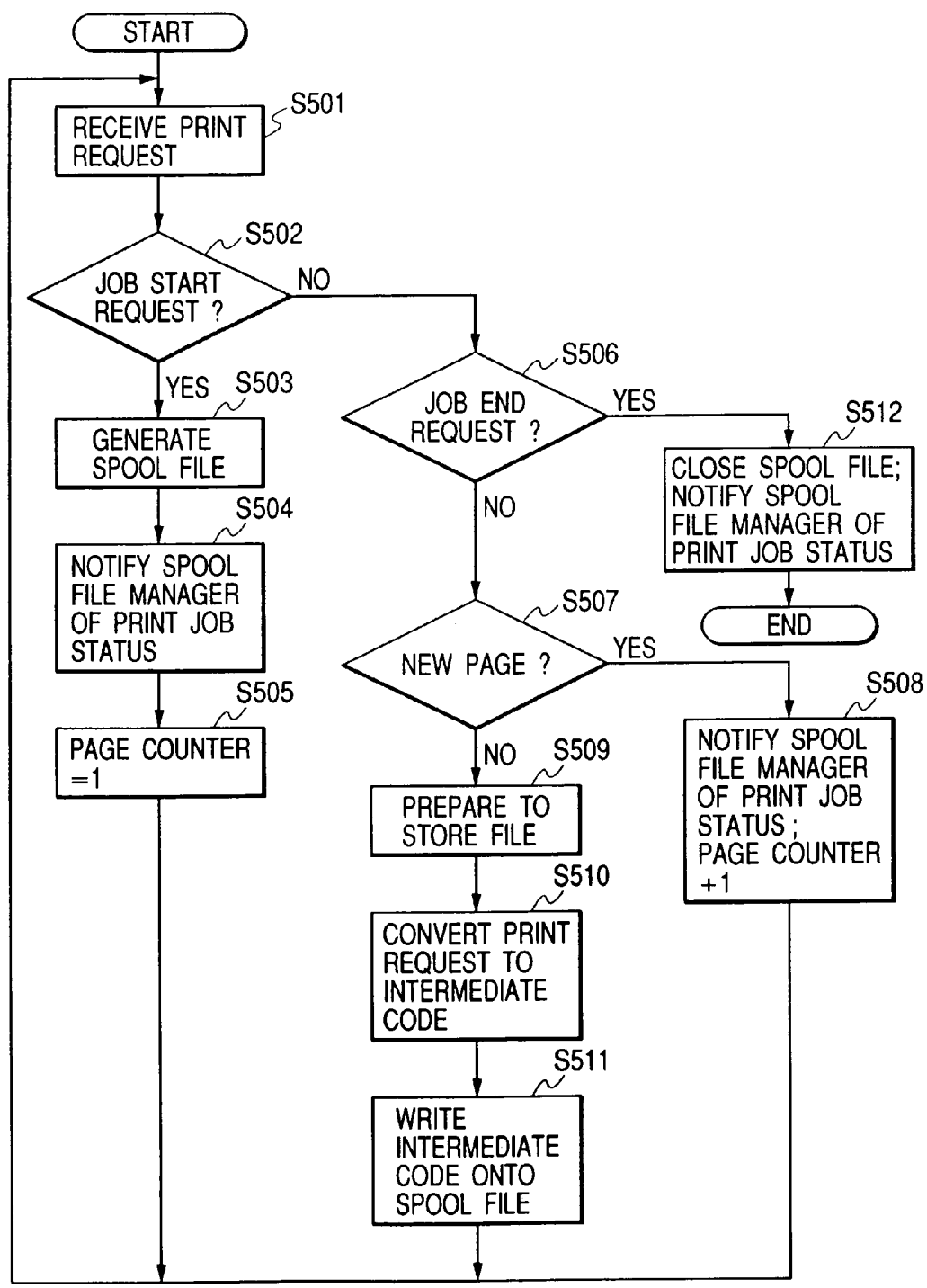
FIG. 5 is a flowchart showing processings in a spooler 302.

FIG. 5 shows a flowchart showing the processes of storing steps for each page in the generation of the spool file 303 in the spooler 302.

Figure 8:
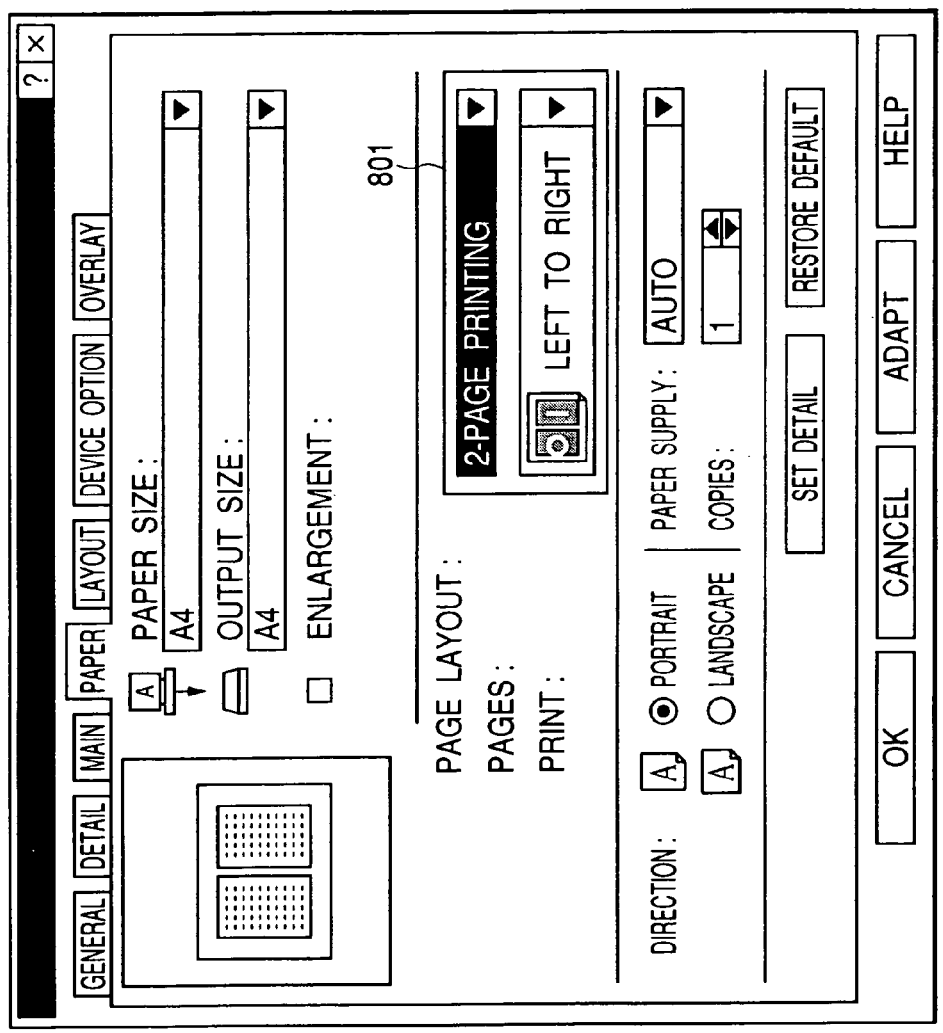
FIG. 8 shows one example of a print setting screen.

Initially, in step 501, the spooler 302 receives a print request through the graphic engine 202 from the application. In the application, a dialogue for inputting a print setting as shown in FIG. 8 is displayed and the print setting inputted from the dialogue is delivered to the spooler 303 from the printer driver. In the setting input dialogue shown in FIG. 8, a setting item or the like for determining the number of logical pages laid out in one physical page as shown by reference numeral 801 is included.

In step 502, the spooler 302 decides whether or not the received print request is a job start request. When the spooler 302 decides that the print request is the job start request in step 502, spooler advances to step 503 to prepare the spool file 303 for temporarily store intermediate data. Then, in step 504, the spooler 302 informs the spool file manager 304 of the progress of the printing process. In next step 505, the page counter of the spooler 302 is initialized to 1. Here, the pool file manager 304 reads from the spool file 303 and stores the information or the process setting or the like of a job whose printing operation is started.

On the other hand, in step 502, when the spooler 302 decides that the print request is not a job start request, the spooler 302 advances to step 506.

In step 506, the spooler 302 decides whether or not the received request is a job end request. When the spooler 302 decides that the received request is not the job end request, the spooler 302 advances to step 507 to decide whether or not the received request is for change of page. If the spooler 302 decides that the request is for change of page in step 507, the spooler advances to step 508 to inform the spool file manager 304 of the progress of the printing process. Then, the spooler 304 increments a page number counter to close the page description file in which the intermediate code is stored and prepare a next page description file.

In step 507, when the spooler 304 decides that the received print request is not for change of page, the spooler 302 moves to step 509 to prepare to write the intermediate code on the page description file.

Subsequently, in step 510, in order to store the print request in the spool file 303, the spooler 302 converts the DDI function of the print request into the intermediate code. In step 511, the spooler 302 writes the print request (intermediate code) converted into a form which can be stored in the spool file in step 510 in the page description file of the spool file 303. After that, the spooler 302 returns to the step 501 to receive again a print request from the application. A series of processes from the step 501 to the step 511 are continued until a job end request (End Doc) is received from the application. Further, the spooler 302 simultaneously obtains the information such as the process setting stored in the DEVMODE structure body from the printer driver 203 and stores the information in the spool file 303 as a job setting file. On the other hand, in step 506, when the spooler 302 decides that the print request from the application is the job end request, the spooler 302 moves to step 512, because the print request from the application is completely finished. Then, the spooler 302 informs the spool file manager 304 of the progress of the printing operation to finish the processes.

Figure 6:
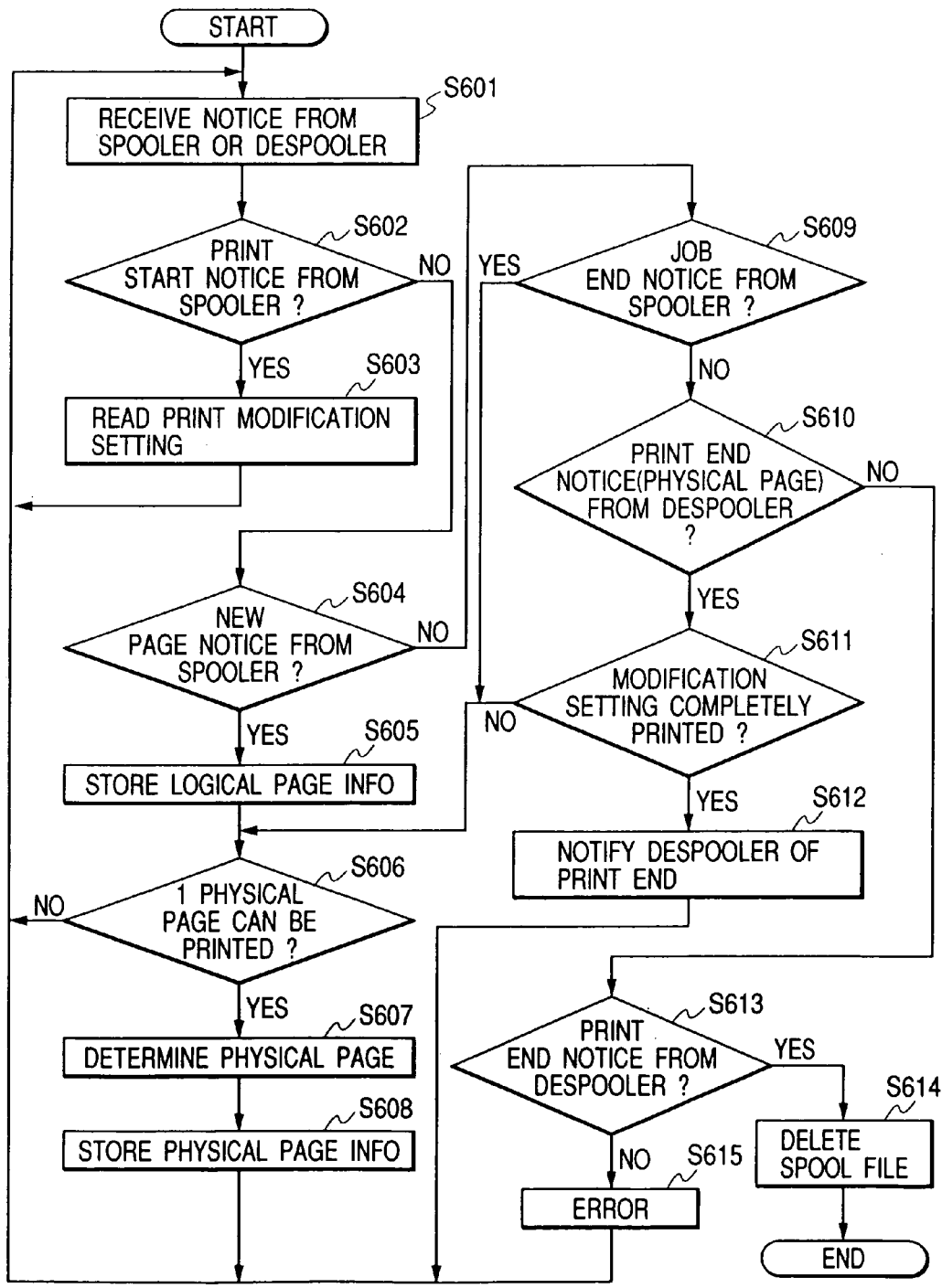
FIG. 6 is a flowchart showing a print control in a spool file manager 304.

FIG. 6 shows a flowchart showing the detail of a control between a spool file 303 generating process and a printing data generating process which will be described later in the spool file manager 304.

In step 601, the spool file manager 304 receives the notice of the progress of the printing process from the spooler 302 or the despooler 305.

In step 602, the spool file manager 304 decides whether or not the notice of progress is a print start notice from the spooler 302 which is sent to the spool file manager in step 504. If a reply is Yes, the spool file manager 304 advances to step 603 to read the print process setting described above, in other words, the print modification setting from the spool file 303 and start the management of of a job. On the other hand, when the progress notice is not the print start notice from the spooler 302 in step 602, the spool file manager 304 advances to step 604 to decide whether or not the progress notice is the print end notice of one logical page which is sent from the spooler 302 informed in the above described step 508 to the spool file manager 304. Here, when the progress notice is the print end notice of one logical page, the spool file manager 304 moves to step 605 to store logical page information corresponding to the logical page. Then, in the next step 606, the spool file manager 304 decides whether or not the print operation of one physical page can be started relative to n logical pages in which a spooling process is finished at that time. Here when the physical page can be printed, the spool file manager 304 advances to step 607 to determine a physical page number on the basis of a logical value allocated to one physical page to be printed.

As for the calculation of physical pages, for instance, in the case where the print process setting or the print modification setting is such a setting as to arrange four logical pages for one physical page, the first physical page can be printed when a fourth logical page is spooled to obtain the first physical page. Subsequently, a second physical page can be printed when a eighth logical page is spooled.

Further, even when the total number of logical pages is not a multiple of the number of logical pages arranged on one physical page, the logical pages to be arranged on one physical page can be determined in accordance with a spool end notice in step 512.

Then, in step 608, information such as a logical page number, the physical page number thereof, etc. which constitute a physical page to be printed is stored in the setting file for outputting a job (a file including physical page information) in a form shown in FIG. 10 and the despooler 305 is informed of the addition of physical page information corresponding to one physical page. After that, the spool file manager 304 returns to step 601 to wait for a next notice. In the present embodiment, when the logical pages which constitute one page of printing data, that is to say, one physical page are spooled, the printing process can be executed even when the spool process of the print job is not completely finished.

On the other hand, in step 604, when the progress notice is not the print end notice of one logical page from the spooler 302, the spool file manager 304 advances to step 609 to decide whether or not the progress notice is the job end notice from the spooler 302 which is sent to the spool file manager 304 from the spooler in step 512. Here, when a replay is affirmative, the spool file manager 304 moves to the above described step 606. On the other hand, when a reply is negative, the spool file manager 304 proceeds to step 610 to decide whether or not the received notice is a print end notice of one physical page from the despooler 305. Here, when the received notice is the print end notice of one physical page, the spool file manager 304 proceeds to step 612 to decide whether or not the print of the modification setting is completely finished. When the printing process is finished, the spool file manager 304 advances to step 612 to inform the despooler 305 of the end of printing. On the other hand, when the spool file manager 304 decides that the print of the modification setting is not finished, the spool file manager moves to step 606. In the despooler 305 according to the present embodiment, it is assumed that the number of one physical page is a unit for executing the print process. Further, in step 608, information required for performing the print process of one physical page is stored one by one in a file so as to be reused. When the information does not need to be reused, a package system, may be provided, in which a high speed medium such as a common memory is used to successively overwrite information thereon for each physical page so that speed and resources can be saved. Further, in the case where the progress of spooling is faster than that of despooling or in the case where a despooling process is started after all pages are spooled, the spool file manager 304 does not inform the despooler 305 of the pages which can be printed for each physical page in step 608, and can save the number of notices by informing the despooler of the contents of a notice that a plurality of physical pages or all physical pages can be printed in accordance with the progress of the despooling side.

In step 610, when the spool file manager 304 decides that the received notice is not the print end notice of one physical page from the despooler 305, the spool file manager 304 advances to step 613 to decide whether or not the notice is a print end notice from the despooler 305. When it is decided that the notice is the print end notice from the despooler 305, the spool file manager 304 advances to step 614 to delete a corresponding description file of the spool file 303 and finish the processes. On the other hand, when the notice is not the print end notice from the despooler 305, the spool file manager 304 proceeds to step 615 to perform other ordinary processes and wait for a next notice.

Figure 7:
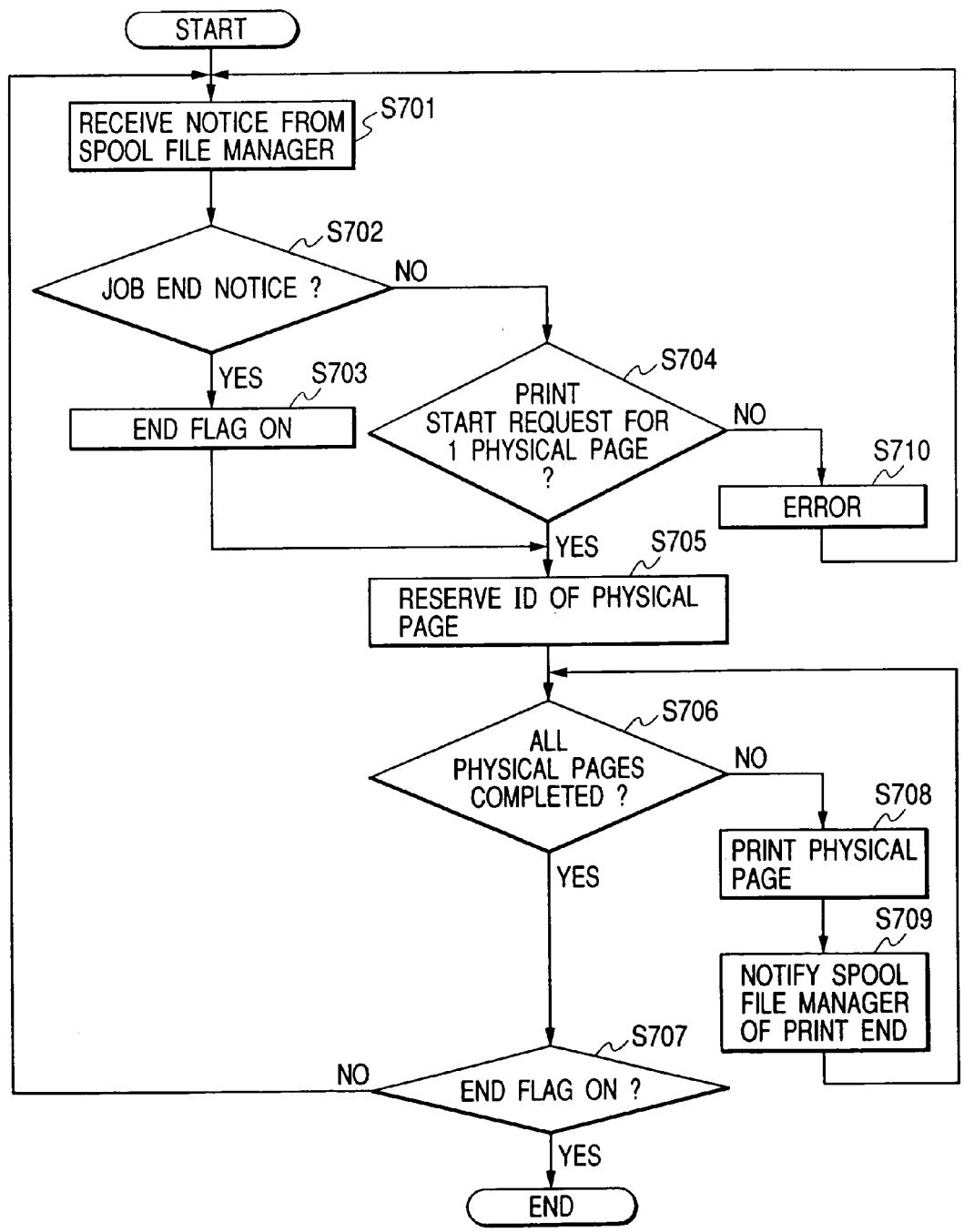
FIG. 7 is a flowchart showing processings in a despooler 305.

FIG. 7 is a flowchart showing the detail of the print data generating process in the despooler 305.

The despooler 305 reads out necessary information (page description files and job setting files) from the spool file 303 in accordance with a print request from the spool file manager 304 to generating printing data. The generated printing data is transferred to the printer in accordance with the method explained with reference to FIG. 3.

For generating the printing data, in step 701, the despooler 305 first inputs a notice from the spool file manager 304. In next step 702, the despooler 305 decides whether or not the inputted notice is the job end notice. When the inputted notice is the job end notice, the despooler 305 advances to step 703 to raise an end flag and move to step 705. On the other hand, in step 702, when the notice is not the job end notice, the despooler 305 advances to step 704 to decide whether or not the print start request of one physical page in step 608 is notified to the despooler. In step 704, when the despooler 305 decides that the notice is not the print start request, the despooler 305 advances to step 710 to carry out other error processes, return to step 701 and wait for a next notice. On the other hand, in step 704, when the despooler 305 decides that the notice is the print start request of one physical page, the despooler 305 advances to step 705 to store the ID of the physical page to be printed which the despooler receives the notice in step 704. In the next step 706, the despooler 305 decides whether or not the print processes of all the pages of the ID of the physical page stored in step 705 are completed. Here, when the processes of all the physical pages are completed, the despooler 305 advances to step 707 to decide whether or not the end flag in step 703 is raised. When the end flag is raised, the despooler 305 decides that the print process of the job is finished and sends a notice of the end of processes to the spool file manager 304 to finish the processes. In step 707, when it is decided that the end flag is not raised, the despooler 305 returns to the step 701 to wait for a next notice. On the other hand, in step 706, when the despooler 305 decides that there remain physical pages to be printed, the despooler advances to step 708, sequentially read IDs of physical pages to be processed from the stored physical page IDs, read information necessary for generating the printing data of the physical pages corresponding to the read physical page IDs and execute the print process. The print process is performed by converting a print request instruction stored in the spool file 303 into a format (GDI function) which can be recognized by the graphic engine 202 in the despooler 305 and transferring the format. As for the process setting or the modification setting (called it N page printing, hereinafter)in which a plurality of logical pages are laid out on one physical page. The conversion is executed by considering a reduced arrangement in step 708. When the required print process is finished, the despooler 305 notifies the spool file manager 304 of the end of print data generation of one physical page in next step 709. Then, the despooler 305 returns to the step 706 to repeat the processes up to the print process for all the physical page IDs to be printed which are stored in step 705.

As described above, a flow of the print processes include the dispatcher 301, the spooler 302, the spool file manager 304 and the despooler 305. According to the processes mentioned above, since the application 201 is released from the print process when the spooler 302 generates the intermediate code and stores it in the spool file 303, the former may take time shorter than a case in which the intermediate code is directly outputted to the printer driver 203. Further, since the intermediate code is temporarily stored in the spool file 303 as an intermediate file (page description file, job setting file)based on the print setting of the printer driver, a print preview to be actually printed can be recognized by the user or the print jobs generated by a plurality of applications can be combined together or rearranged. When the print setting is changed, the user can change the print setting without starting the application again to print.

In the print process using the spooler 302, when the print request is supplied to the graphic engine 202, the job output setting file is generated by the despooler 305. In the case where the previews or the jobs are combined together, the job output setting file is also generated. The job output setting file is, in the case of a single job, equivalent to the job setting file. In the case of the composed job, the output setting file is generated on the basis of the setting information of a plurality of jobs. Now, the job output setting file will be described below.

FIG. 10 shows an example of the job output setting file in which information constituting the physical pages to be printed generated by the spool file manager 304 is stored in step 608. A field 1001 designates an ID for identifying a job which can be stored in the name of a file or a common memory for storing the information in question. A field 1002 designates job setting information. In the job setting information, is included information which can be necessarily set to only one job such as the designation of a structure body required for starting the print process of a job relative to the graphic engine 202 and the N page printing, the designation of an additional description such as a page frame, the finishing designation such as the number of copies, stapling, etc. In the job setting information 1002, there is stored only information required for the functions for the jobs. A field 1003 designates the number of physical pages of the job. After this field, the physical page information of the number shown in the field 1003 is stored. Since the present embodiment utilizes a system for notifying the user of the number of physical pages to be printed, this field may not be required for operation. The physical page information of the number shown in the field 1003 is stored from a field 1004 to the last field. The physical page information will be described by referring to FIG. 12.

FIG. 11 shows one example of the job setting information shown in the field 1002 shown in FIG. 10. A field 1101 designates the number of all physical pages. A field 1102 designates the number of all logical pages. The fields 1101 and 1102 are added to the printing data and employed when a page number is printed as additional information. While the printing operation is continued, both the fields designate provisional values, or the spool manager 304 postpones the preparation of physical page information capable of being printed until the printing operation is finished. A field 1103 designates copy number information for designating what number of copies of the print job are printed. A field 1104 designates whether or not the print job is printed for each copy when a plurality of copies are printed in the field 1103. A field 1104 designates finishing information such as stapling, punching, folding in a Z-shape, etc. When a finisher is provided externally or in the printer main body, the finishing information is designated. A field 1106 indicates additional print information, and a decoration such as a page frame, additional information such as date, and information added to a job such as a user name, a page number, water mark print, etc. are stored. As functions increase, the number of fields included in the job setting information also increases. For example, when a duplex side printing can be carried out, a field for storing the designation of the duplex side printing is added thereto.

FIG. 12 shows one example of the physical page information shown in the field 1004 in FIG. 10. A first field 1201 denotes physical page numbers which are values used when a print order is controlled and a physical page number is added and printed. A field 1202 denotes physical page setting information in which the setting of layout or color/monochrome is stored when the layout or the color/monochrome can be designated for each physical page. A field 1203 designates the number of logical pages allocated to the physical page. If four pages are allocated to one physical page, an ID indicating 4 or a four page printing will be stored. After a field 1204, the information of logical pages of the number designated by the field 1203 is stored. The actual number of page data may be possibly smaller than the number of pages designated by the field 1203 depending on the number of pages printed from the application 201. In order to meet such a case, special data showing a space page is stored in the logical page information.

FIG. 13 shows an example of the physical page setting information indicated by 1202. A field 1301 denotes the arrangement order of logical pages on a physical page in which the designation of an order (transversely from an upper part in a left side, downward from an upper part in a left side, etc.) for arranging the logical pages on a physical page on the basis of the N page printing is stored. The arrangement order may not be applied depending on a system. The logical page information after the field 1204 may be arranged in order in accordance with the arrangement order without using a page number sequence in place of the setting of 1301. A field 1302 indicates the obverse/reverse side information of the duplex side printing which is employed, for example, upon registration of a binding margin in the obverse/reverse side. A filed 1303 denotes the designation of color page/monochrome page. In the case of a printer having a monochrome mode and a color mode, the above designation is a value used when the user wishes to print color pages by the color mode and monochrome pages by the monochrome mode in a document with the color pages mixed with the monochrome pages. The provision of this information enables the processes to be changed for each page as an auto-color mode in a color printer. Specifically, in the case of the color page, an intermediate transfer body (an intermediate transfer drum, an intermediate transfer belt) or a transfer body (a transfer drum, a transfer belt) rotates for several minutes for device color, rotates four times in the case of YMCK, and rotates once only for black in the case of the monochrome page so as to control a transfer process. A field 1304 denotes additional print information used when additional information such as the number of pages, date, etc. is printed in the physical page. Fields may be added to the physical page setting information depending on the function of a system.

FIG. 14 shows one example of the logical page information shown by 1204. A field 1401 designates the ID of a logical page. By using this ID, the intermediate code of the page description file corresponding to the logical page is referred to from the spool file 303. The intermediate code of the logical page may be accessed to by using the ID. A file or a memory pointer may include the intermediate code itself constituting the logical page. A field 1402 indicates a logical page number which is used when the logical page number is printed as additional information or as the auxiliary information of the logical page ID. In the format information of a field 1403, various kinds of setting items which can be designated for each logical page are stored. For instance, the additional print information such as a page frame and various kinds of setting information designated for each logical page such as enlargement and reduction rate are stored. Further, if necessary, attribute information for the logical page such as color/monochrome information for each logical page can be also stored. On the contrary, a system in which the change of setting for each logical page or the attribute information for each logical page is not required does not need to have the field 1403.

The job output setting file is configured as described above. A job setting file is substantially equally configured to the above, and includes a printing method (single side printing, duplex side printing, binding printing), a print layout (Nup, poster printing), additional information (water mark, date, the addition of a user name), the number of copies and sheet size information as a job, and the arrangement order of logical pages, an obverse/reverse side of the duplex side printing, a color mode, etc. for each physical page.

Further, in FIG. 3, is illustrated an example in which the setting change editor 307 with the setting change function of the job is arranged in addition to the extending system described above. In the present embodiment, the contents of the setting of the job can be changed by changing the job output setting file, because the single job is contained in the job setting file and the composed job is contained in the job output setting file shown in FIG. 10 and independent of the page description file 303 in which the intermediate code is stored. The setting change editor 307 reforms the job output setting file independently or in cooperation with the spool file manager 304, or rewrites a part of the job output setting file to realize the setting change function of the job.

Figure 15:
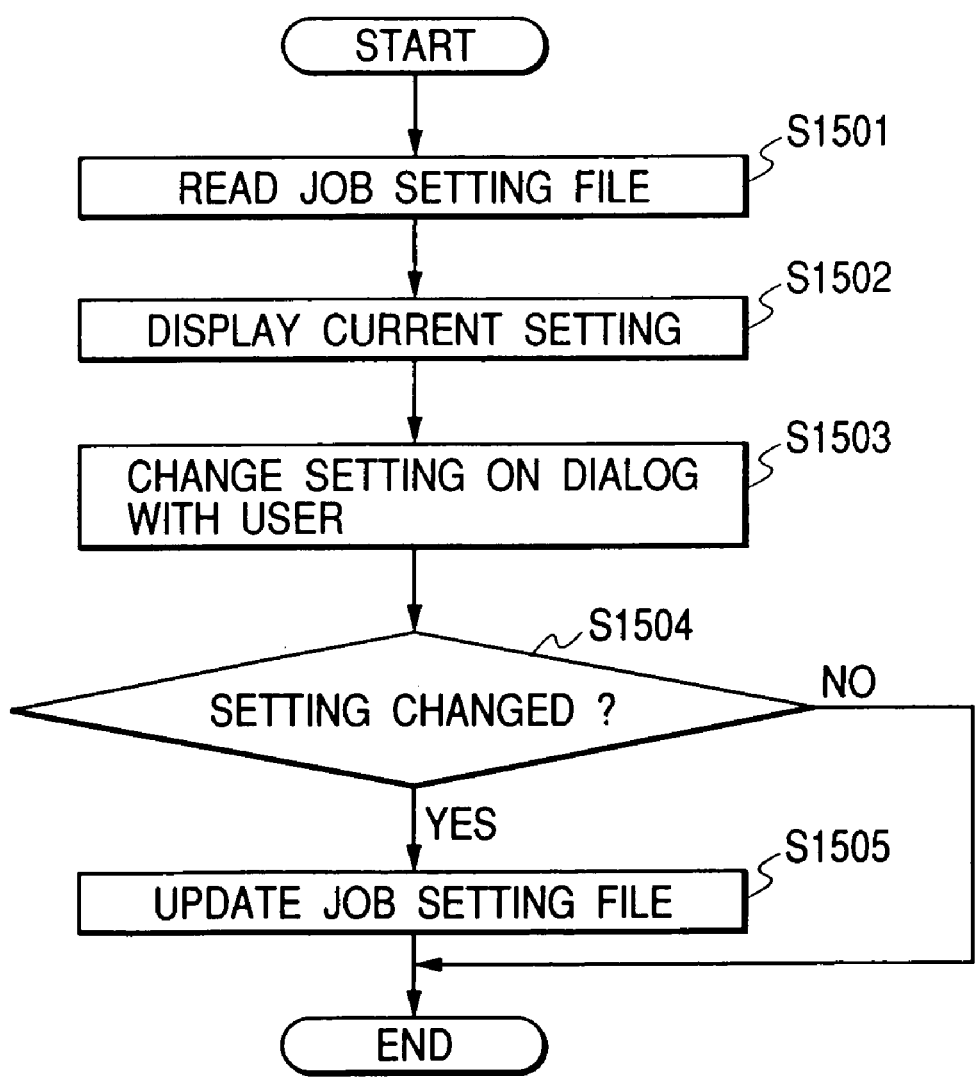
FIG. 15 is a flowchart showing setting change processes in a setting change editor 307.

FIG. 15 is a flowchart showing the detail of a job setting change processes in the setting change editor 307.

In step 1501, the setting change editor 307 first reads the job setting file or the job output setting file. The job output setting file reads the file the same as that read by the previewer 305 and the despooler 303. Then, the setting change editor advances to step 1502 to display the read result to the user. In step 1503, the setting change editor 307 performs a dialog with the user on the user interface as illustrated in FIG. 18 to change the contents of the setting on the basis of the above described designations of the menu or the like. In this step, may be adopted a batch form for changing the contents of the setting in accordance with the contents of setting change written in the file in place of the dialog form. Then, the setting change editor 307 advances to step 1504 to decide whether or not there is a change between the contents of the setting first read in step 1501 between the contents of the setting designated at present. When the contents of the setting are changed, the setting change editor 307 advances to step 1505 to generate a new job output setting file, inform the spool file manager of the presence of a change and finish the processes. On the other hand, when the setting change editor decides that the contents of the setting are not changed in step 1505, the setting change editor sends a notice of no change to the spool file manager to finish the processes. As described above, the setting change editor 307 generates the new job output setting file. When an "OK" button is selected on the user interface screen shown in FIG. 18, the new job output setting file becomes effective and the old job output setting file is deleted. Further, upon change in the job setting file of a single job different from that of the job output setting file, the job setting file is not deleted but stored. Further, when a "return to initial state" button is selected on the screen of FIG. 18, the new job output setting file is deleted and the old job output setting file becomes effective to be displayed. In the present embodiment, although the setting change editor 307 is described as a separate module, it may simply form a part of the user interface of the spool file manager 304. A package form, may be provided, in which the setting change editor 307 does not actually write the contents of change in the job output setting file and only informs the spool file manager 304 of the contents of change of the setting so that the spool file manager 304 side actually changes the job output setting file.

FIG. 3 further shows the extending system for combining a plurality of print jobs together and printing them as one print job. Now, an extending processing for despooling and previewing the composed job will be described below.

Generally, the spool file 303 of the intermediate format is prepared for each job. In the case of a single job, the intermediate codes of each logical page in a job file to be processed are sequentially read out to execute a process, so that the logical page ID of the field 1401 can be realized by a relative or absolute offset showing where each logical page is located in the file. In the case of the composed job, it is necessary to specify the spool file and the page information belonging to the job from the job ID of the field 1401. In the present embodiment, there is utilized a system in which the ID for identifying the spool file is added to a logical page ID to specify the spool file. In this case, a main change may be located only in the field 1401. If the spool file can be identified, the page part can be read in the same logic as that of the processing of the single job. Further, in the case where the spool file is stored for each logical page in a form of another file, there may be provided a package form that the file name of the logical page is directly identified as the logical page ID of the field 1401.

[Combining Process Flow]

Figure 19:
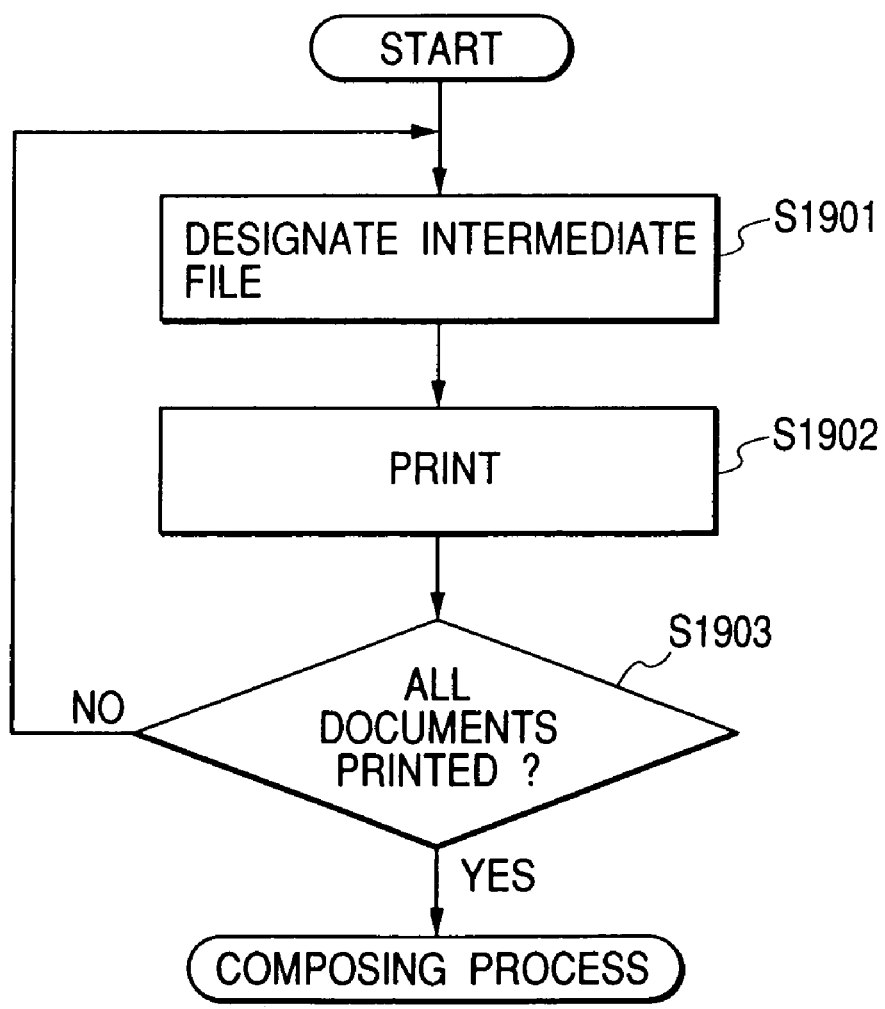
FIG. 19 is a flowchart showing the operation of a user when the print jobs are spooled in the spool file manager 304 as shown in FIG. 16.

Now, the operation flow of the user will be described below when a plurality of documents are combined together. FIG. 19 shows a flowchart for explaining the user operation until the documents are listed up on the screen of the spool file manager 304.

In step 1901, upon start of the printing operation on the application, the spool file manager 304 opens the dialog of the printer driver to designate the dialog to be spooled to the intermediate file format operable on the user interface. In the example of the dialog of the printer driver shown in FIG. 9, the designation of "store" is selected from a combo box 901. Then, the spool file manager 304 advances to step 1902 to start the print process (this is not a true print process and the application sees as if the actual print process were executed, in other words, a background print process is carried out and the application outputs a description instruction to the graphic engine), the print jobs prepared in the intermediate data format are listed up on the screen of the user interface of the spool file manager 304 as shown in FIG. 16 so that the designation of the user can be received while the print jobs are spooled in the intermediate file format. Under this state, the user can select and print one document from the list, temporarily change the print setting or recognize the contents of the setting on the screen.

In this case, since the user intends to combine a plurality of printed documents together, the spool file manager 304 advances to step 1903 to set the "store" to all the documents to be combined together and decide whether or not the documents are printed. When there remain documents which are not printed (the output process of the description instruction to the graphic engine) if the documents to be combined together, the spool file manager 304 returns to the step 1901 to repeat the print processes of other documents to be combined together. When the printing process of all the documents to be combined together are completed, the spool file manager advanced to a combining process.

Figure 20:
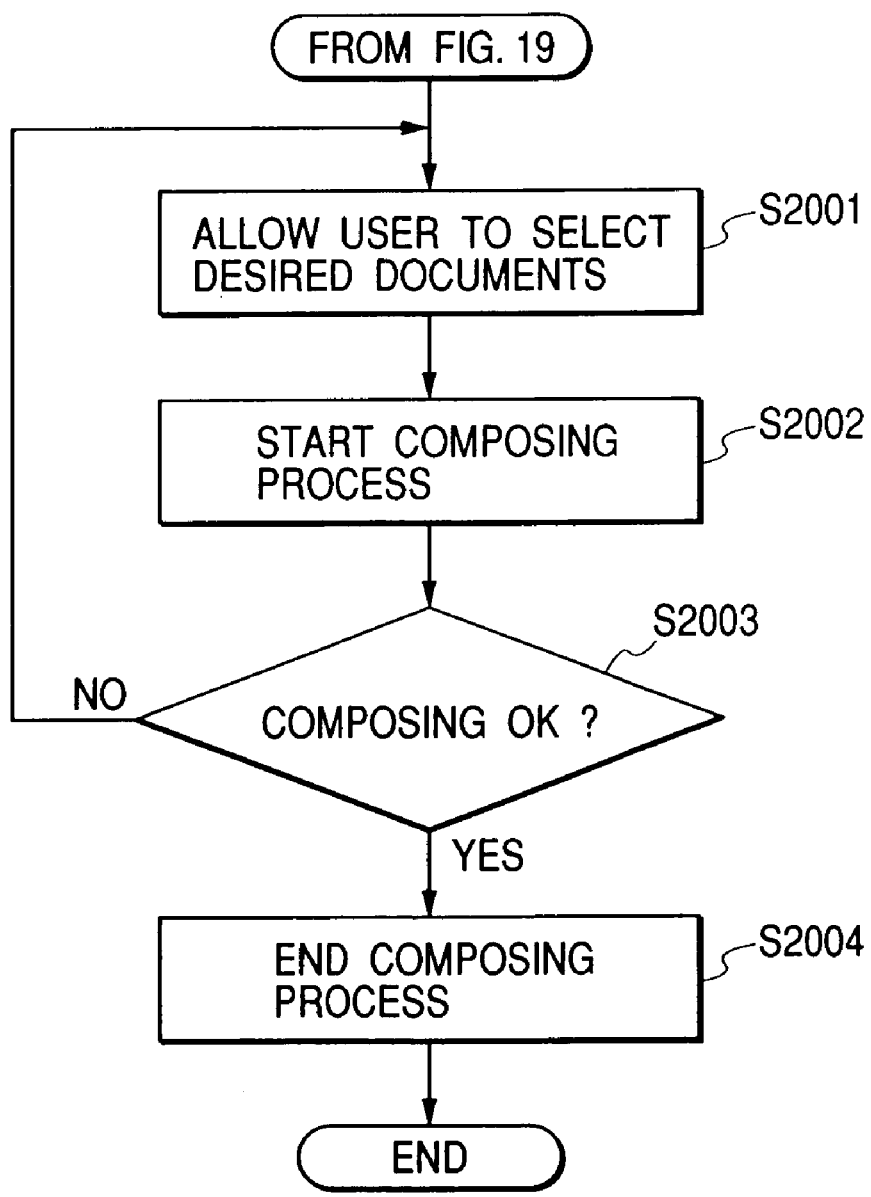
FIG. 20 is a flowchart showing the operation of the user upon composing the jobs together.

FIG. 20 shows a flowchart for explaining the user operation upon combining together a plurality of documents listed up in FIG. 16.

Figure 22:
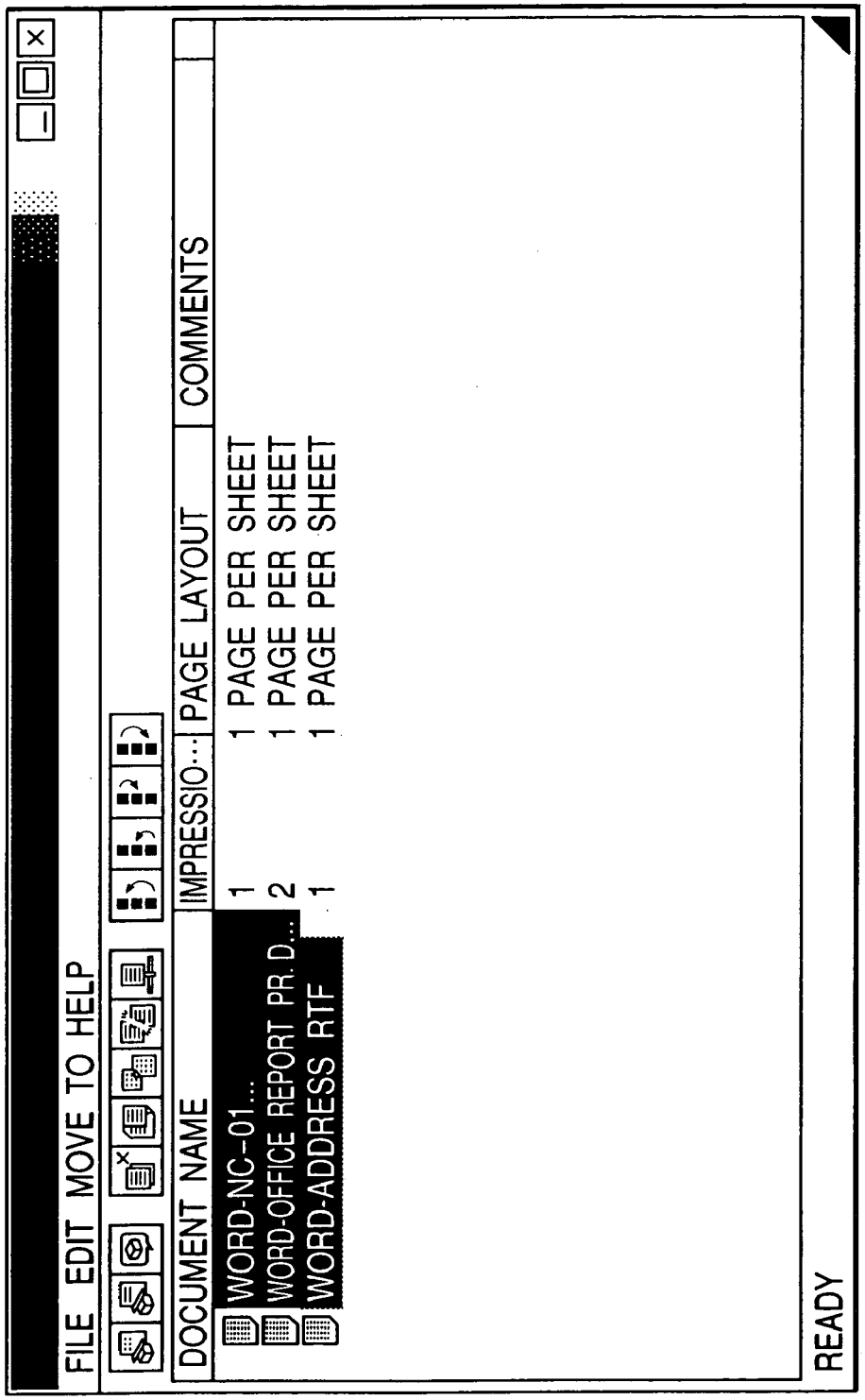
FIG. 22 shows one example of a user interface for selecting a plurality of documents to be combined together in order to combine the plurality of documents together.

In step 2001, the user allows to select desired documents to be combined together on the user interface shown in FIG. 16 by using a pointing device such as a mouse. When the print jobs in the intermediate data format which are documents are selected, the spool file manager 304 identifies the selected state of the print jobs and informs the user of the selection of the print jobs. This can be realized by inverting a color (see FIG. 22) around a document icon, which is the well known technique of the OS, so that a detailed control explanation will be omitted. FIG. 22 shows a state in which a plurality of documents (three documents in this example) to be combined together are selected.

Under this state, the spool file manager moves to step 2002 to allow the user to instruct a combination of print jobs from a menu or a tool bar, etc. When the spool file manager 304 decides that the job combining instruction is supplied from the user, the spool file manager 304 combines the print jobs together. Here, in the present system, the spool file manager examines the contents of the settings of the respective documents by reading the job setting file from the intermediate file in which the documents to be combined together are stored and decides whether or not there exist the contents of one setting which can be necessarily set to one print job such as information concerning a finishing process. When the contents of the setting in question are designated, the spool file manager 304 displays a recognition message concerning the settings of the documents to be combined together and the composed document. According to the present embodiment, when the contents of one setting which are to be necessarily set to one print job is designated, a control is always executed so that a setting cancel message is displayed, however, the present invention is not limited thereto. It is to be understood that a control may be performed so that the setting cancel message is displayed when the contents of the settings of a plurality of print jobs to be combined together are examined and the contents of the settings which can be respectively necessarily set to one print job are different between a plurality of print jobs.

In next step 2003, the spool file manager 304 controls to display the user interface (see FIG. 23) on which the user can recognize the contents of the message and select as to whether the print jobs are combined or not and decides whether or not the user instructs the print jobs to be combined.

In step 2003, when the spool file manager 304 decides that the user instructs not to combine the print jobs together, the spool file manager returns to the step 2001 to select the document (print job) again. The spool file manager 304 may further return to the printing flow shown in FIG. 19 from the step 2001 to print a new document or to change the setting of the already printed document and print the document thus obtained again.

In step 2003, when the spool file manager 304 decides that the user designates to combine the print jobs together, the spool file manager 304 advances step 2004 to control a plurality of selected print jobs to be combined together by using the setting change editor 307.

Figure 24:
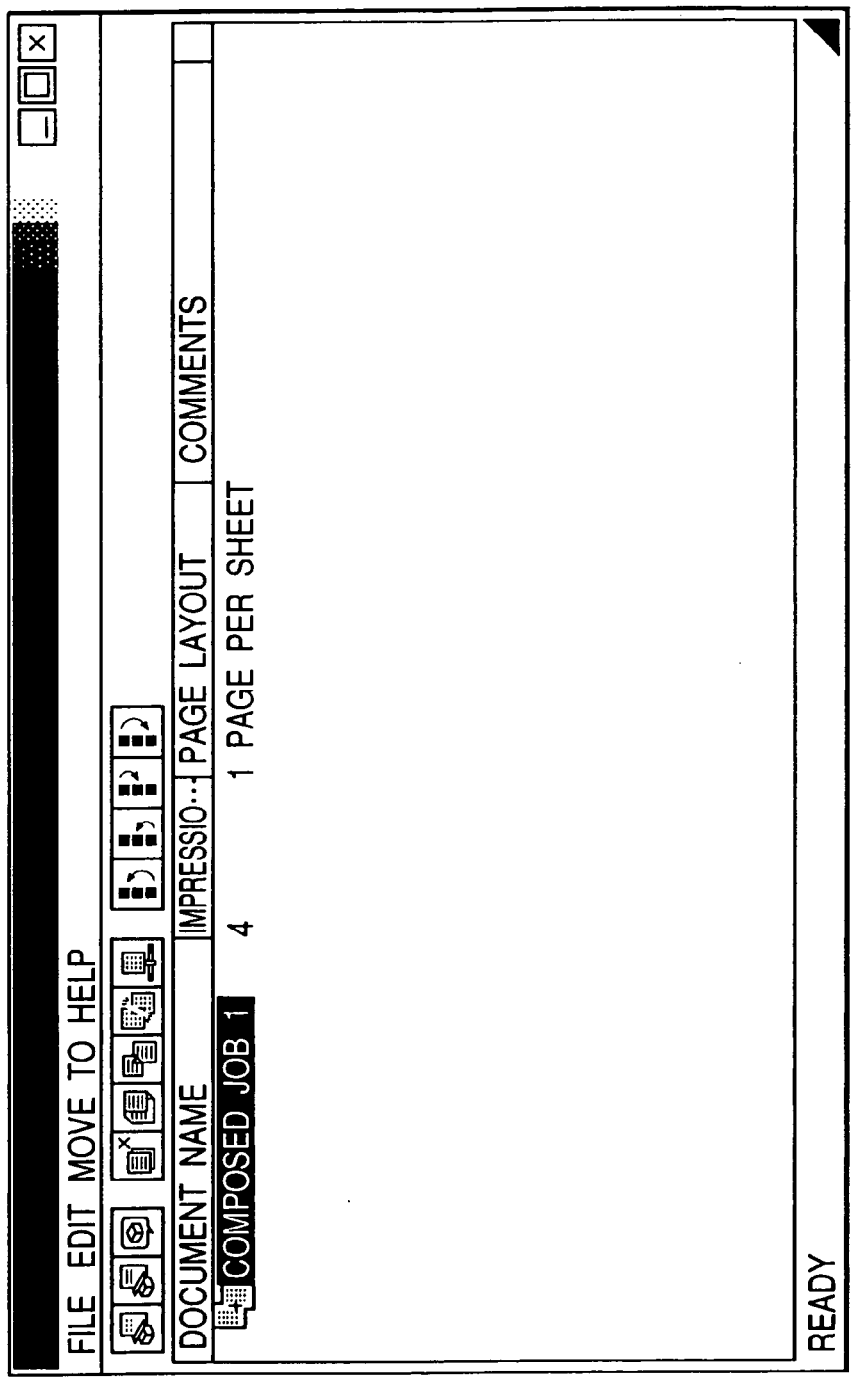
FIG. 24 shows one example of a user interface showing that a plurality of documents selected in FIG. 22 are combined together.

In step 2004, as shown in FIG. 24, a composed job icon showing the composed job combined by the setting change editor are displayed and the display of the user interface is controlled so that job icons showing a plurality of print jobs before they are combined together are not displayed.

Even when the composed job is generated, the page description files and the job setting files of the respective print jobs combined together are kept spooled in the spool file 303 and only the job output setting file for the composed job is prepared. In the physical page information of the job output setting file, there is included information as to which page description file is arranged, as to which page layout is used or as to where the page description file is arranged.

Figure 21:
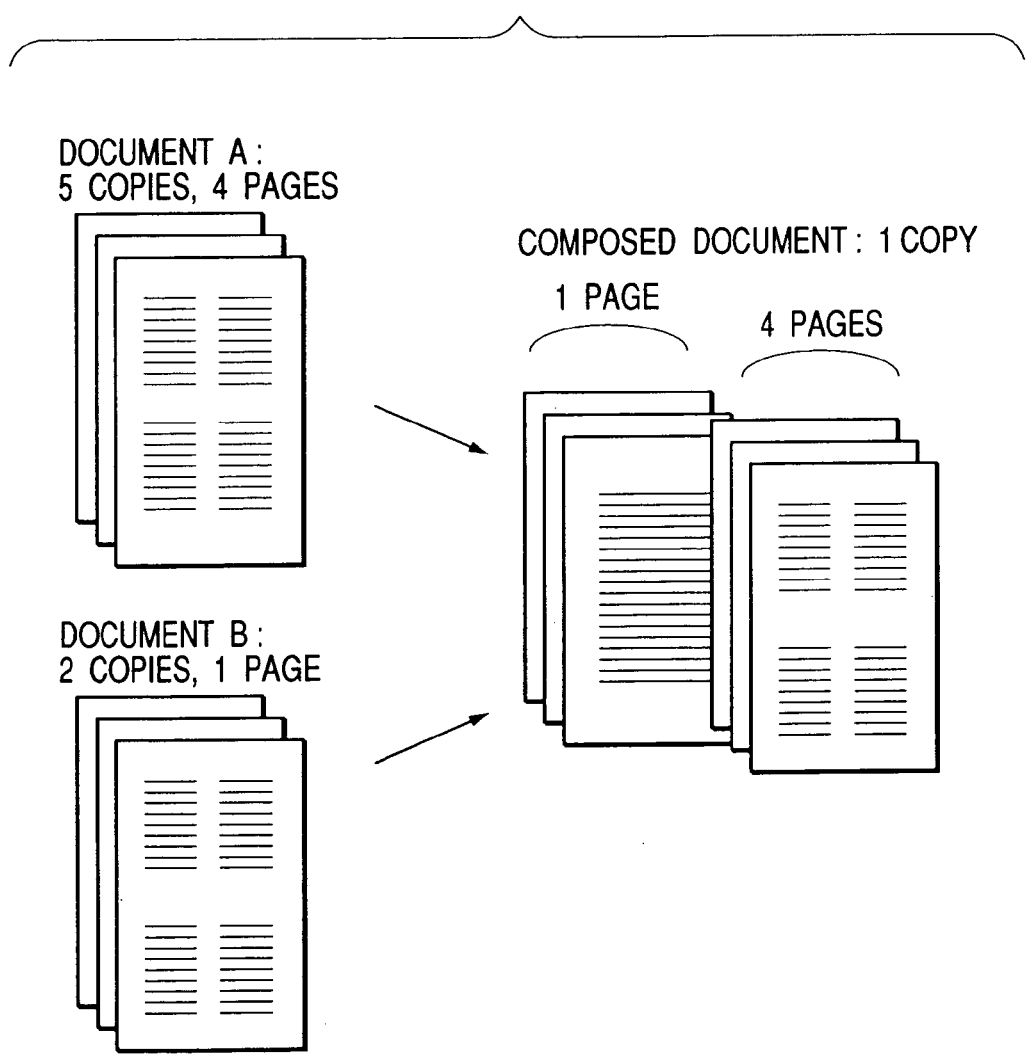
FIG. 21 is a conceptual view for explaining the unification and rounding off of settings when a plurality of documents are combined together.

FIG. 21 shows examples for unifying/rounding off the settings when a plurality of documents are combined together. For simplicity, setting items are limited to the number of copies and the N page printing. A document A is printed in accordance with the setting of five copies and N page printing and a document B is printed in accordance with the setting of two copies and one page printing.

In the case where the document A is combined with the document B, the number of copies is reset to one, the part of the document A is set to a four-page printing and the layout information of the document B has the setting of one page printing. As for the number of copies, the setting on a unit for processing the print job (the designation in FIG. 11), that is to say, one setting can be necessarily set to one print job, so that the composed job needs to be unified or reset to a new value. The page layout (layout information) includes the settings to the individual documents and pages, in other words, information held by the physical page information (see 1203 in FIG. 12) and does not need to be unified so that it is printed while the settings of the original documents are maintained.

Figures 26, 27:
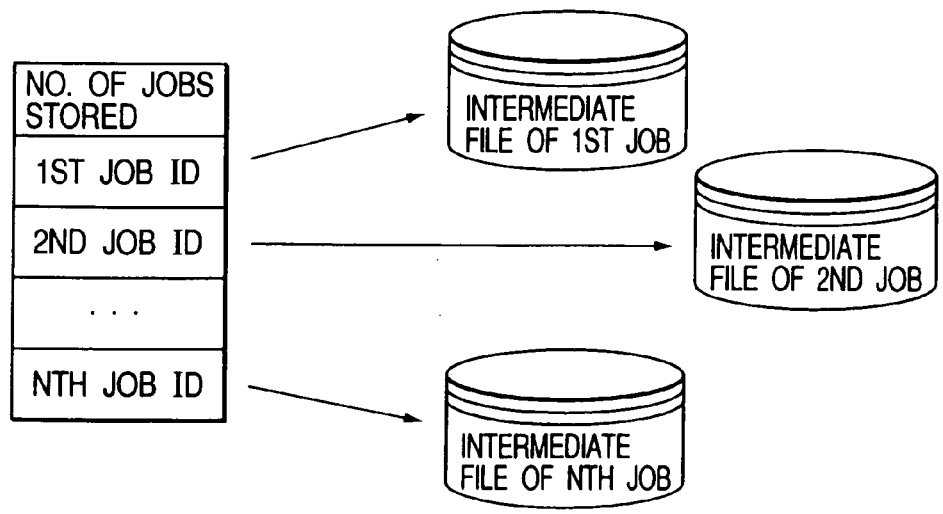
FIG. 26 shows one example of a classification showing the settings which are unified and the settings which are not unified upon unification and rounding off the settings when the jobs are composed together.
FIG. 27 shows one example of a data structure when the spool file manager 304 manages a plurality of print jobs.

A reason why the settings are changed or not changed in such a way upon combining the documents will be described below. Generally, there exist a number of kinds of print settings. They are classified into only one print setting which can exist for all the job obtained after the jobs are combined together and the printing settings which can exist in the respective jobs of the composed job and for each page. These print settings are shown in FIG. 26.

Only one setting that the composed job can have indicates a setting significant in stapling for all the job obtained by combining the document A with the document B as in the setting in stapling, however, is not significant in stapling only the part of the document B. In the case where it is desired to simply staple the document A and the document B together and output the stapled documents, the settings of four page printing and one page printing relative to the original documents are desirably stored. In practice, since a setting for printing a plurality of pages on one page is such a setting as to be allocated to the surface of a sheet to be printed, this setting does not need to be arranged for all the jobs upon combining the jobs together. The setting items can be located in mixture after the jobs are joined together.

Figure 23:
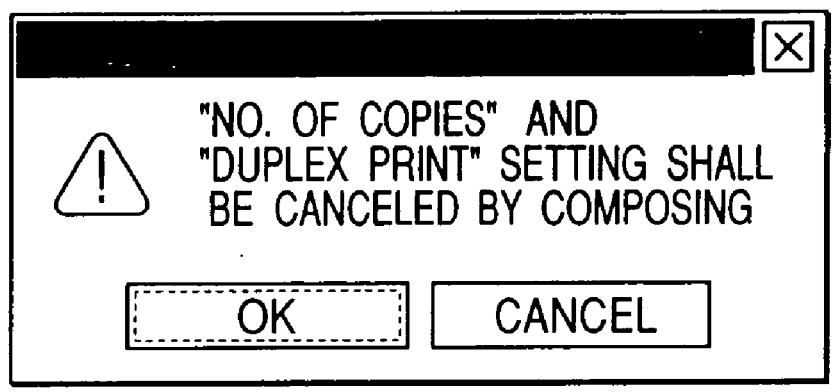
FIG. 23 shows one example of the user interface for requesting for the recognition of the unification and rounding off of the settings upon combination of the documents.

The recognition message in the step 2003 asks the user to recognize the setting items to be present in mixture or the setting items whose settings are unified in a system in which the settings can be provided in mixture even after the combination of the jobs. FIG. 23 described above presents to the user only items whose settings are unified. Since there exist actually a number of setting items, the recognition message may represent representative items as shown in FIG. 23 with good maneuverability instead of listing up all the items.

FIG. 29 is a view for explaining the logical structure of the intermediate file in which are roughly stored the setting information part of the print job and the data of each page of the job. The setting information part of the print job corresponds to the above described job setting file (SDF) in which not only the information of a structure body called DEVMODE or PDEVICE under a Windows environment, but also all items set by the printing dialog are stored. The data of each page is equivalent to the above described page description file (PDF). Depending on the package of a system, a structure having another substance for each page or a structure in which all data is accommodated in one file as shown in FIG. 29 may be employed. When a plurality of jobs are combined together, the SDF parts of the intermediate files of documents to be combined together are scanned, the contents of the settings are compared with each other and the settings are unified and rounded off.

Next, an internal data structure in the combining process will be described. FIG. 27 shows one example of a data structure (job management list) for managing the jobs listed up on the spool file manager 304. The spool file manager 304 adds the ID of the intermediate file to the job management list every time the intermediate file is spooled. As for the ID of the intermediate file, information which can specify the intermediate file from the ID, for example, are used as the ID a file name if the intermediate file is located in a file system, a pointer if the intermediate file is present in a memory, and so on.

Figure 28:
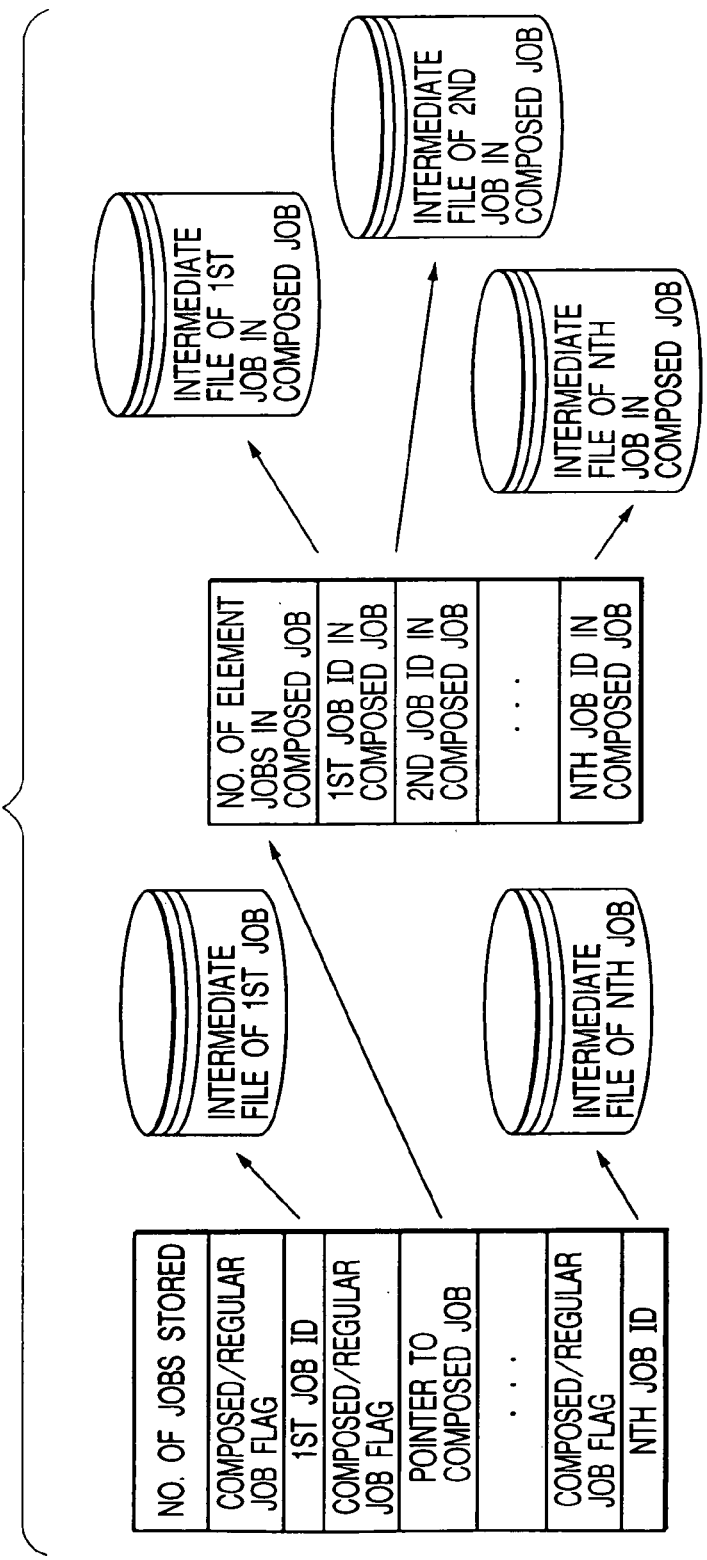
FIG. 28 shows one example of a data structure when the spool file manager 304 manages a plurality of print jobs and a plurality of composed jobs.

FIG. 28 shows one example of the job management list when the spool file manager 304 manages the composed jobs. In this example, in order to discriminate the composed job from ordinary job, a pair of a job ID and a flag for indicating whether or not the job is a composed job represents one job. When the flag shows the ordinary or regular job, the ID of the intermediate file is stored. When the flag shows the composed job, the ID of the composed job is stored.

In this case, since the composed job is managed in the memory, a pointer to a structure body which represents the composed job is stored. The structure body representing the composed job comprises the number of jobs in the composed job and the ID of the intermediate file of each print job in the composed job. In such a way, the intermediate file in which the data is actually stored is not directly operated but a logical value of the Job ID is operated, so that resources necessary for a job operation can be saved. Further, even when the jobs are repeatedly combined together, the structures of the files are maintained, and therefore, the jobs can be reset to their states when they are spooled.

Figure 32:
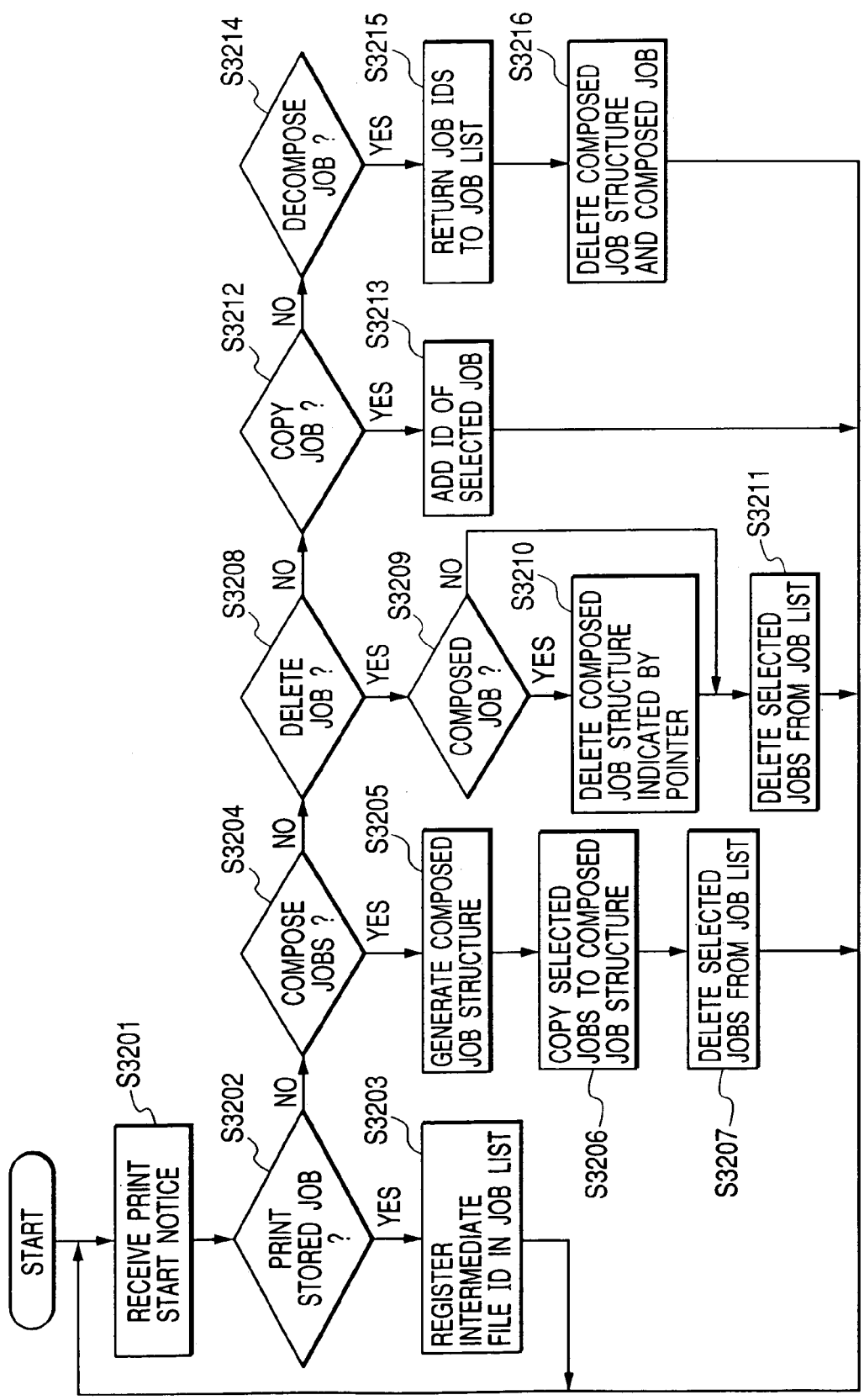
FIG. 32 is a flowchart showing one example of job editing processes in the spool file manager 304.

FIG. 32 is a flowchart showing job operation processes in the spooler 302 and the spool file manager 304.

In step 3201, the spooler 302 or the spool file manager 304 first receives a notice or print start notice from the user.

In step 3202, the spooler 302 decides whether or not the received notice is the job print notice of a store setting. In the step 3202, when the spool file manager 304 decides that the received notice is the print start notice of the store setting, the spool file manager 304 advances to step 3203 to register the intermediate file ID of the noticed print job in the job management list held by itself and return to the step 3201 in order to receive a next notice.

In the step 3202, when the spool file manager 304 decides that the received notice is not the job print start notice of the store setting, the spool file manager advances to step 3204 to decide whether or not the received notice is an instruction notice for combining the jobs together illustrated in FIG. 16. When the received notice is the instruction notice for joining the jobs together, the spool file manager 304 advances to step 3205 to prepare a composed job structure for managing the composed jobs by using the setting change editor 307.

Then, the spool file manager 304 advances to step 3206 to copy all the intermediate file IDs of the jobs to be combined together which are currently selected to the composed job structure prepared in the step 3205. Then, the spool file manager 304 advances to step 3207 to delete the jobs copied to the composed job structure from the job management list held by itself and add a composed job structure newly prepared in the step 3205 to the job management list. Then, the spool file manager 304 returns to the step 3201 to wait for a next input.

In the step 3204, when the received notice is not an instruction for combination of the jobs, the spool file manager 304 further advances to step 3208 to decide whether or not the received notice is an instruction to delete the jobs. When the notice is the instruction to delete the jobs, the spool file manager 304 advances to step 3209 to decide whether a job instructed to be deleted is a composed job or an ordinary job. Here, when the spool file manager decides that the job is the composed job, the spool file manager 304 advances to step 3210 to delete the composed job structure located at the end of the pointer which is registered in the job management list, and moves to step 3211 to delete the job instructed to be deleted from the job management list.

In the step 3209, when the spool file manager 304 decides that the job instructed to be deleted is not a composed job, the spool file manager 304 jumps step 3210 and advances to step 3211 to delete the job from the job management list. Then, the spool file manager 304 returns again to the step 3201 to wait for a next input.

In the step 3208, when the spool file manager 304 decides that the received notice is not the instruction to delete the jobs, the spool file manager 304 proceeds to step 3212 to decide whether or not the received notice is an instruction to duplicate the job. When the spool file manager 304 decides that the notice is the instruction to duplicate the job, the spool file manager 304 adds a job ID to be duplicated which is currently selected to the job management list. In the case of the composed job, a pointer showing the composed job structure may be similarly copied to the job management structure. However, according to the simply copying system, a management upon deletion of the job is complicated, so that the number of times of referring to the job needs to be stored in another list. Otherwise, may be adopted a management system the intermediate file or the composed job structure itself is copied and another ID is attached thereto. In this case, a deletion process can be simply managed, however, time required for copying the intermediate file or resources for storing the copied intermediate file are excessively consumed, these systems need to be separately employed depending on the characteristics of the systems.

Then, the spool file manager 304 returns again to the step 3201 to wait for a next input. In the step 3212, the spool file manager 304 decides that the received notice is not the instruction to duplicate the job, the spool file manager 304 advances to step 3214 to decide whether or not the notice is an instruction to decompose the job. When the spool file manager 304 decides that the notice is the instruction to decompose the job, the spool file manager 304 proceeds to step 3215 to return all the job IDs held in the composed job structure indicated by the job pointer of the job to be decomposed to the job management list, delete the job to be decomposed from the job management list and also delete the composed job structure. Then, the spool file manager 304 displays the job icon of the single job on the user interface screen illustrated in FIG. 16.

Figure 25:
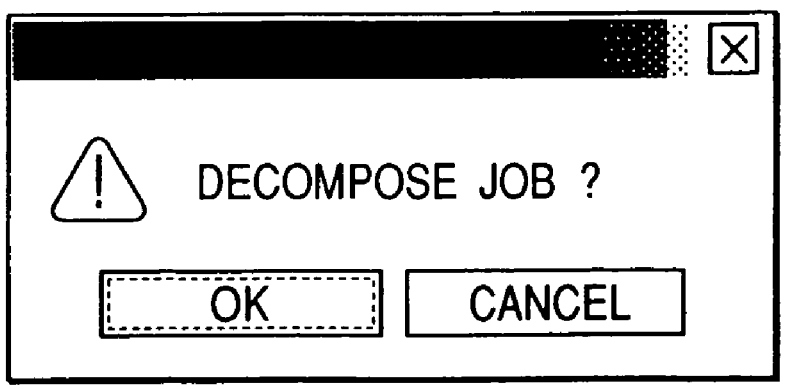
FIG. 25 shows one example of a recognition message when the jobs are decomposed.

Further, before moving to step 3215, a message for recognizing whether the composed job is to be truly decomposed may be displayed as illustrated in FIG. 25. Then, the spool file manager 304 returns again to the step 3201 to wait for a next input.

Now, the operation of the composed job will be described below. The data structure used upon preview of the print process of the composed job is managed by the configuration including the jobs—the sheet (obverse/reverse side)—the logical pages as shown in FIGS. 10 to 14. However, the information of the composed job is managed for each job as illustrated in the composed job structure (job output setting file) in FIG. 28. Therefore, in the present system, the respective print jobs composing the composed job can be operated for each of them.

FIG. 30 illustrates one example of the user interface for changing the setting of the composed job. In an area designated by 3001, the list of the print jobs included in the composed job is displayed. A job order change interface designated by 3002 is operated so that the order of the jobs can be changed. An uppermost button of the job order change interface 3002 is a button for moving a selected print job to the first (uppermost) position in the composed job. A next button is a button for rearranging in order a selected print job to the position of a print job higher by one than the former. A next button is a button for rearranging in order a selected print job to the position of a print job lower by one than the former. A downmost button is a button for moving a selected button to the last (downmost) position in the composed job. As described above, the job order change buttons are operated so that the order of the print jobs can be changed in the composed job. More specifically, according to the present system which cannot be achieved by the prior art, a job 1, a job 3 and a job 5 are successively spooled by the application A, a job 2 is spooled by the next application B, and a job 4 is sequentially spooled by the application C, the jobs are combined together, and then, the order change buttons are operated, so that they can be arranged in regular order such as the job 1, the job 2, the job 3, the job 4 and the job 5 and an operability is extremely improved. With the order change, physical page numbers (or job IDs) of the job output setting file are updated.

Further, a job deleting interface designated by 3003 is operated so that the print job can be deleted from the composed job. The print job is deleted so that a corresponding physical page number or logical page number in the job output setting file is updated.

Figure 33:
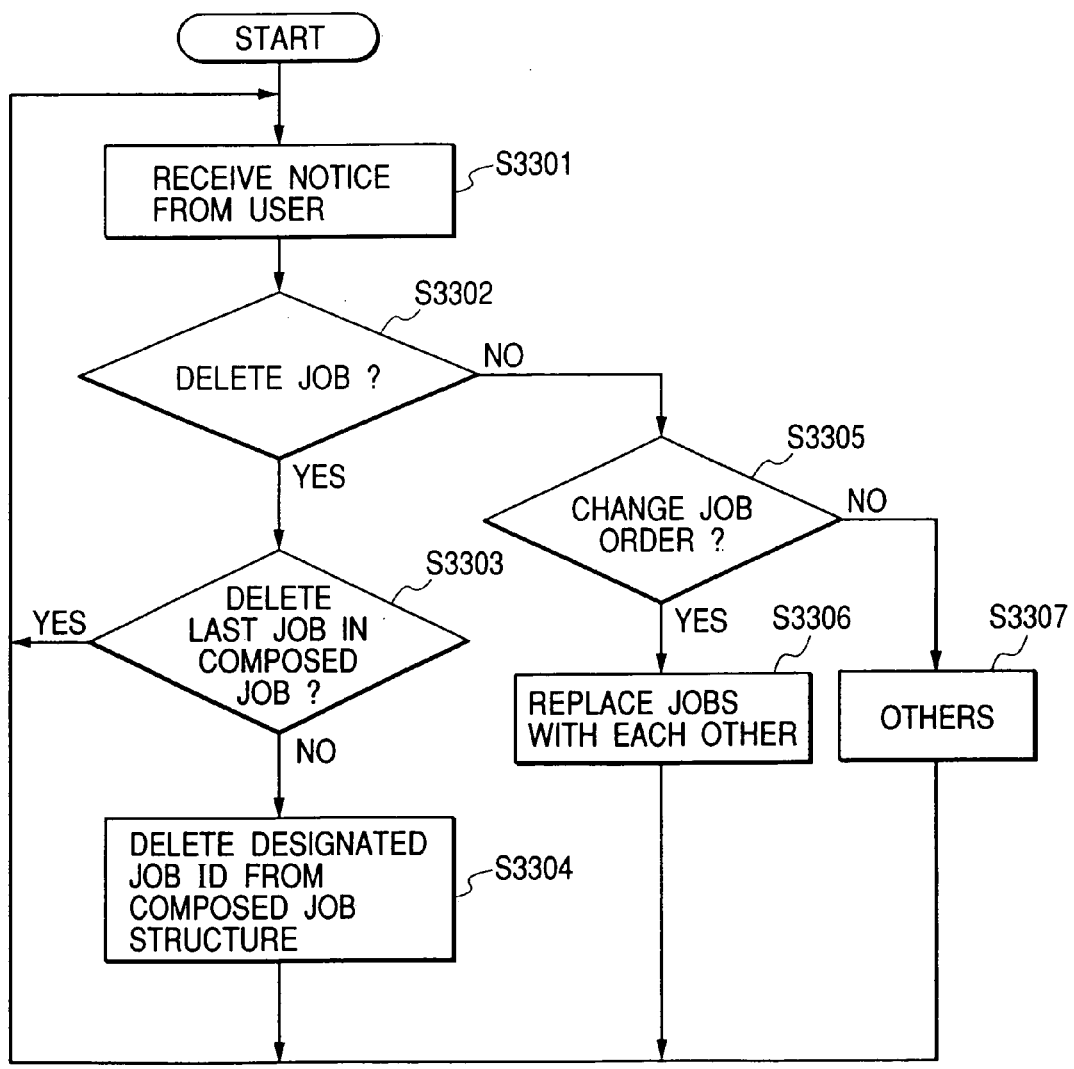
FIG. 33 is a flowchart showing one example of processings in the spool file manager 304 when the composed job is edited for each job in the setting change editor 307.

FIG. 33 is a flowchart showing a processing flow when jobs are reshuffled and jobs are deleted.

In step 3301, the spool file manager 304 receives an input from the user.

Then, the spool file manager 304 advances to step 3302 to decide whether or not the input from the user is a request to delete a job. When the spool file manager 304 decides that the input from the user is the deletion request for the job, the spool file manager 304 advances to step 3303 to decide whether or not the job is the last job in the composed job. In the case where data is not present in the composed job as a result of executing the deletion, the spool file manager returns to the step 3301 to wait for a next input without performing any process. In the case where data is not present in the composed job after the deletion of the job in accordance with the process of the user interface, it is to be understood that the user may not select the deletion from the first.

In the step 3303, when the spool file manager 304 decides that the data is not exhausted even when the selected job is deleted, the spool file manager 304 advances to step 3304 to delete the ID of the job instructed to be deleted from the composed job structure. FIG. 31B shows an example of a change in the data structure in accordance with the process in the step 3304. In this example, the second job is deleted. The ID indicating the second job is deleted from the composed job structure and jobs arranged after the second job are shifted to an unoccupied position. Further, data for holding the number of jobs in the composed job is decreased by one to complete a deleting process.

In the step 3302, when the spool file manager 304 decides that the input from the user is not the request to delete the job, the spool file manager 304 advances to step 3305 to decide whether or not the input from the user is an instruction to rearrange the job order. In the step 3305, when the spool file manager 304 decides that the input from the user is the instruction to rearrange the job order, the spool file manager advances to step 3306 to replace the ID of the job to be moved which is currently selected by the ID of a job to which the former moves. FIG. 31A shows an example in which the second job is moved to the first position in accordance with a change of the data structure upon change of the job order. The job ID held in the position of the first job of the composed job is replaced by the job ID held in the position of the second job, so that the order change of the jobs can be realized. In the step 3305, when the spool file manager decides that the input from the user is not the instruction to rearrange the job order, the spool file manager 304 performs a process in accordance with other instructions to return to the step 3301.

Now, an operation for each page will be described hereinafter. The page can be deleted for each logical page in accordance with a control process indicated by 3004 in FIG. 30. In this case, the physical page information file is operated. Since the preview is displayed in 3005 of FIG. 30, the physical page information file is already prepared from the job management list.

Figure 34:
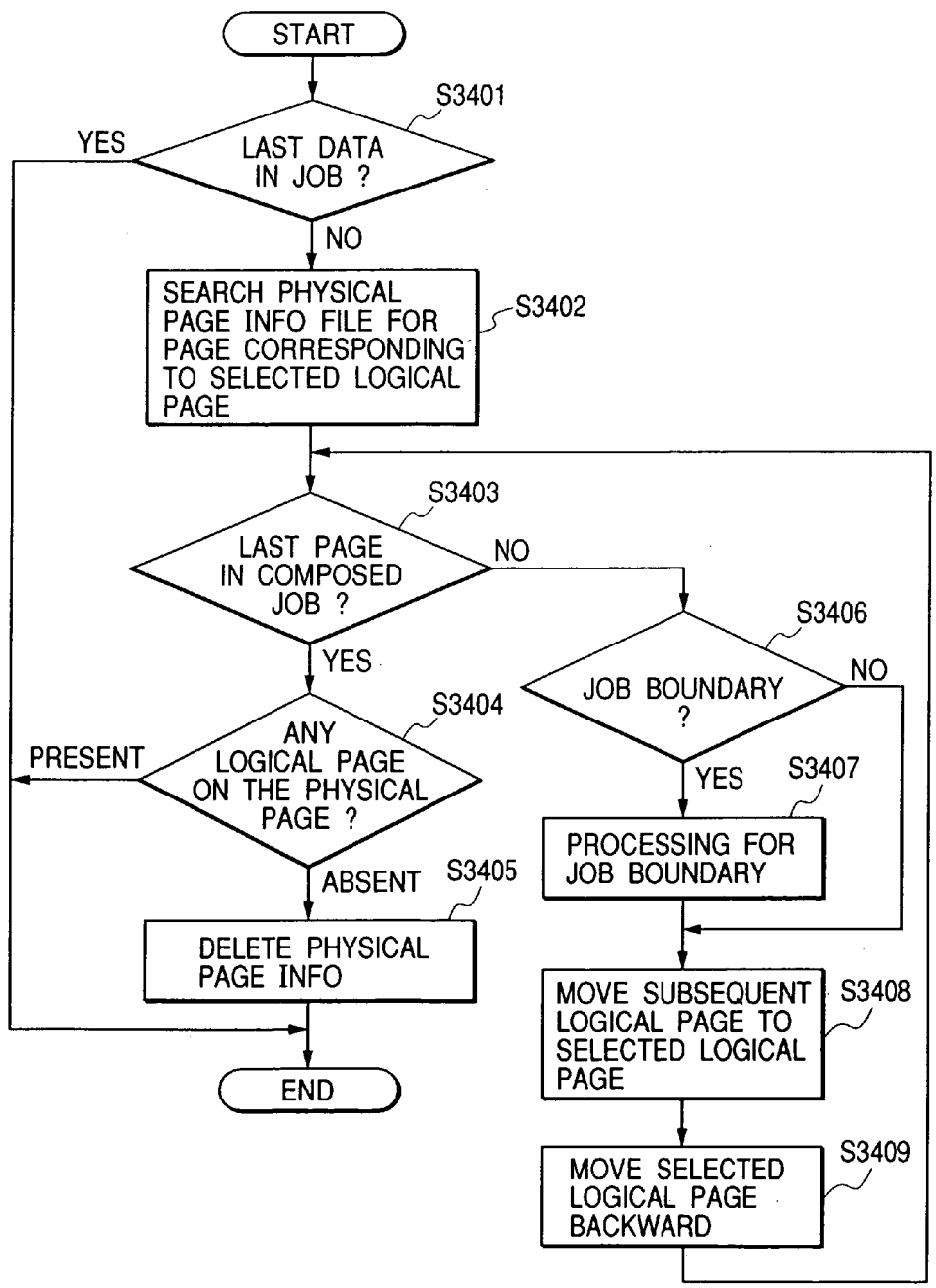
FIG. 34 shows a flowchart showing one example of processes in the spool file manager 304 upon cancelling the print jobs for each page by the setting change editor 307.
Figure 35:
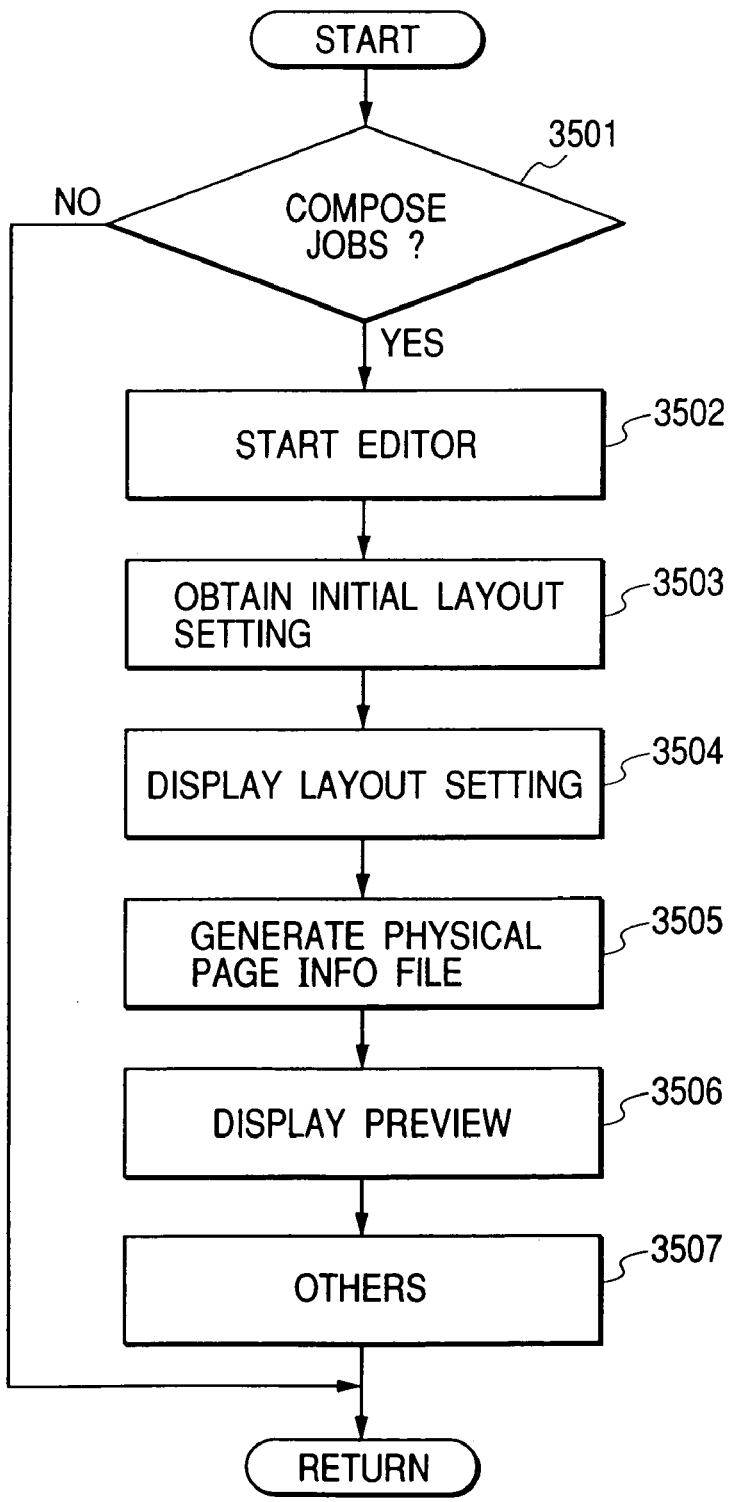
FIG. 35 shows one example of a processing flow for composing the jobs together in the spool file manager 304.

FIG. 34 is a flowchart for explaining a process for deleting logical pages. This flowchart is planned for the composed job, however, the same flow can be applied to the single job except that processes in the boundary of the composed job and the single job are different from each other.

In step 3401, the spool file manager 304 first decides whether or not a page to be deleted is the last data of the job. In the case where there exists no data in the job due to the deletion of the page, the deleting process is not carried out to finish the processes.

In the step 3401, when the spool file manager 304 decides that the page to be deleted is not the last data, in other words, the page may be deleted, the spool file manager 304 advances to step 3402 to search for a page corresponding to a logical page selected on the preview from the physical page information file. Then, the spool file manager advances to step 3403 to decide whether or not the file corresponds to the last page of the composed job.

When the page is not the last page of the composed job, the spool file manager 304 advances to step 3406 to further decide whether or not the page is the last page of a job boundary, in other words, the last page of element jobs composing the composed job. Here, the job boundary is decided only when a special process needs to be performed in the job boundary. The examples of the special processes in the job boundary are enumerated as described below. In the case of the duplex printing, when the last page of the job A is printed on the front surface, if it can be set whether or not the first page of the subsequent job B is printed on the back side of the sheet, any print is not performed on the back side of the last page so that the first page is printed on the front surface of a next sheet depending on the setting, the first page of the job B is successively printed on the back surface, or the physical page information file is configured to be divided.

In the step 3406, when the spool file manager 304 decides that the page is located in the job boundary, the spool file manager 304 advances to step 3407 to perform the process of the job boundary and moves to step 3408. In the step 3406, the spool file manager decides that the page is not a job boundary page, the spool file manager 304 advances to the step 3408. In the step 3408, the spool file manager 304 shifts a page subsequent to the logical page to be processed so as to fill an unoccupied page with the page. Then, the spool file manager 304 advances to step 3409 to move backward the logical page to be processed by one and returns to the step 3403. As a result of the successive repetitions, when the processes advance to the last page of the composed job, the spool file manager 304 decides that the page is the last page in the step 3403 and moves to step 3404.

In the step 3404, the spool file manager 304 decides whether there is no logical page on the final physical page to be currently processed as a result of moving the page. When there is not any logical page to be displayed on the physical page, the spool file manger 304 advances to step 3405 to delete the physical page information itself. When the physical page is empty and the logical page does not exist, the spool file manager 304 finishes the process without deleting the physical page.

As described above, according to the present embodiment, the information processor for generating printing data to be transmitted to a printer comprises an intermediate code converter for converting data to be printed which is generated by an application into the print jobs of intermediate code format and temporarily storing the print jobs in association with the print setting information of the data to be printed; a composition instructing unit for instructing a plurality of print jobs corresponding to the different data to be printed to be combined together so as to generate one composed job; and a setting unifier for analyzing the print setting information of a plurality of print jobs when the composition instructing unit instructs the plurality of print jobs to be combined together so as to obtain one composed job, and generating print setting information for the composed job in which information that can be respectively merely set to one print job is unified. Therefore, a plurality of print jobs respectively having the print setting information can be joined together. Further, the inconvenience in the print setting upon joining the print jobs together can be eliminated.

Further, since the setting unifier further includes a recognizing unit for analyzing the print setting information of a plurality of print jobs to be combined together and recognizing to select whether the settings are unified or the print jobs are not combined together when information which can be respectively set only to one print job is mutually different, the combination or composition of the jobs which is not desired by a user can be avoided.

[Layout Unifying Process]

Figure 38:
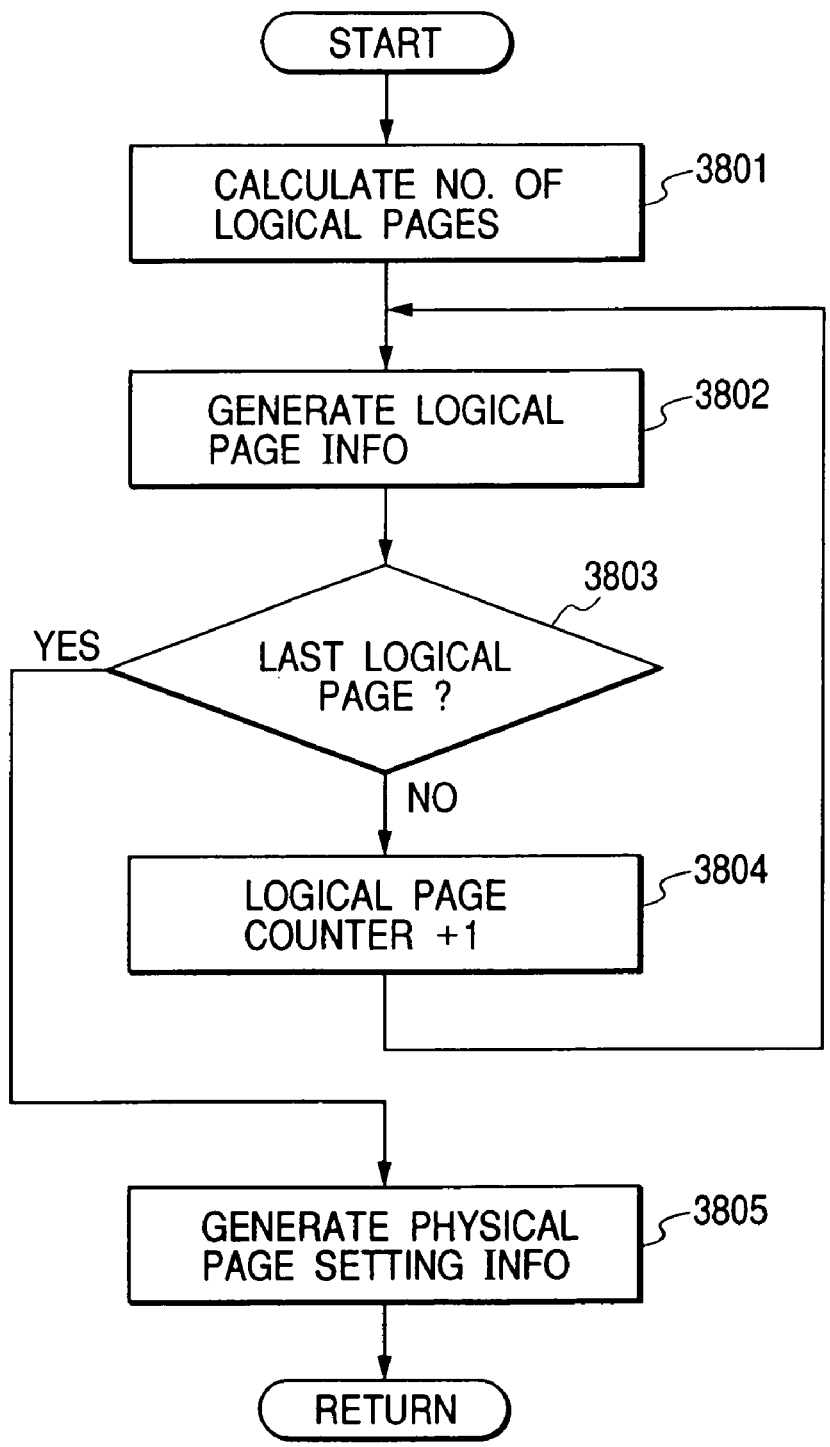
FIG. 38 shows one example of a processing flow for calculating physical page information.
Figure 39:
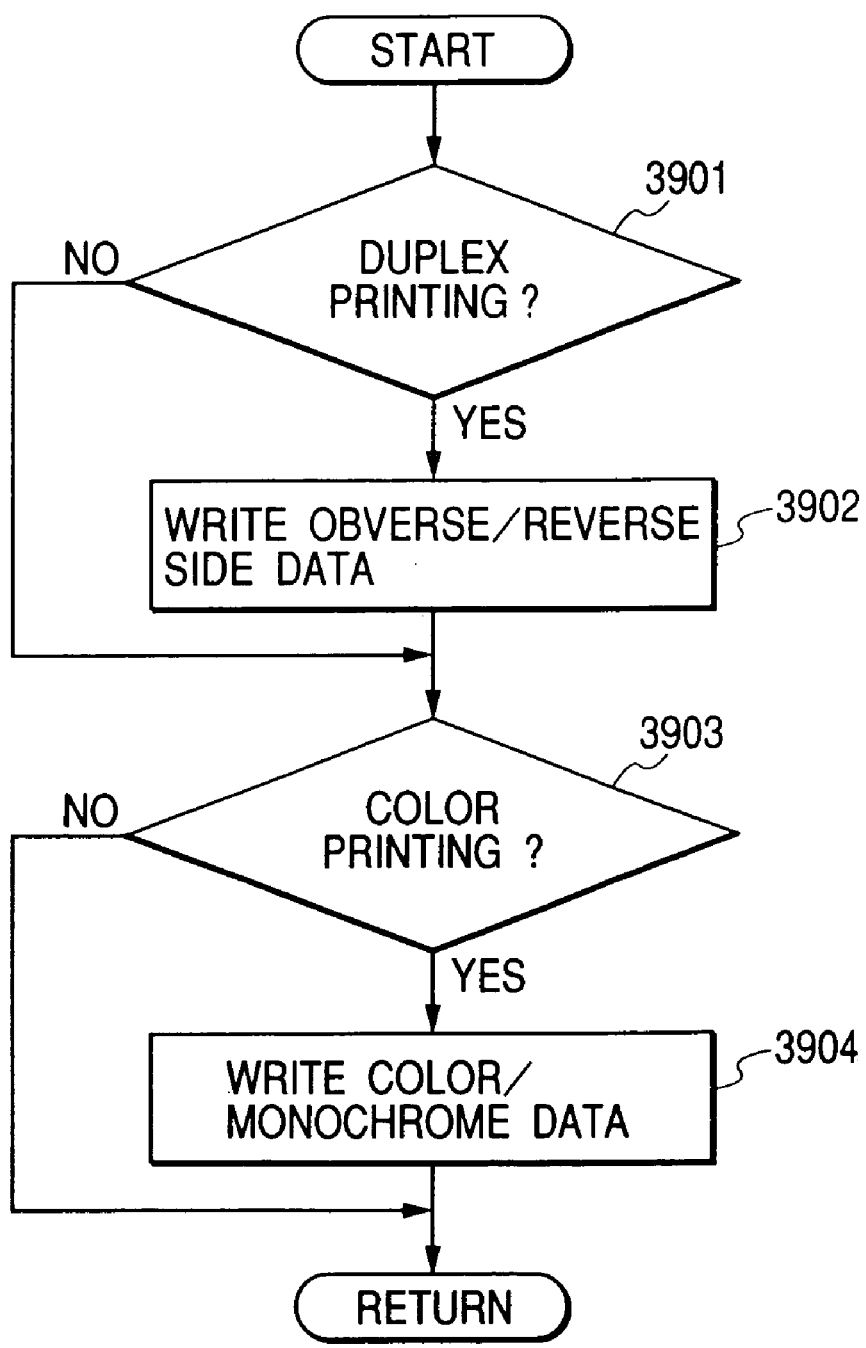
FIG. 39 shows one example of a processing flow for obtaining physical page setting information.
Figure 40:
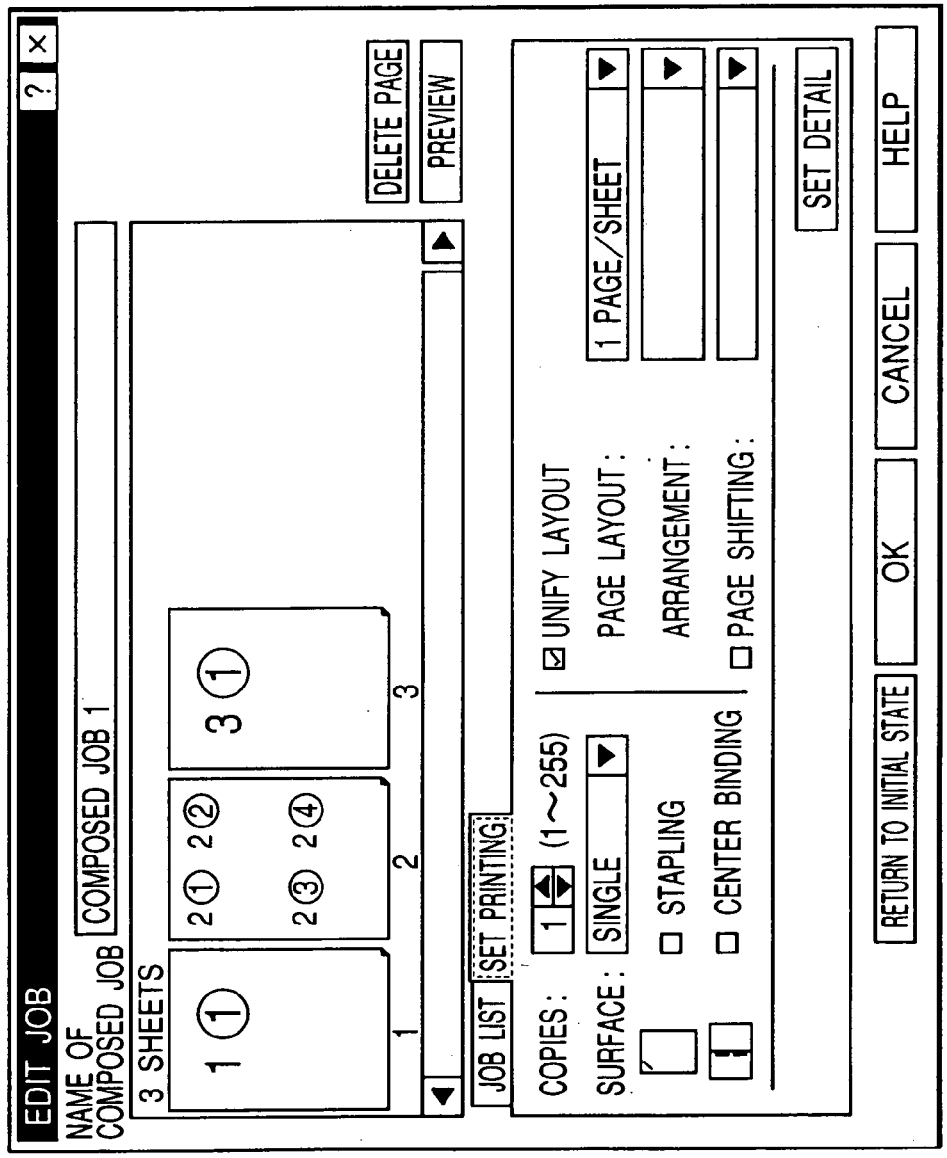
FIG. 40 shows one example of a screen of the setting change editor 307.
Figure 41:
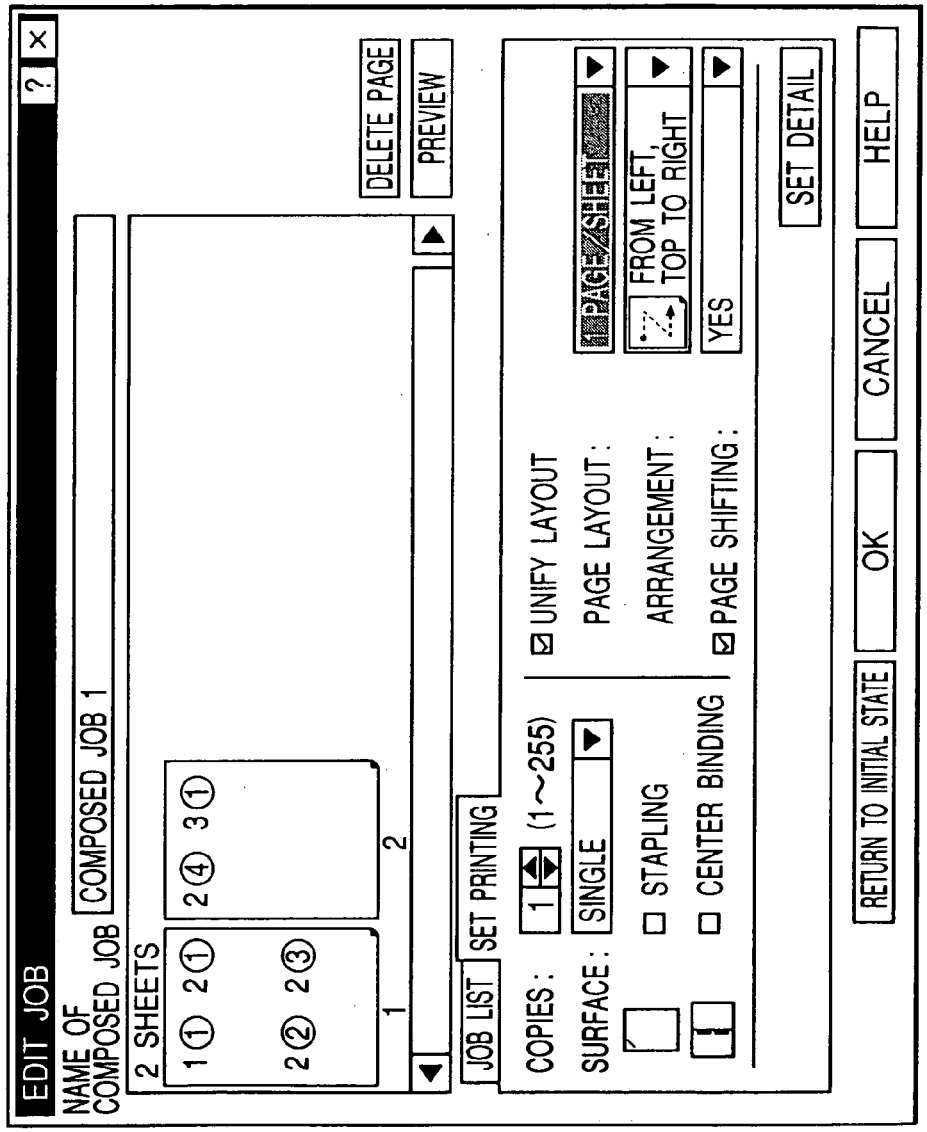
FIG. 41 shows one example of a screen of the setting change editor 307.

FIGS. 35 to 39 respectively roughly show a processing flow for explaining a "layout unifying process" in the spool file manager 304 and the setting change editor 307 which is one feature of the present invention. FIGS. 40 to 41 respectively show examples of the setting change editor 307. The summary of the present invention will be described by using the above described means.

As described above, when a plurality of print jobs are stored on the spool file manager 304, the list of the print jobs are displayed as illustrated in FIG. 16 so that the spool file manager 304 waits for an operation instruction. Then, when a plurality of jobs are selected from the list and a combining instruction set to the menu or the icon is supplied, it is decided in a deciding step S3501 for deciding whether or the combining instruction is supplied that the combining instruction is supplied. Then, the setting change editor 307 as shown in FIG. 18 is started in the start step S3502 of the setting change editor 307. Then, as described above, the job output setting files (see FIGS. 10 to 14) are generated. Thus, while the print jobs spooled in the intermediate files are listed up and displayed as shown in FIG. 16, when a plurality of print jobs are selected and the instruction of "combination of jobs" is supplied, the instructed print jobs are simply sequentially combined together from an upper part. In other words, the page layout information for each physical page of the composed job is prepared in the job output setting file on the basis of the job setting files (including the page layout information) of the respective single jobs.

Then, in order to display a print setting tab and the preview shown in FIG. 18, a next initial layout setting obtaining step S3503 is performed. Here, the layout indicates what number of logical pages are assigned to one physical page and how the logical pages are arranged. For instance, if one logical page is assigned to one physical page, 1 up is used as a terminology, and when two logical pages are assigned to one physical page, 2 up is used as terminology. The initial layout setting obtaining process is carried out in order to determine the initial layout upon combining the jobs together. As the initial layout, the layouts in which the respective print jobs are held as they are may be utilized or a layout which is unified on the basis of a prescribed rule may be utilized.

As the prescribed rule, there may be considered various rules that the initial layout needs to meet the print job first selected on the spool file manager 304, to meet the print job located at the first position on the list, to meet most of the layouts of a plurality of print jobs, to meet a layout predetermined as a setting of default, etc. In this case, the layout unified on the basis of the prescribed rule is not employed as the initial layout, but the layout in which the respective print jobs are held as they are is adopted. Since the layout information can be provided for each physical page in the job output setting file, the page layout information of the original jobs can be provided as described above and the page layout information of the jobs before the combination thereof can be effectively employed as they are upon combining the jobs together.

Then, the state of the initial layout is displayed on the print setting tab in FIG. 18 by a layout setting display step S3504. As described above, since the layout in which the respective print jobs are held as they are is used (not the layout unified by the prescribed rule), the arrangement order of the layout or the like is displayed in grey. Then, a preparing step S3505 of the physical page information file is carried out. This step is a process for preparing the physical page information files shown in FIGS. 10 to 14 on the basis of the determined layout. This process will be described below in more detail. A next preview display step S3506 is performed. This is a process for displaying the preview part shown in FIG. 18. Here, since the layout in which the respective print jobs are held as they are is employed, the composed job is formed and displayed while the layout before a plurality of print jobs are combined together as illustrated in FIG. 40 is maintained. More specifically, in FIG. 40, a job 1 corresponds to one logical page of "one page/sheet", a job 2 corresponds to four logical pages of "four pages/sheet", and a job 3 corresponds to one logical page of "one page/sheet". In the case where the composed job is formed by these three jobs, the layout information thereof are respectively individually stored, so that a small preview with a plurality of layouts mixed is obtained. Besides, even when a large preview is displayed, the preview in which a plurality of layouts are mixed likewise is displayed.

Figure 37:
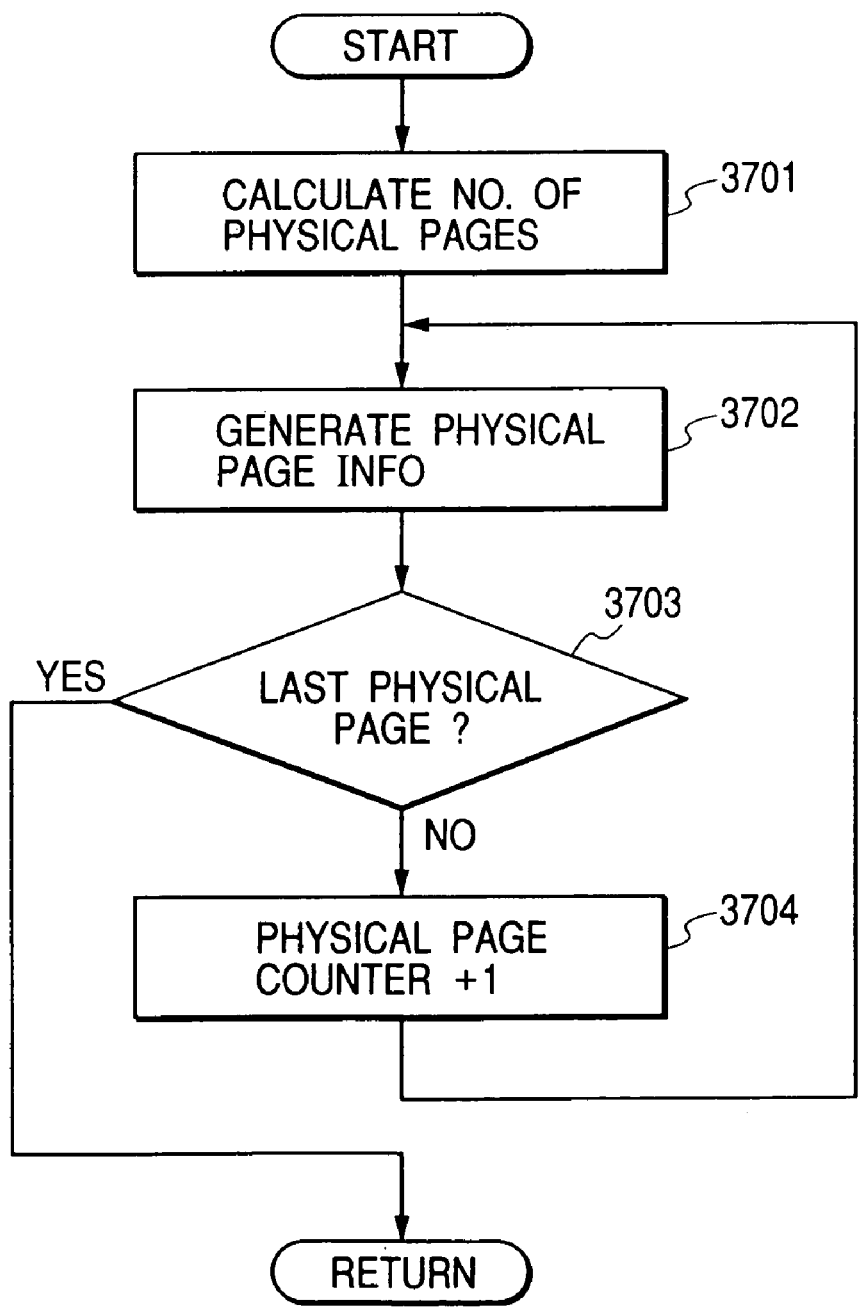
FIG. 37 shows one example of a processing flow for preparing and changing a setting file for outputting a job.

Now, for preparing the layout, the detail of the preparing step S3505 of the physical page information file will be described by way of FIGS. 37 and 38.

Initially, the calculating process 3701 of the number of all the physical pages is carried out. This is a process for calculating how many physical pages the composed job has. Here, since the layouts of the jobs before joined are held, the number of jobs is equal to the number of all the physical pages of the jobs to be combined together. Then, the calculating process 3702 of the physical page information is performed. This is a process for preparing the physical page information of each job which constitutes the composed job. The detail of the process is shown in FIG. 38.

In the calculating process of the physical page information, a calculating process 3801 (see FIG. 38) for calculating the number of the logical pages allocated to the physical page is first executed. This is a process for calculating the number of logical pages allocated to each physical page. In the case of the first physical page shown in FIG. 40, 1 equal to the number of jobs before combined together is calculated. Then, a calculating process 3802 of the logical page information is carried out. This is a process for calculating each logical page information indicating the physical page which is a process for calculating the information as shown in FIG. 14. Since the layouts of the jobs before combined together are held in the job output setting file of the composed job, the logical page information is the same as the logical page information of the original job corresponding to the physical page. In the case where the layouts are unified, the logical page information is based on one layout after the unification of the layouts. Then, a deciding process 3803 for deciding whether or not the logical page is the last and an increment process 3804 of a logical page counter are carried out, so that the logical page information corresponding to the number of logical pages which is previously calculated is obtained. Then, a calculating process 3805 of the physical page setting information is performed. This is a process for calculating the physical page setting information shown in FIG. 13. The detail of the calculating process will be shown in FIG. 39.

In the obtaining process 3805 of the physical page setting information, a deciding process 3901 (see FIG. 39) for deciding whether the duplex side printing is performed is first carried out. This is a process for deciding whether the printing setting is the single side printing or the duples side printing. When it is decided that the print setting is the duplex side printing, a next obverse/reverse side writing process 3902 is carried out. This is a process for deciding whether the physical page is located in the obverse side or the reverse side and writing the obverse/reverse side data. Here, the single side printing is supposed to be executed, so that the data is not written. Then, a deciding process 3903 for deciding whether or not the print setting is a color printing is performed. This is a process for deciding whether the print setting is the color printing or a monochrome printing. Here, when it is decided that the print setting is the color printing, a next color/monochrome writing process 3904 is carried out. This is a process for deciding whether or not the logical pages to be printed in color are included in the physical page. When the logical pages to be printed in color are included, color data is written, and when the logical pages are not included, monochrome data is written. Here, the monochrome printing is supposed to be executed, so that the monochrome data is not written. In such a way, the physical page setting information is generated and obtained.

Then, the processes return to those of FIG. 37 to calculate the physical page information corresponding to the number of all the physical pages previously acquired by a deciding process 3703 for deciding whether or not the physical page is the last and an increment process 3704 of the physical page counter.

The physical page information file is prepared and the layout is formed in accordance with a series of the above described processes.

Further, the mixture and unification of the layouts may be changed by the setting change editor 307.

Here, there is described an example in which a check box of "unify layout" is provided in the print setting tab of the setting change editor 307 as shown in FIG. 18. Further, it is assumed that the layouts in which the respective print jobs are held as they are utilized upon initialization of the combination of the jobs and the combining setting as shown in FIG. 40 is carried out by the similar operation in the present embodiment (a plurality of jobs are selected in FIG. 16 and instructed to be combined together).

Figure 36:
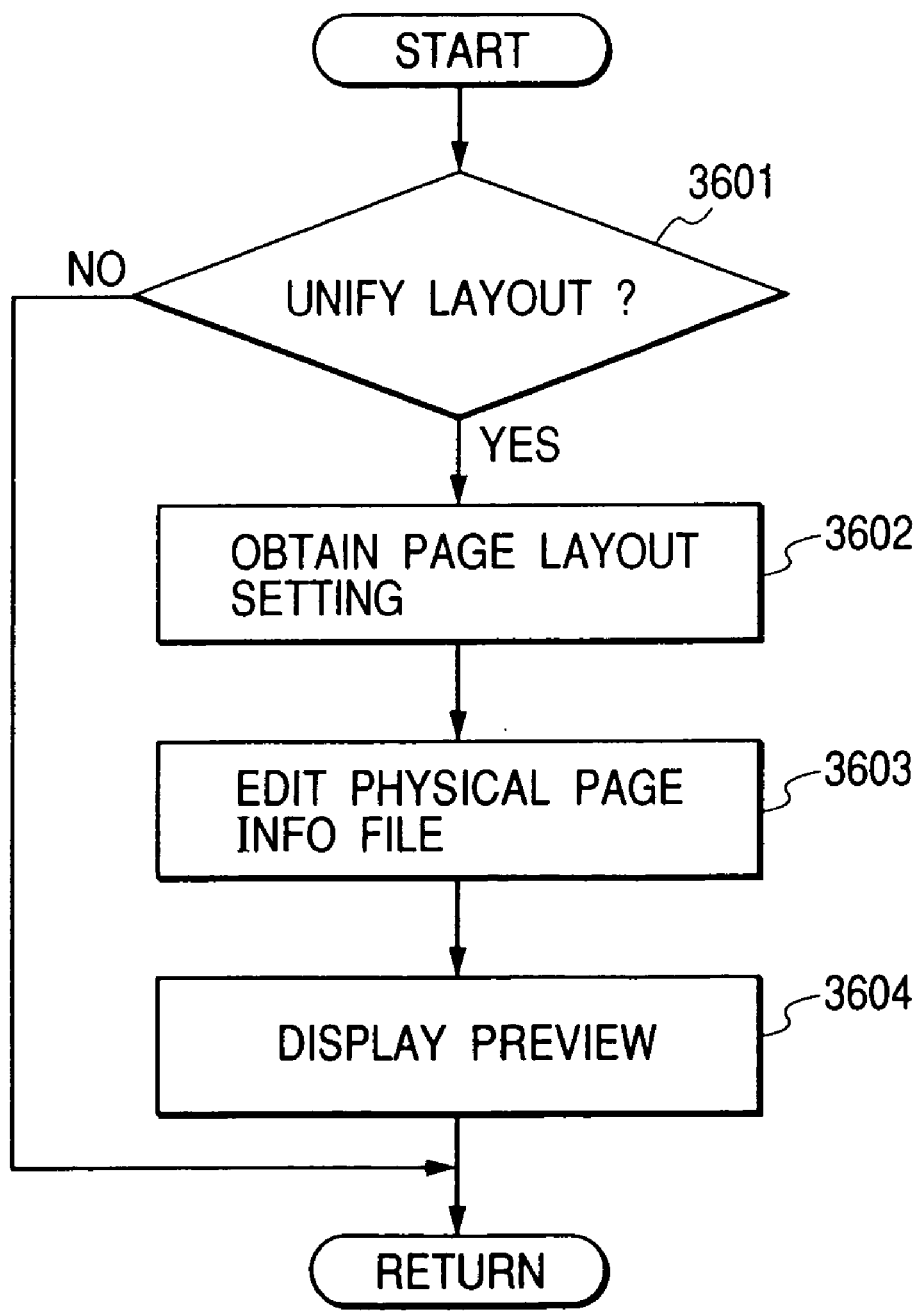
FIG. 36 shows one example of a processing flow for changing a layout in the setting change editor 307.

Referring to FIG. 36, a deciding process 3601 for deciding whether or not there is an instruction to unify layout is first carried out. When the user desires the composed job to unify the layouts, the "unify layout" button is pushed down on the user interface shown in FIG. 18 to instruct to unify the layouts. Thus, it is decided that there is the instruction to unify the layouts. Then, an obtaining process 3602 for setting a page layout, an arrangement order, and an intrusion. The initialization thereof is obtained in accordance with a predetermined rule. This rule may include various kinds of rules. For instance, the layout is adapted to meet the layout of the initially selected print job on the spool file manager 304, to meet that of the first print job on the list, to meet most of the layouts of a plurality of print jobs, to meet the layout predetermined as the setting of a default, etc. Here, it is assumed that the layout is adapted to meet the layout predetermined as the setting of a default, and, in the layout of 4up, from an upper part in the left side to the right, the intrusion of the jobs is determined to be permitted. As for the intrusion of the jobs (page shifting process), for instance, in the case where the number of logical pages is 3 in the layout of 4-up, the logical page equivalent to one remaining page can be compactly shifted. In this case, can be performed a selection for deciding whether the first logical page of a next job is laid out on the last of the physical page (intrusion designation), the first logical page is laid out on the first of another physical page (designation without intrusion) or the first logical page is laid out on the first of the back side (intrusion designation on reverse side).

Then, an editing process 3603 of the physical page information file is carried out to the setting mentioned above. This is a process for editing the physical page information files shown in FIGS. 10 to 14 according to the determined layout. This process will be described later in more detail. A next preview process 3604 is carried out on the basis of the physical page information files edited in the above process. This is a process for displaying the preview part shown in FIG. 18. Here, since the layout of 4 up from the upper part in the left side to the right in which the intrusion of the jobs is permitted is adopted, the composed job is formed and displayed as illustrated in FIG. 41. On the job output setting file, "4" is designated as the number n of the logical pages allocated to all the physical pages of the physical page information (see 1203 of FIG. 12).

Now, in connection with the formation of the layout, the detail of the editing process 3603 of the physical page information file concerning the job output setting file will be described below.

The calculating process 3701 for calculating the number of all the physical pages. This is a process for calculating again how many physical pages the composed job has in accordance with the designation of "unify layout" of the composed job. If the setting is such a setting as to permit the intrusion of the jobs, the number of physical pages will be changed. Considering the examples of FIGS. 40 to 41, 2 physical pages are obtained. Then, the calculating process 3702 for calculating the physical page information is carried out. This is a process for preparing each physical page information forming the composed job and the detail thereof is shown in FIG. 22.

In the calculating process 3702 of the physical page information, the calculating process 3801 (see FIG. 38) for calculating the number of logical pages allocated to the physical page is first carried out. This is a process for calculating the number of logical pages allocated to each physical page. In the case of the first physical page shown in FIG. 41, a prescribed value, or "4" is calculated in the present embodiment by unifying the layouts. As described above, the number of logical pages allocated to the physical page may be determined on the basis of the layout information of the first single job of the composed job. In this case, since the job 1 is designated by "1", the number of logical pages is "1".

Then, a calculating process 3802 of the logical page information is carried out. This is a process for calculating each logical page information indicating the physical page which is a process for calculating the information as shown in FIG. 14. Then, a deciding process 3803 for deciding whether or not the logical page is the last and an increment process 3804 of a logical page counter are carried out, so that the logical page information corresponding to the number of logical pages which is previously calculated is obtained. And the number of the logical pages is obtained. Then, a calculating process 2205 of the physical page setting information is performed. This is a process for calculating the physical page setting information shown in FIG. 13. The detail of the calculating process is shown in FIG. 39.

In the obtaining process 3805 of the physical page setting information, a deciding process 3901 for deciding whether the duplex side printing is performed is first carried out. This is a process for deciding whether the printing setting is the single side printing or the duplex side printing. When it is decided that the print setting is the duplex side printing, a next obverse/reverse side writing process 3902 is carried out. This is a process for deciding whether the physical page is located in the obverse side or the reverse side and writing the obverse/reverse side data. In the case of the duplex side printing, the logical pages allocated to the obverse side and the reverse side may be possibly changed due to the unification of the layouts. Here, it is assumed that the single side printing is employed and the data is not written.

Then, a deciding process 3903 for deciding whether or not the print setting is a color printing is performed. This is a process for deciding whether the print setting is the color printing or a monochrome printing. Here, when it is decided that the print setting is the color printing, a next color/monochrome writing process 3904 is carried out. This is a process for deciding whether or not the logical pages to be printed in color are included in the physical page. When the logical pages to be printed in color are included, color data is written, and when the logical pages are not included, monochrome data is written. Also in this case, the color pages included in the physical page may be possible changed by unification of the layout. Here, the monochrome printing is supposed to be executed, so that the monochrome data is not written.

In such a way, the physical page setting information is generated and obtained. The job output setting file including the physical page setting information thus generated is formed by copying the original job output setting file before the layouts are unified and writing the physical page setting information in the job output setting file thus formed. Thus, when a "return to initial state" button is pushed down on the user interface for editing the jobs (shown in FIG. 18 or FIG. 40), the contents of the job output setting file can be returned to those of the job output setting file before the layouts are instructed to be unified. Further, in the user interface for editing the jobs, when an "OK" button is pushed down, a duplicated and updated job output setting file is overwritten on the original job output setting file, so that the contents of the job output setting file before the layouts are unified are erased. In this case, in the user interface shown in FIG. 16, when the user selects the composed job and instructs the composed job to be decomposed, the composed job is decomposed to the individual single jobs. The respective job setting files are always held in the spool file 303 for the single jobs. Therefore, the most primary print setting is unchangeably ensured.

Then, the process returns to that of FIG. 37 to calculate again the physical page information corresponding to the number of all the physical pages previously obtained by the deciding process 3703 for deciding whether or not the physical page is the last or the increment process 3704 of the physical page counter.

In accordance with a series of processes, the physical page information file is edited and the layout is regenerated. It is to be understood that the present invention may be applied to a system comprising a plurality of devices such as a host computer, interface devices, a reader, a printer, etc. or an apparatus comprising one device such as a copying machine, a printer, a facsimile equipment, etc.

As described in the above embodiment, since the information processor according to the present invention further comprises the layout unification instructing means for instructing the layout information of the composed job to be unified, and, when an instruction is provided for instructing the layout information to be unified, the layout information of the composed job is unified by all the physical pages, the unified layout information can be provided for the composed job even when a plurality of print jobs having a plurality of layout information are combined together.

Further, the objects of the present invention can be achieved by reading and executing a program code stored in a memory medium in which the program code of software for realizing the above described functions of the embodiment by the use of the computer or a CPU 101 or an MPU) of a system or an apparatus.

In this case, the program code itself read from the memory medium realizes the above described functions of the embodiment and the memory medium in which the program code is stored constitutes the present invention.

As the memory medium for supplying the program code, may be utilized, for example, a floppy disk, a hard disk, an optical disk, a magneto-optic disk, a CD-ROM, a CD-R, a magnetic tape, non-volatile memory card, a DVD, an MO, a ROM, etc.

The program code read by the computer is executed, so that not only the above described functions of the embodiment can be achieved, but also a part or all of the actual processes are executed by the OS (operating system) operating on the computer on the basis of the instruction of the program code or the like and accordingly, the above described functions of the embodiment can be achieved.

Further, after the program code read from the memory medium is written in a memory provided in a function extending board inserted into the computer or a function extending unit connected to the computer, the CPU or the like provided in the function extending board or the function extending unit performs a part or all of the actual processes on the basis of the instruction of the program code, so that the above described functions of the embodiment can be achieved by the processes.

Still further, the objects of the present invention can be also achieved by installing the program code of the software for realizing the functions of the embodiment in the computer (or the CPU and the MPU) of the system of the apparatus and reading and executing the installed program code.

In this case, the program code itself downloaded in the download service of the internet and installed realizes the above mentioned functions of the embodiment and the program code itself constitutes the present invention.

Further, in order to the functional processes of the present invention, the program code itself installed in the computer also realizes the present invention. In other words, in the claims of the present invention, a computer program itself for realizing the functional processes of the present invention is also included. A method for supplying the computer program is not limited to a case in which the computer program is stored in the FD or the CD-ROM, read by the computer and installed in the computer. The computer is connected to the home page of the internet by using the browser of a client computer so that the computer program itself of the present invention, or a file compressed and having an automatic installing function is downloaded so that the computer program itself can be supplied. Further, the program code constituting the program of the present invention is divided into a plurality of files and respective files are downloaded from different home pages so that the computer program itself can be supplied. That is to say, a WWW server for downloading a program file for realizing the functional processes of the present invention by the computer to a plurality of users is also included in the claims of the present invention.

Still further, the program of the present invention is encoded, stored in the memory medium such as the FD and the encoded program is supplied to the users, then, key information for decoding the encoded program is downloaded from the home page through the internet by the user who clears prescribed conditions, and the key information is used by the user to execute the encoded program and install the program in the computer.

As many apparently widely different embodiments of the present invention can be made without departing from the spirit and scope thereof, it is to be understood that invention is not limited to the specific embodiments thereof except as defined in the appended claims.

As mentioned above, the information processor according to the present invention comprises an intermediate code converter for converting data to be printed which is generated by an application into print jobs of an intermediate code format and temporarily storing the print jobs in association with the print setting information of the data to be printed; a composition instructing unit for instructing a plurality of print jobs of the intermediate code format corresponding to the different data to be printed to be combined together so as to generate one composed job; and a setting unifier for analyzing the print setting information of a plurality of print jobs when the composition instructing unit instructs the plurality of print jobs to be combined together so as to obtain one composed job and generating print setting information for the composed job in which information that can be respectively merely set to one print job is unified. Accordingly, a plurality of print jobs having print setting information can be combined together and the inconvenience of the print setting upon combination of the print jobs can be eliminated.

Further, the above described setting unifier serves to analyze the print setting information of a plurality of print jobs to be combined together and the information processor of the present invention further includes a recognizing unit for recognizing to select whether the settings are unified or the print jobs are not combined together when the information which can be respectively set only to one print job is mutually different.

Still further, since the print jobs of the intermediate code format are temporarily stored as page description files for each pate, the data can be easily processed upon combining the jobs together.

Still further, since information for designating the page description files laid out on a physical page is added to the print setting information for the composed job, the description data of the intermediate data format does not need to be included in the composed job itself, the process upon combination of the jobs can be executed with ease.

Still further, since the setting information is temporarily stored as a print setting file of each print job, the job can be treated more easily.

Still further, since the information processor further comprises a preview display controller for controlling a preview based on the print setting information of the print jobs or the composed job to be displayed, the user can recognize a printed result before printing.

Still further, since the information processor further comprises an order controller for operating a plurality of print jobs in the composed job to reshuffle the order of the print jobs, the user can prepare the intermediate code without especially considering a print order upon preparation of the intermediate code and can determine the print order as desired.

Still further, since the information processor further comprises a job deleting unit for operating a plurality of print jobs in the composed job to delete a specific print job, it is not necessary to generate again the composed job.

Still further, since the information processor according to claim 1, further comprises a job divider for dividing the composed job into a plurality of print jobs before they are joined together, the composed job can be returned to respective single jobs. Accordingly, the user can easily try to generate the composed job.

Still further, since the information processor further comprises a job duplicating unit for designating the print job or the composed job to prepare the duplication of the designated print job, a duplication can be prepared to control a page when the user desires to include another job in a job.

Still further, since the print job or the composed job further includes a setting initializing unit for returning the data to an initial state upon preparation of the data of the intermediate code format as the base of the job on the basis of the print setting information, the user can stably execute an operation such as editing the job.

Still further, since the information processor further comprises a page editing unit for deleting a page designated relative to a logical page in the print job or the composed job, a job operation can be performed as desired by the user and an operability and a degree of freedom are improved.

Still further, since the information processor further comprises a printing data generator for generating the printing data to be transmitted to the printer on the basis of the data of the intermediate code format which is temporarily stored by the intermediate code converter, a desired job is generated and then, the generated job can be directly printed without restarting the application.

Still further, since the information processor further comprises a description instruction generator for converting the data of the intermediate code format temporarily stored by the intermediate code converter into a description instruction which can be interpreted by the description unit of an OS and outputting the converted data; and a print instruction allocator for sending a print instruction received through the description unit of the OS from the application to the intermediate data converter and sending the print instruction received through the description unit of the OS from the description instruction generator to the printing data generator, a conventional printing data converter can be employed so that the number of developing processes can be decreased when such an arrangement is provided.

Still further, since the description instruction is a GDI function, the print instruction is a DDI function and the printing data is a printer language, the present system can be provided for a general OS.

Still further, since the composed job generator generates the layout information of the composed job for each physical page on the basis of the layout information of a plurality of print jobs, the layout information can be provided for each physical page.

Still further, since the information processor further comprises a layout unification instructing unit for instructing the layout information of the composed job to be unified, and the composed job information generator unifies the layout information of the composed job by all the physical pages when the layout unification instructing unit instructs the layout information to be unified, even when a plurality of print jobs having a plurality of layout information are combined together, the unified layout information can be provided for the composed job.

Still further, since the information processor further comprises a close arrangement instructing unit for instructing the logical pages of each print job to be closely arranged; and the composed job information generator determines to closely arrange the logical pages in the physical pages when a close arrangement is instructed by the close arrangement instructing unit, the arrangement of the logical pages excellent in its variation can be achieved. Accordingly, the print jobs can be prepared with ease as desired by the user.

Still further, since the close arrangement instructing unit performs any one of a close arrangement instruction for closely arranging the logical pages on the same physical page, a back side close arrangement instruction for compactly arranging the logical pages on a back side when the back side of the same physical page are unoccupied, and no instruction for a close arrangement by constantly changing the physical pages when original print jobs are different, the arrangement of the logical pages rich in its variation can be realized, the preparation of the print jobs can be attained as desired by the user.

Furthermore, since the information process further includes a preview controller for controlling the preview of the composed job to be displayed, an actual output result can be notified to the user before a printing operation.

What is claimed is:

1. An information processor for generating printing data to be transmitted to a printer comprising:
   an intermediate code conversion unit for converting data to be printed which is generated by an application into a print job of an intermediate code format and temporarily storing the print job in association with print setting information for the data to be printed;
   a composition instructing unit for instructing a plurality of print jobs of the intermediate code format converted by said intermediate code conversion unit to be composed together so as to generate one composed job;
   a discrimination unit for analyzing the print setting information of the plurality of print jobs stored by said intermediate code conversion unit when said composition instructing unit instructs the plurality of print jobs to be composed together so as to obtain one composed job, and for discriminating whether the plurality of print jobs have a same print setting or different print settings for a certain print setting item for which each print job is allowed to have one unique print setting;
   a confirmation message display unit for, if said discrimination unit discriminates that the plurality of print jobs have different print settings for the print setting item, displaying a confirmation message indicating that the different print settings should be unified to a common print setting; and
   a setting unifier unit for generating the print setting information for the composed job based on the common print setting, after said confirmation message display unit displays the confirmation message.

2. An information processor according to claim 1, wherein said discrimination unit discriminates that the plurality of print jobs have different print settings for the print setting item, and said confirmation message display unit displays a confirmation message for selection between a process in which the settings are unified and a process in which the print jobs are not composed together.

3. An information processor according to claim 1, wherein said intermediate code conversion unit temporarily stores the print job of the intermediate code format as a page description file by a page unit.

4. An information processor according to claim 3, wherein information for designating the page description file laid out on a physical page is added to the print setting information of the composed job.

5. An information processor according to claim 1, wherein the print setting information is temporarily stored as a print setting file of each print job.

6. An information processor according to claim 1, further comprising a preview display controller for controlling a preview based on the print setting information of the print jobs or the composed job to be displayed.

7. An information processor according to claim 1, further comprising an order controller for operating on the plurality of print jobs in the composed job to reshuffle the order of the print jobs.

8. An information processor according to claim 1, further comprising a job cancelling unit for operating on the plurality of print jobs in the composed job to cancel a specific print job.

9. An information processor according to claim 1, further comprising a job divider for dividing the composed job into a plurality of print jobs before they are joined together.

10. An information processor according to claim 1, further comprising a job duplicating unit for designating the print job or the composed job to prepare the duplication of the designated print job.

11. An information processor according to claim 3, further comprising a setting initializing unit for returning the intermediate code format as the base of the job to an initial state upon preparation of the data.

12. An information processor according to claim 1, further comprising a page editing unit for cancelling a page designated relative to a logical page in the print job or the composed job.

13. An information processor according to claim 3, further comprising a printing data generator for generating the printing data to be transmitted to the printer on the basis of the data of the intermediate code format which is temporarily stored by said intermediate code conversion unit.

14. An information processor according to claim 13, further comprising:
   a description instruction generator for converting the data of the intermediate code format temporarily stored by said intermediate code conversion unit into a description instruction which can be interpreted by the description unit of an OS and outputting the converted data;
   a print instruction allocator for sending a print instruction received through the description unit of the OS from the application to said intermediate data converter and sending the print instruction received through the description unit of the OS from said description instruction generator to said printing data generator.

15. An information processor according to claim 14, wherein the description instruction is a GDI function, the print instruction is a DDI function and the printing data is a printer language.

16. An information processor according to claim 1, further comprising a composed job information generator for generating the layout information of the composed job on the basis of the layout information of the plurality of print jobs when said composition instructing unit instructs the plurality of print jobs to be composed together so as to have one composed job.

17. An information processor according to claim 16, wherein said composed job information generator generates the layout information of the composed job for each physical page on the basis of the layout information of the plurality of print jobs.

18. An information processor according to claim 16, further comprising a layout unification instructing unit for instructing the layout information of the composed job to be unified, wherein said composed job information generator unifies the layout information of the composed job by all the physical pages when said layout unification instructing unit instructs the layout information to be unified.

19. An information processor according to claim 18, wherein said composed job information generator unifies the layout information of the composed job to prescribed layout information.

20. An information processor according to claim 18, wherein said composed job information generator unifies the layout information of the composed job to the layout information of the print job corresponding to a first physical page in the composed job.

21. An information processor according to claim 16, wherein said composed job information generator counts the number of logical pages of the composed job and determines the arrangement of the logical pages in the physical pages for each physical page on the basis of the layout information.

22. An information processor according to claim 21, further comprising a close arrangement instructing unit for instructing the logical pages of each print job to be closely arranged,
wherein said composed job information generator determines to closely arrange the logical pages in the physical pages when a close arrangement is instructed by said close arrangement instructing unit.

23. An information processor according to claim 22, wherein said close arrangement instructing unit performs one of a close arrangement for closely arranging the logical pages on the same physical pages, and a back side close arrangement instruction for compactly arranging the logical pages on back sides of the same physical pages when the back sides of the same physical pages are unoccupied,
wherein no instruction is made for a close arrangement by constantly changing the physical pages when original print jobs are different.

24. A method for generating printing data to be transmitted to a printer comprising:
an intermediate code conversion step of converting data to be printed which is generated by an application into a print job of an intermediate code format and temporarily storing the print job in association with print setting information for the data to be printed;
a composition instructing step of instructing a plurality of print jobs of the intermediate code format converted in said intermediate code conversion step to be composed together so as to generate one composed job;
a discrimination step of analyzing the print setting information of the plurality of print jobs stored in said intermediate code conversion step when, in said composition instructing step, the plurality of print jobs are instructed to be composed together so as to obtain one composed job, and discriminating whether the plurality of print jobs have a same print setting or different print settings for a certain print setting item for which each print job is allowed to have one unique print setting;
a confirmation message display step of, if said discrimination step discriminates that the plurality of print jobs have different print settings for the print setting item, displaying a confirmation message indicating that the different print settings should be unified to a common print setting; and
a setting unifier step of generating the print setting information for the composed job based on the common print setting, after said confirmation message display step displays the confirmation message.

25. A method for generating printing data according to claim 24, wherein said discrimination step discriminates that the plurality of print jobs have different print settings for the print setting item, and said confirmation message display step displays a confirmation message for selection between a process in which the settings are unified and a print process in which the print jobs are not composed together.

26. A method according to claim 24, wherein said intermediate code conversion step temporarily stores the print job of the intermediate code format as a page description file by a page unit.

27. A method according to claim 26, wherein information for designating the page description files laid out on a physical page is added to the print setting information of the composed job.

28. A method according to claim 24, wherein the print setting information is temporarily stored as a print setting file of each print job.

29. A method according to claim 24, further comprising a preview display controlling step of controlling a preview based on the print setting information of the print jobs or the composed job to be displayed.

30. A method according to claim 24, further comprising an order controlling step of operating on the plurality of print jobs in the composed job to reshuffle the order of the print jobs.

31. A method according to claim 24, further comprising a job cancelling step of operating on the plurality of print jobs in the composed job to cancel a specific print job.

32. A method according to claim 24, further comprising a job dividing step of dividing the composed job into a plurality of print jobs before they are joined together.

33. A method according to claim 24, further comprising a job duplicating step of designating the print job or the composed job to prepare the duplication of the designated print job.

34. A method according to claim 26, further comprising a setting initializing step of returning the intermediate code format as the base of the job to an initial state upon preparation of the data on the basis of the print setting information.

35. A method according to claim 24, further comprising a page editing step of cancelling a page designated relative to a logical page in the print job or the composed job.

36. A method according to claim 26, further comprising a printing data generating step of generating the printing data to be transmitted to the printer on the basis of the data of the intermediate code format which is temporarily stored in said intermediate code conversion step.

37. A method according to claim 36, further comprising:
a description instruction generating step of converting the data of the intermediate code format temporarily stored in said intermediate code conversion step into a description instruction which can be interpreted in the description step of an OS and outputting the converted data; and
a print instruction allocating step of sending a print instruction received through the description step of the OS from the application to said intermediate data converting step and sending the print instruction received through the description step of the OS from said description instruction generating step to said printing data generating step.

38. A method according to claim 37, wherein the description instruction is a GDI function, and the print instruction is a DDI function and the printing data is a printer language.

39. A method according to claim 24, further comprising a composed job information generating step of generating the layout information of the composed job on the basis of the layout information of a plurality of print jobs when said composition instructing step instructs the plurality of print jobs to be composed together so as to have one composed job.

40. A method according to claim 39, wherein said composed job information generating step generates the layout information of the composed job for each physical page on the basis of the layout information of the plurality of print jobs.

41. A method according to claim 39, further comprising a layout unification instructing step of instructing the layout information of the composed job to be unified, wherein said composed job information generating step unifies the layout information of the composed job by all the physical pages when said layout unification instructing step instructs the layout information to be unified.

42. A method according to claim 41, wherein said composed job information generating step unifies the layout information of the composed job to prescribed layout information.

43. A method according to claim 41, wherein said composed job information generating step unifies the layout information of the composed job to the layout information of the print job corresponding to a first physical page in the composed job.

44. A method according to claim 39, wherein said composed job information generating step counts the number of logical pages of the composed job and determines the arrangement of the logical pages in the physical pages for each physical page on the basis of the layout information.

45. A method according to claim 44, further comprising a close arrangement instructing step of instructing the logical pages of each print job to be closely arranged in the composed job,
wherein said composed job information generating step determines to closely arrange the logical pages in the physical pages when a close arrangement is instructed by said close arrangement instructing step.

46. A method according to claim 45, wherein said close arrangement instructing step performs one of a close arrangement for closely arranging the logical pages on the same physical pages, and a back side close arrangement instruction for compactly arranging the logical pages on back sides of the same physical pages when the back sides of the same physical pages are unoccupied,
wherein no instruction for a close arrangement by constantly changing the physical pages when original print jobs are different.

47. A computer-readable memory medium which stores a printing data generating program for generating printing data to be transmitted to a printer, the program comprising:
code for an intermediate code conversion step of converting data to be printed which is generated by an application into a print job of an intermediate code format and temporarily storing the print job in association with print setting information for the data to be printed;
code for a composition instructing step of instructing a plurality of print jobs of the intermediate code format converted by said code for an intermediate code conversion step to be composed together so as to generate one composed job;
code for a discrimination step of analyzing the print setting information of the plurality of print jobs stored by said code for an intermediate code conversion step when said code for a composition instructing step instructs the plurality of print jobs to be composed together so as to obtain one composed job, and discriminating whether the plurality of print jobs have a same print setting or different print settings for a certain print setting item for which each print job is allowed to have one unique print setting;
code for a confirmation message display step of, if said code for a discrimination step discriminates that the plurality of print jobs have different print settings for the print setting item, displaying a confirmation message indicating that the different print settings should be unified to a common print setting; and
code for a setting unifier step of generating the print setting information for the composed job based on the common print setting after said code for a confirmation message display step displays the confirmation message.

48. A memory medium according to claim 47, wherein said code for a discrimination step discriminates that the plurality of print jobs have different print setting for the print setting item, said code for a confirmation message display step displays a confirmation message for selection between a process in which the settings are unified and a process in which the print jobs are not composed together.

49. A memory medium according to claim 47, wherein said code for an intermediate code conversion step temporarily stores the print job of the intermediate code format as a page description file by a page unit.

50. A memory medium according to claim 49, wherein information for designating the page description files laid out on a physical page is added to the print setting information of the composed job.

51. A memory medium according to claim 47, wherein the print setting information is temporarily stored as a print setting file of each print job.

52. A memory medium according to claim 47, further comprising a preview display controlling step of controlling a preview based on the print setting information of the print jobs or the composed job to be displayed.

53. A memory medium according to claim 47, further comprising code for an order controlling step of operating on the plurality of print jobs in the composed job to reshuffle the order of the print jobs.

54. A memory medium according to claim 47, further comprising code for a job cancelling step of operating on the plurality of print jobs in the composed job to cancel a specific print job.

55. A memory medium according to claim 47, further comprising code for a job dividing step of dividing the composed job into a plurality of print jobs before they are joined together.

56. A memory medium according to claim 47, further comprising code for a job duplicating step of designating the print job or the composed job to prepare the duplication of the designated print job.

57. A memory medium according to claim 49, further comprising code for a setting initializing step of returning the intermediate code format as the base of the job to an initial state upon preparation of the data on the basis of the print setting information.

58. A memory medium according to claim 47, further comprising code for a page editing step of cancelling a page designated relative to a logical page in the print job or the composed job.

59. A memory medium according to claim 49, further comprising code for a printing data generating step of generating the printing data to be transmitted to the printer on the basis of the data of the intermediate code format which is temporarily stored by said code for an intermediate code conversion step.

60. A memory medium according to claim 59, further comprising:
   code for a description instruction generating step of converting the data of the intermediate code format temporarily stored by said code for an intermediate code conversion step into a description instruction which can be interpreted in the description step of an OS and outputting the converted data; and
   code for a print instruction allocating step of sending a print instruction received through the description step of the OS from the application to said code for an intermediate data converting step and sending the print instruction received through the description step of the OS from said code for a description instruction generating step to said code for a printing data generating step.

61. A memory medium according to claim 60, wherein the description instruction is a GDI function, and the print instruction is a DDI function and the printing data is a printer language.

62. A memory medium according to claim 47, further comprising code for a composed job information generating step of generating the layout information of the composed job on the basis of the layout information of a plurality of print jobs when said code for a composition instructing step instructs a plurality of print jobs to be composed together so as to have one composed job.

63. A memory medium according to claim 62, wherein said code for a composed job information generating step generates the layout information of the composed job for each physical page on the basis of the layout information of a plurality of print jobs.

64. A memory medium according to claim 62, further comprising code for a layout unification instructing step of instructing the layout information of the composed job to be unified, wherein said code for a composed job information generating step unifies the layout information of the composed job by all the physical pages when said code for a layout unification instructing step instructs the layout information to be unified.

65. A memory medium according to claim 64, wherein said code for a composed job information generating step unifies the layout information of the composed job to prescribed layout information.

66. A memory medium according to claim 64, wherein said code for a composed job information generating step unifies the layout information of the composed job to the layout information of the print job corresponding to a first physical page in the composed job.

67. A memory medium according to claim 62, wherein said code for a composed job information generating step counts the number of logical pages of the composed job and determines the arrangement of the logical pages in the physical pages for each physical page on the basis of the layout information.

68. A memory medium according to claim 67, further comprising code for a close arrangement instructing step of instructing the logical pages of each print job to be closely arranged in the composed job,
   wherein said code for a composed job information generating step determines to closely arrange the logical pages in the physical pages when a close arrangement is instructed by said code for a close arrangement instructing step.

69. A memory medium according to claim 68, wherein said code for a close arrangement instructing step performs one of a close arrangement for closely arranging the logical pages on the same physical pages, and a back side close arrangement instruction for compactly arranging the logical pages on back sides of the same physical pages when the back sides of the same physical pages are unoccupied,
   wherein no instruction is made for a close arrangement by constantly changing the physical pages when original print jobs are different.

70. A printing data generating program for generating printing data to be transmitted to a printer, said program comprising:
   code for an intermediate code conversion step of converting data to be printed which is generated by an application into a print job of an intermediate code format and temporarily storing the print job in association with print setting information for the data to be printed;
   code for a composition instructing step of instructing a plurality of print jobs of the intermediate code format converted by said code for an intermediate code conversion step to be composed together so as to generate one composed job;
   code for a discrimination step of analyzing the print setting information of the plurality of print jobs stored by said code for an intermediate code conversion step when said code for a composition instructing step instructs the plurality of print jobs to be composed together so as to obtain one composed job, and discriminating whether the plurality of print jobs have a same print setting or different print settings for a certain print setting item for which each print job is allowed to have one unique print setting;
   code for a confirmation message display step of, if said code for a discrimination step discriminates that the plurality of print jobs have different print settings for the print setting item, displaying a confirmation message indicating that the different print settings should be unified to a common print setting; and
   code for a setting unifier step of generating the print setting information for the composed job based on the common print setting after said code for a confirmation message display step displays the confirmation message.

71. A printing data generating program according to claim 70, wherein said code for a discrimination step discriminates that the plurality of print jobs have different print setting for the print setting item, said code for a confirmation message display step displays a confirmation message for selection between a process in which the settings are unified and a process in which the print jobs are not composed together.

72. A printing data generating program according to claim 70, wherein said code for an intermediate code conversion step temporarily stores the print job of the intermediate code format as a page description file by a page unit.

73. A printing data generating program according to claim 72, wherein information for designating the page description files laid out on a physical page is added to the print setting information of the composed job.

74. A printing data generating program according to claim 70, wherein the print setting information is temporarily stored as a print setting file of each print job.

75. A printing data generating program according to claim 70, further comprising a preview display controlling step of controlling a preview based on the print setting information of the print jobs or the composed job to be displayed.

76. A printing data generating program according to claim 70, further comprising code for an order controlling step of operating on the plurality of print jobs in the composed job to reshuffle the order of the print jobs.

77. A printing data generating program according to claim 70, further comprising code for a job cancelling step of operating on the plurality of print jobs in the composed job to cancel a specific print job.

78. A printing data generating program according to claim 70, further comprising code for a job dividing step of dividing the composed job into a plurality of print jobs before they are joined together.

79. A printing data generating program according to claim 70, further comprising code for a job duplicating step of designating the print job or the composed job to prepare the duplication of the designated print job.

80. A printing data generating program according to claim 72, further comprising code for a setting initializing step of returning the intermediate code format as the base of the job to an initial state upon preparation of the data on the basis of the print setting information.

81. A printing data generating program according to claim 70, further comprising code for a page editing step of cancelling a page designated relative to a logical page in the print job or the composed job.

82. A printing data generating program according to claim 72, further comprising code for a printing data generating step of generating the printing data to be transmitted to the printer on the basis of the data of the intermediate code format which is temporarily stored by said code for an intermediate code conversion step.

83. A printing data generating program according to claim 82, further comprising:
- code for a description instruction generating step of converting the data of the intermediate code format temporarily stored by said code for an intermediate code conversion step into a description instruction which can be interpreted in the description step of an OS and outputting the converted data; and
- code for a print instruction allocating step of sending a print instruction received through the description step of the OS from the application to said code for an intermediate data converting step and sending the print instruction received through the description step of the OS from said code for a description instruction generating step to said code for a printing data generating step.

84. A printing data generating program according to claim 83, wherein the description instruction is a GDI function, and the print instruction is a DDI function and the printing data is a printer language.

85. A printing data generating program according to claim 70, further comprising code for a composed job information generating step of generating the layout information of the composed job on the basis of the layout information of a plurality of print jobs when said code for a composition instructing step instructs a plurality of print jobs to be composed together so as to have one composed job.

86. A printing data generating program according to claim 85, wherein said code for a composed job information generating step generates the layout information of the composed job for each physical page on the basis of the layout information of a plurality of print jobs.

87. A printing data generating program according to claim 85, further comprising code for a layout unification instructing step of instructing the layout information of the composed job to be unified, wherein said code for a composed job information generating step unifies the layout information of the composed job by all the physical pages when said code for a layout unification instructing step instructs the layout information to be unified.

88. A printing data generating program according to claim 87, wherein said code for a composed job information generating step unifies the layout information of the composed job to prescribed layout information.

89. A printing data generating program according to claim 87, wherein said code for a composed job information generating step unifies the layout information of the composed job to the layout information of the print job corresponding to a first physical page in the composed job.

90. A printing data generating program according to claim 75, wherein said code for a composed job information generating step counts the number of logical pages of the composed job and determines the arrangement of the logical pages in the physical pages for each physical page on the basis of the layout information.

91. A printing data generating program according to claim 90, further comprising code for a close arrangement instructing step of instructing the logical pages of each print job to be closely arranged in the composed job,
- wherein said code for a composed job information generating step determines to closely arrange the logical pages in the physical pages when a close arrangement is instructed by said code for a close arrangement instructing step.

92. A printing data generating program according to claim 91, wherein said code for a close arrangement instructing step performs one of a close arrangement for closely arranging the logical pages on the same physical pages, and a back side close arrangement instruction for compactly arranging the logical pages on back sides of the same physical pages when the back sides of the same physical pages are unoccupied,
- wherein no instruction is made for a close arrangement by constantly changing the physical pages when original print jobs are different.

* * * * *